(12) United States Patent
Mok et al.

(10) Patent No.: US 11,546,827 B2
(45) Date of Patent: Jan. 3, 2023

(54) METHOD AND DEVICE FOR CHANGING WIRELESS PATH IN WIRELESS COMMUNICATION SYSTEM

(71) Applicant: Samsung Electronics Co., Ltd, Suwon-si (KR)

(72) Inventors: Youngjoong Mok, Suwon-si (KR); Sangwook Kwon, Yeongtong-gu (KR); Hyunjeong Kang, Seoul (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 16/496,931

(22) PCT Filed: Mar. 23, 2018

(86) PCT No.: PCT/KR2018/003447
§ 371 (c)(1),
(2) Date: Sep. 23, 2019

(87) PCT Pub. No.: WO2018/174642
PCT Pub. Date: Sep. 27, 2018

(65) Prior Publication Data
US 2020/0128470 A1    Apr. 23, 2020

(30) Foreign Application Priority Data
Mar. 23, 2017    (KR) .................. 10-2017-0037165

(51) Int. Cl.
*H04W 40/14*    (2009.01)
*H04W 24/04*    (2009.01)
(Continued)

(52) U.S. Cl.
CPC ........... *H04W 40/14* (2013.01); *H04W 24/04* (2013.01); *H04W 40/04* (2013.01); *H04W 40/34* (2013.01); *H04W 72/02* (2013.01)

(58) Field of Classification Search
None
See application file for complete search history.

(56) References Cited

U.S. PATENT DOCUMENTS

| | | | |
|---|---|---|---|
| 8,355,356 B2 | 1/2013 | Youn et al. | |
| 9,794,950 B2 | 10/2017 | Ryu et al. | |
| (Continued) | | | |

FOREIGN PATENT DOCUMENTS

| | | |
|---|---|---|
| EP | 3121974 A1 | 1/2017 |
| KR | 10-2008-0008297 A | 1/2008 |
| (Continued) | | |

OTHER PUBLICATIONS

Nokia et al., "Connection establishment for UE-to-NW relaying", 3GPP TSG-RAN WG2 Meeting #96, Nov. 14-18, 2016, R2-168403, 5 pages.
(Continued)

*Primary Examiner* — Faruk Hamza
*Assistant Examiner* — Cassandra L Decker

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, health care, digital education, retail, security and safety related services, and the like) on the basis of 5G communication technology and IoT-related technology. The present invention relates to a method by which a terminal for performing vehicle communication (connected car or vehicle to everything) in
(Continued)

| | PPPP-1 | PPPP-2 | PPPP-3 | ..... |
|---|---|---|---|---|
| CBR Range 1 | Tx Parameters A | Tx Parameters E | ..... | ..... |
| CBR Range 2 | Tx Parameters B | ..... | ..... | ..... |
| CBR Range 3 | Tx Parameters C | ..... | ..... | ..... |
| ..... | Tx Parameters D | ..... | ..... | ..... | a wireless communication system improves reliability in data transmission.

11 Claims, 39 Drawing Sheets

(51) Int. Cl.
    *H04W 40/04*     (2009.01)
    *H04W 40/34*     (2009.01)
    *H04W 72/02*     (2009.01)
    *H04W 76/23*     (2018.01)
    *H04W 36/00*     (2009.01)
    *H04W 28/12*     (2009.01)
    *H04W 40/02*     (2009.01)

(56) References Cited

U.S. PATENT DOCUMENTS

| | | | |
|---|---|---|---|
| 10,342,019 B2 | 7/2019 | Xue et al. | |
| 2006/0114114 A1* | 6/2006 | Nakano | G08B 25/08 |
| | | | 340/632 |
| 2008/0019321 A1 | 1/2008 | Kim et al. | |
| 2016/0057770 A1 | 2/2016 | Yerramalli et al. | |
| 2016/0249297 A1 | 8/2016 | Oh et al. | |
| 2017/0055187 A1 | 2/2017 | Kang et al. | |
| 2017/0171897 A1 | 6/2017 | Ryu et al. | |
| 2017/0317740 A1 | 11/2017 | Basu Mallick et al. | |
| 2018/0048577 A1* | 2/2018 | Gulati | H04L 47/24 |
| 2018/0359713 A1* | 12/2018 | Boban | H04W 52/267 |
| 2019/0132821 A1* | 5/2019 | Goto | H04W 72/042 |
| 2019/0191461 A1* | 6/2019 | Lee | H04W 4/40 |
| 2019/0261216 A1* | 8/2019 | Lee | H04W 28/0289 |
| 2019/0319723 A1* | 10/2019 | Axmon | H04B 17/24 |
| 2019/0373502 A1* | 12/2019 | Chae | H04W 72/12 |
| 2019/0373637 A1* | 12/2019 | Lee | H04W 28/26 |
| 2020/0029245 A1* | 1/2020 | Khoryaev | H04L 27/0006 |
| 2020/0068593 A1* | 2/2020 | Seo | H04W 76/14 |
| 2021/0211906 A1* | 7/2021 | Chae | H04W 28/0231 |

FOREIGN PATENT DOCUMENTS

| | | |
|---|---|---|
| KR | 10-1414632 B1 | 7/2014 |
| KR | 10-2014-0145534 A | 12/2014 |
| KR | 10-2015-0041497 A | 4/2015 |
| KR | 10-2015-0090800 A | 8/2015 |
| KR | 10-2017-0022933 A | 3/2017 |
| WO | 2016/126136 A1 | 8/2016 |

OTHER PUBLICATIONS

NTT Docomo, Inc., "(E)PDCCH for sidelink SPS configuration switching", 3GPP TSG RAN WG1 Meeting #85, May 23-27, 2016, R1-165193, 5 pages.

Supplementary European Search Report dated Jan. 22, 2020 in connection with European Patent Application No. 18 77 1760, 8 pages.

International Search Report dated Jun. 25, 2018 in connection with International Patent Application No. PCT/KR2018/003447, 2 pages.

Written Opinion of the International Searching Authority dated Jun. 25, 2018 in connection with International Patent Application No. PCT/KR2018/003447, 5 pages.

Office Action dated Sep. 7, 2021 in connection with Korean Patent Application No. 10-2017-0037165, 6 pages.

Korean Intellectual Property Office (KIPO), "Decision of Patent," dated Mar. 8, 2022, in connection with counterpart Korean Patent Application No. 10-2017-0037165, 4 pages.

* cited by examiner

FIG. 23

Path Change Request BSR MAC Control Elements

| Destination Index | LCG ID | Buffer Size |

FIG. 35

|  | PPPP-1 | PPPP-2 | PPPP-3 | ... |
|---|---|---|---|---|
| CBR Range 1 | Tx Parameters A | Tx Parameters E | ... | ... |
| CBR Range 2 | Tx Parameters B | ... | ... | ... |
| CBR Range 3 | Tx Parameters C | ... | ... | ... |
| ... | Tx Parameters D | ... | ... | ... |

METHOD AND DEVICE FOR CHANGING WIRELESS PATH IN WIRELESS COMMUNICATION SYSTEM

CROSS-REFERENCE TO RELATED APPLICATIONS

This application is a 371 of International Application No. PCT/KR2018/003447 filed Mar. 23, 2018, which claims priority to Korean Patent Application No. 10-2017-0037165 filed on Mar. 23, 2017, the disclosures of which are herein incorporated by reference in their entirety.

BACKGROUND

1. Field

The disclosure relates to a method for heightening reliability in data transmission by a terminal that performs vehicle communication (connected car or vehicle to everything (V2X) in a wireless communication system, and more particularly, to a method to select a proper wireless (radio) path in accordance with a channel environment. The radio path may correspond to a direct communication interface between terminals or a communication interface between a terminal and a base station.

2. Description of Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LIE System."

Implementation of the 5G communication system in ultra-high frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G communication system, hybrid FSK and QAM modulation (FQAM) and sliding window superposition coding (SWSC), as advanced coding modulation (ACM) systems, and filter bank multi carrier (FBMC), non-orthogonal multiple access(NOMA), and sparse code multiple access (SCMA), as advanced access technologies, have been developed.

Meanwhile, the Internet, which is a human centered connectivity network where humans generate and consume information, is now evolving to the Internet of things (IoT) where distributed entities, such as things, exchange and process information without human intervention. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to 5G communication technologies. As the big data processing technology as described above, a cloud radio access network (cloud RAN) may be applied as an example of convergence of 5G technology and IoT technology.

Based on the above-described various types of technical developments, in the 5G system, in comparison with the existing 4G system, support of various services has been considered. For example, the most representative services are enhanced mobile broadband (eMBB), ultra-reliable and low latency communication (URLLC), massive machine type communication (mMTC), evolved multimedia broadcast/multicast service (eMBMS), and so forth. Further, a system providing the URLLC services may be called an URLLC system, a system providing the eMBB services may be called an eMBB system, and a system providing the mMTC services may be called an mMTC system. Further, the terms "service" and "system" may be used interchangeably.

Among them, the URLLC is a service that is newly considered in the 5G system in contrast with the existing 4G system, and in comparison with other services, the URLLC requires satisfaction of ultra-reliability (e.g., packet error rate of about $10^{-5}$) and low latency (e.g., about 0.5 msec) conditions. In order to satisfy such severe requirements, the URLLC service requires an application of a transmission time interval (TTI) that is shorter than that of the eMBB service, and various operation methods utilizing this have been considered.

SUMMARY

The disclosure has been made in order to solve the above-described problems, and aspects of the disclosure are to support reliable vehicle communication service and data transmission by providing a method for changing a radio path for the purpose of vehicle communication in accordance with a channel environment or a service type in a vehicle communication system.

Technical tasks to be accomplished by the disclosure are not limited to those as described above, and unmentioned or other technical tasks can be clearly understood by those of ordinary skill in the art to which the disclosure pertains from the following description.

In an aspect of the disclosure in order to achieve the above aspects, a communication method by a terminal may include receiving, from a base station, configuration information for changing a radio path from a first radio path in which the terminal is connected to another terminal or the base station to a second radio path in which the terminal is connected to the other terminal or the base station; and determining whether it is required to change the first radio path to the second radio path based on the configuration information for changing the radio path.

The communication method may further include transmitting, to the base station, a message for requesting an uplink resource according to the second radio path in case that it is required to change the first radio path to the second radio path.

The communication method may further include transmitting, to the base station, a message including information for requesting to change the radio path from the first radio path to the second radio path in case that it is required to change the first radio path to the second radio path.

The configuration information to change the radio path may include at least one of a channel measurement situation threshold value, a packet priority level, information on a type of the terminal, a data destination address, a power threshold value of the terminal, a service priority, a channel quality threshold value, signal measurement threshold values of channels, a parameter threshold value for data transmission, a threshold value of the number of packet decoding failures, or a resource threshold value selectable by the terminal for the radio path change.

In another aspect of the disclosure in order to achieve the above aspects, a communication method by a base station may include transmitting, to a first terminal, configuration information for determining whether to change a radio path from a first radio path in which the first terminal is connected to a second terminal or the base station to a second radio path in which the first terminal is connected to the second terminal or the base station; and receiving, from the first terminal, a message including information indicating to change the first radio path to the second radio path.

Receiving the message including the information indicating to change the first radio path to the second radio path may include receiving, from the first terminal, a message for requesting an uplink resource according to the second radio path; and allocating the uplink resource to the first terminal.

Receiving the message including the information indicating to change the first radio path to the second radio path may include receiving, from the first terminal, a message including information for requesting to change the radio path from the first radio path to the second radio path; and determining whether to change the first radio path to the second radio path based on the request information.

In still another aspect of the disclosure in order to achieve the above aspects, a terminal may include a transceiver configured to transmit and receive signals; and a controller configured to receive, from a base station, configuration information for changing a radio path from a first radio path in which the terminal is connected to another terminal or the base station to a second radio path in which the terminal is connected to the other terminal or the base station, and determine whether it is required to change the first radio path to the second radio path based on the configuration information for changing the radio path.

In yet still another aspect of the disclosure in order to achieve the above aspects, a base station may include a transceiver configured to transmit and receive signals; and a controller configured to transmit, to a first terminal, configuration information for determining whether to change a radio path from a first radio path in which the first terminal is connected to a second terminal or the base station to a second radio path in which the first terminal is connected to the second terminal or the base station, and receive, from the first terminal, a message including information indicating to change the first radio path to the second radio path.

According to the aspects of the disclosure, a terminal (a vehicle terminal or a terminal mounted in a vehicle) changes a radio path in accordance with a channel environment or a service type, and thus an effect to heighten reliability can be obtained during data transmission for the purpose of vehicle communication services.

According to the aspects of the disclosure, a scheme for avoiding a resource congestion situation for vehicle communication is provided to obtain an effect to reduce a service latency and to obtain an effect to avoid power consumption and resource waste occurring due to unnecessary resource sending or packet retransmission.

The effects that can be obtained by the disclosure are not limited to those as described above, and unmentioned or other effects can be clearly understood by those of ordinary skill in the art to which the disclosure pertains from the following description.

BRIEF DESCRIPTION OF THE DRAWINGS

FIG. 23 is a diagram illustrating an example of a MAC CE for requesting a V2X communication link change according to an embodiment of the disclosure;

FIG. 35 is a diagram illustrating an example of Tx parameters that a terminal uses for a congestion control according to an embodiment of the disclosure;

DETAILED DESCRIPTION

Figure 1A:
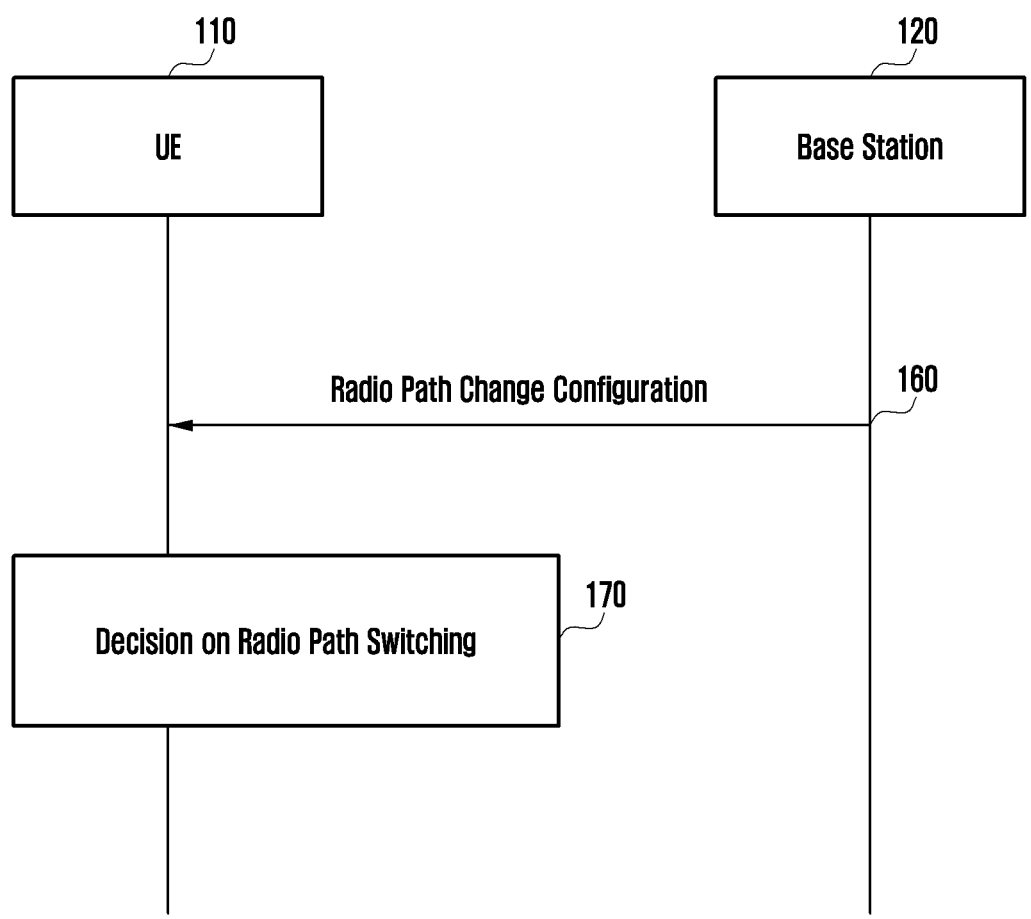
FIG. 1A is a diagram illustrating a signal flow between a terminal and a base station for changing a radio path to be used for V2X communication according to an embodiment of the disclosure.

In explaining embodiments, explanation of technical contents which are well known in the art to which the disclosure pertains and are not directly related to the disclosure will be omitted. This is to transfer the subject matter of the disclosure more clearly without obscuring the same through omission of unnecessary explanations.

In the description, if it is described that a certain constituent element is connected or attaches to another constituent element, it may mean that the certain constituent element is directly connected or directly attaches to the other constituent element, or it may mean that an intermediate constituent element exists to electrically connect the above-described constituent elements with each other. Further, in the description, the term "include(s)" a specific configuration may not mean that other configurations are excluded, but may mean that additional configurations can be included in the range of the technical idea of the disclosure.

Further, in embodiments of the disclosure, constituent parts are independently illustrated to indicate their different functional features, but do not mean that the respective constituent parts are not in the unit of separated hardware or one software configuration. That is, for convenience in explanation, the respective constituent parts are enumerated in succession, and at least two of the constituent parts may constitute one constituent part, or one constituent part may be divided into a plurality of constituent parts to perform corresponding functions. The integrated and separated embodiments of the respective constituent parts are included in the scope of the disclosure without departing from the essence of the disclosure.

Further, some constituent elements may not be essential constituent elements that perform the essential function in the disclosure, but may be selective constituent elements to improve the performance only. The disclosure may be implemented to include the essential constituent parts for implementing the essence of the disclosure excluding the constituent elements used for the performance improvement only, and the structure including the essential constituent elements excluding the selective constituent elements used for the performance improvement only is included in the scope of the disclosure.

In describing embodiments of the disclosure, related well-known functions or configurations incorporated herein are not described in detail in case where it is determined that they obscure the subject matter of the disclosure in unnecessary detail. Hereinafter, the embodiments of the disclosure will be described in detail with reference to the accompanying drawings. Further, terms to be described later are terms defined in consideration of their functions in the disclosure, but may differ depending on intentions of a user and an operator or customs. Accordingly, they should be defined based on the contents of the whole description of the disclosure.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, establish means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In this case, the term "unit", as used in an embodiment, means, but is not limited to, a software or hardware component, such as FPGA or ASIC, which performs certain tasks. However, "unit" does not mean to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card.

In the present disclosure, a radio path may be classified into a sidelink radio path and a Uu radio path. The sidelink radio path is a radio path between a terminal (or vehicle, vehicle terminal, or terminal mounted in a vehicle) that performs vehicle communication (connected car or vehicle to everything (V2X) and a terminal, and the Uu radio path is a radio path between a terminal and a base station.

In changing a radio path proposed in the disclosure, a target of resource allocation may be a sidelink scheduled resource, a sidelink terminal (UE)-selected resource, or a Uu resource. The scheduled resource is a resource for a base station to directly schedule a resource to be used for V2X communication for each terminal with respect to. Further, the UE-selected resource is a resource that is directly selected and used by the terminal among resources commonly allocated to a plurality of terminals for the purpose of V2Z communication. The Uu resource is a resource used for V2X communication using an interface between the base station and the terminal (Uu interface). In this case, the sidelink radio path using the scheduled resource may be called a sidelink mode 3 radio path, and the sidelink radio path using the UE-selected resource may be called a sidelink mode 4 radio path.

In an embodiment of the disclosure, it is applicable for a terminal to operate two kinds of modes, that is, a sidelink mode 3 (i.e., scheduled resource use mode) and a sidelink mode 4 (UE-selected resource use mode), in the case of using a sidelink radio path. For example, a terminal performing V2X communication in a Uu radio path may perform sidelink mode 3 based V2X communication after performing a radio path change procedure, or a terminal performing V2X communication in a Uu radio path may perform sidelink mode 4 based V2X communication after performing the radio path change procedure. As another example, a terminal performing sidelink mode 3 based V2X communication may perform Uu radio path based V2X communication after performing the radio path change procedure, or a terminal performing sidelink mode 3 based V2X communication may perform sidelink mode 4 based V2X communication after performing the radio path change procedure. As still another embodiment, a terminal performing sidelink mode 4 based V2X communication may perform Uu radio path based V2X communication after performing the radio path change procedure, or a terminal performing sidelink mode 4 based V2X communication may perform sidelink mode 4 based V2X communication after performing the radio path change procedure.

As described above, in the case of changing a Uu radio path based V2X communication path to the sidelink mode 4 based V2X communication path, or in the case of changing the sidelink mode 3 based V2X communication path to the sidelink mode 4 based V2X communication path, it may be exemplified that the sidelink mode 4 based V2X wireless resource congestion situation is better than the wireless resource congestion situation of the Uu radio path, or it may be exemplified that the sidelink mode 4 based V2X wireless resource congestion situation is better than the sidelink mode 3 based V2X wireless resource congestion situation.

Figure 1B:
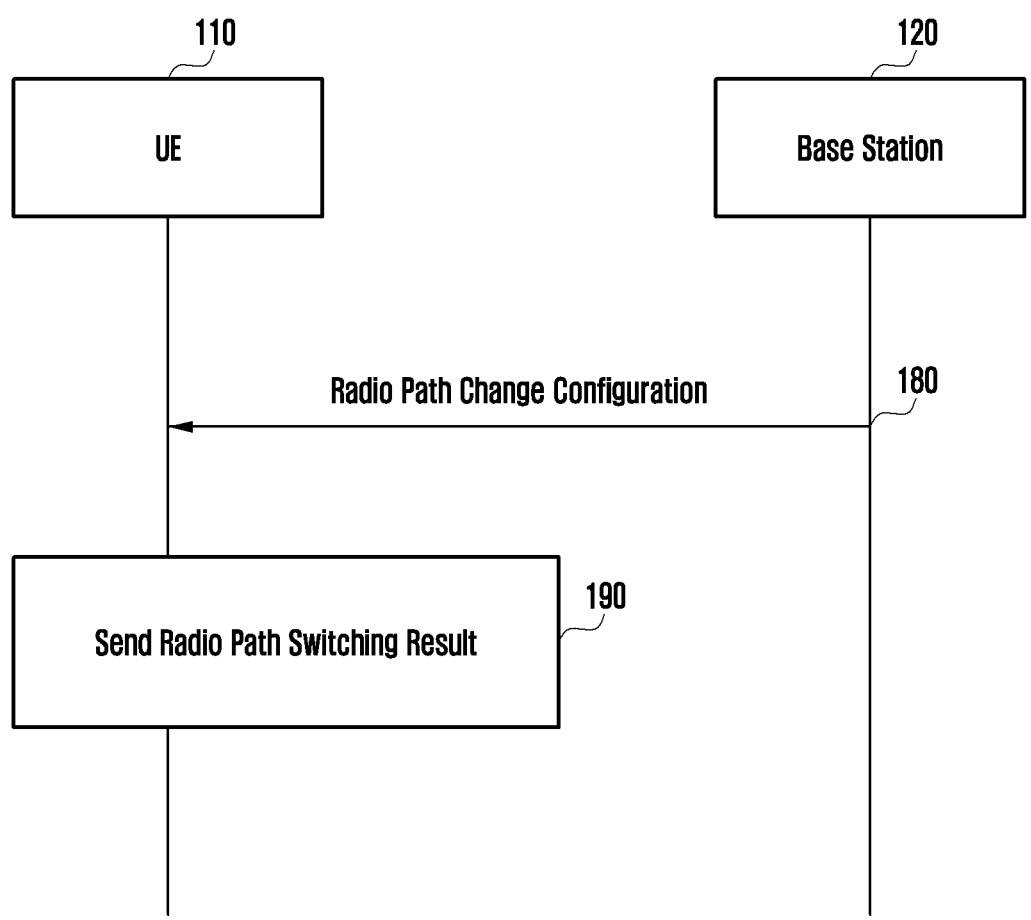
FIG. 1B is a diagram illustrating a signal flow between a terminal and a base station for changing a radio path to be used for V2X communication according to another embodiment of the disclosure.

FIG. 1A is a diagram illustrating a signal flow between a terminal and a base station for changing a radio path to be used for V2X communication according to an embodiment of the disclosure, and FIG. 1B is a diagram illustrating a signal flow between a terminal and a base station for changing a radio path to be used for V2X communication according to another embodiment of the disclosure.

In an embodiment of FIG. 1A, a signal flow between a terminal (UE) 110 for transmitting a radio path change determination and a base station 120 for receiving the radio path change determination from the terminal 110 is exemplified. Further, in an embodiment of FIG. 1B, a signal flow between the terminal 110 for transmitting radio path change request information and the base station 120 for receiving the radio path change request information from the terminal 110 and determining the radio path change is exemplified. Meanwhile, the radio path may be a sidelink radio path using a direct communication between the terminal 110 and another terminal (not illustrated), and an example of the radio path may be a Uu radio path using communication between the terminal 110 and the base station 120.

With reference to FIG. 1A, at operation 160, the terminal (UE) 110 may receive radio path change configuration information from the base station (BS, eNB, or evolved Node B). Further, at operation 170, the terminal 110 may determine the radio path change in accordance with the radio path change configuration information.

Further, with reference to FIG. 1B, the terminal 110, at operation 180, may receive the radio path change configuration information from the base station 120. Further, at operation 190, the terminal may transmit a radio path change request to the base station 120 in accordance with the radio path change configuration information.

This will be described in more detail.

According to an embodiment of FIG. 1A, the base station 120, at operation 160, may transmit configuration information for the terminal 110 to determine a radio path change (radio path change configuration information) with respect to 110. Information that may be included in the configuration information for the terminal 110 to determine the radio path change may be, for example, as follows.

The radio path change configuration information may include at least one of a time to determine a condition for changing a radio path, a condition for changing the radio path, or a configuration information indicator to be used to notify of performing of the radio path change.

An embodiment of time information to determine a condition for changing the radio path for the purpose of V2X communication may be a time when the terminal 110 should report the channel measurement situation to the base station 120. For example, if the channel state after the channel measurement is busy, the terminal 110 may report the channel measurement situation to the base station 120. In this case, the terminal 110 having determined that the channel state after the channel measurement is busy, at operation 170, may determine to change the radio path, and it may determine the change of the radio path.

As an embodiment to determine the condition for changing the radio path, the base station 120 may provide a channel situation measurement threshold value for changing the radio path to the terminal 110. Further, if the channel measurement value for the radio path being currently used for V2X communication is equal to or larger than the channel measurement threshold value for the radio path change provided by the base station 120, the terminal 110, at operation 170, may determine the radio path change.

As another embodiment, based on a service priority setup (e.g., priority setup for each packet) for the radio path change which the base station 120 has provided to the terminal 110, the terminal 110 may determine to change the radio path, and it may change the radio path.

As another embodiment, the base station 120 may provide a channel quality indicator (CQI) threshold value for determining the radio path change with respect to 110. Further, if the CQI value for the radio path being current used for the V2X communication is equal to or smaller than the CQI threshold value for the radio path change provided by the base station 120, the terminal 110 may determine the radio path change.

At operation 160, the configuration information for changing the radio path (radio path change configuration information) that the base station 120 provides to the terminal 110 may include at least one of the followings. For example, the configuration information may be whether a channel measurement situation report event occurs, a channel measurement situation threshold value for the radio path change (e.g., channel busy ratio threshold value (CBR_threshold)) (e.g., if the CBR is higher than the CBR_threshold, the terminal 110 may determine to change the radio path), a packet priority for the radio path change (e.g., prose per packet priority (PPPP) level, PPPP Level_threshold) (e.g., if the packet priority is higher than the predetermined PPPP level, the terminal 110 may determine to change the radio path to a stable radio path. For example, if the PPPP of the packet to be transmitted is 1, the terminal 110 may change the radio path to transmit the packet to a Uu radio path), a terminal type for the radio path change (e.g., vehicle terminal (UE), pedestrian UE, a road side unit (RSU) UE, or the like), a V2X data destination address for the radio path change (e.g., if the data destination address is a firehouse or a police station, the terminal 110 may determine to use a radio path having high stability), a terminal power threshold value for the radio path change (e.g., UE battery level), a priority of a V2X communication service (e.g., safety or non-safety), a CQI threshold value for the radio path change, an uplink channel signal threshold value (e.g., Uu uplink signal threshold value or sidelink signal threshold value), a parameter threshold value for data transmission (e.g., transmission power threshold value (Tx Power_thPower), modulation and coding scheme (MCS) level threshold value (MCS Level_thLevel), a resource block (RB) size threshold value (RB Size_thSize)), a DMRS threshold for the radio path change through a demodulation reference signal (DMRS) (an example of the DMRS threshold value may be the number of V2X packet decoding failures), or a sensing based resource selection threshold value (e.g., it may be threshold value information of a resource that can be selected by the terminal 110 for the data transmission and reception among sensed resources after the terminal senses the resource for the data transmission in a mode 4 sidelink radio path, and it may be indicated by a ratio (%) of selectable resources among the sensed resources or the number of selectable resources).

According to an embodiment, the radio path change configuration information transmitted at operation 160 may include random access preamble allocation information that can be used after the radio path change. The random access preamble may be a V2X dedicated preamble for the radio path changing terminal 110.

Further, according to an embodiment, the radio path change configuration information transmitted at operation 160 may include indication information indicating whether V2X communication can be performed using an exceptional pool while the terminal 110 changes the radio path, that is, until the V2X communication is performed using a new radio path. In this case, the terminal may perform the V2X communication using the exceptional pool for seamless communication until the new radio path is established.

According to an embodiment, a radio path change configuration information message may be transmitted to the terminal 110 as a UE dedicated message or system information.

Next, with reference to an embodiment of FIG. 1B, the base station 120, at operation 180, may transmit the radio path change configuration information for the terminal 110 to trigger the radio path change request to the terminal 110. In this case, information that can be included in the radio path change configuration information for the terminal 110 to determine the radio path change request may be, for example, as follows.

The radio path change configuration information may include at least one of a time to determine a radio path change condition, a condition for requesting the radio path change, or a configuration information indicator to be used to notify of performing of the radio path change.

An embodiment of time information to determine the condition for changing the radio path may be a time when the terminal 110 should report the channel measurement situation to the base station 120. For example, the terminal 110 determining that the channel state after the channel measurement is busy may determine to change the radio path, and at operation 190, the terminal 110 may transmit the radio path change request information to the base station 120.

As an embodiment to determine the condition for changing the radio path, the base station 120 may provide the channel situation measurement threshold value for changing the radio path to the terminal 110. Further, if the channel measurement value for the radio path being currently used for the V2X communication is equal to or larger than the channel measurement threshold value for the radio path change provided by the base station 120, the terminal 110, at operation 190, may transmit the radio path change request to the base station 120.

As another embodiment, based on the service priority setup (e.g., priority setup for each packet) for the radio path change which the base station 120 has provided to the terminal 110, the terminal 110, at operation 190, may transmit the radio path change request to the base station 120.

As another embodiment, the base station 120 may provide the CQI threshold value for determining the radio path change to the terminal 110. Further, if the CQI value for the radio path being current used for the V2X communication is equal to or smaller than the CQI threshold value for the radio path change provided by the base station 120, the terminal 110, at operation 190, may transmit the radio path change request information to the base station 120.

According to an embodiment, the radio path change configuration information transmitted at operation 180 may include random access preamble allocation information that the terminal 110 can use after the radio path change. The random access preamble may be a V2X dedicated preamble for the radio path change terminal 110.

Further, according to an embodiment, the radio path change configuration information transmitted at operation 180 may include indication information indicating whether the V2X communication can be performed using the exceptional pool while the terminal 110 changes the radio path, that is, until the V2X communication is performed using the new radio path.

According to an embodiment, the radio path change configuration information message may be transmitted to the terminal 110 as the UE dedicated message or the system information.

At operation 190, based on the radio path change request information transmitted by the terminal 110, the terminal 110 may determine to change the radio path. Further, the base station 120 may instruct the terminal 110 to perform the V2X communication through the changed radio path. As an embodiment, in the case where the terminal 110 is using the Uu radio path for the purpose of the V2X communication, the base station 120 having determined the radio path change of the terminal 110 may allocate a resource for the sidelink radio path V2X communication to the terminal. As another embodiment, in the case where the terminal 110 is using the sidelink radio path resource for the purpose of the V2X communication, the base station 120 having determined the radio path change of the terminal 110 may allocate the resource for the Uu radio path V2X communication to the terminal.

Figure 2:
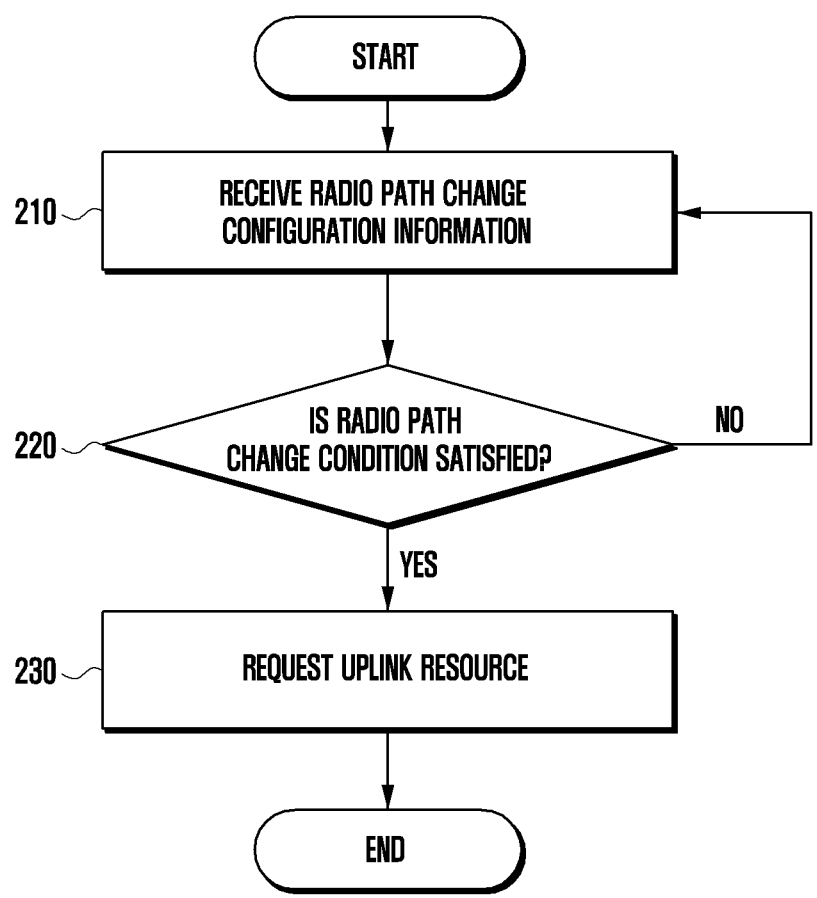
FIG. 2 is a diagram illustrating an example of an operation for a terminal to determine a condition for changing a radio path according to an embodiment of the disclosure.

FIG. 2 is a diagram illustrating an example of an operation for a terminal to determine a condition for changing a radio path according to an embodiment of the disclosure.

With reference to FIG. 2, the terminal 110, at operation 210, may receive the radio path change configuration information from the base station 120. Thereafter, the terminal 110, at operation 220, may determine whether the radio path change condition is satisfied. Thereafter, if the radio path change condition is satisfied, the terminal 110, at operation 230, may request uplink resource allocation from the base station 120. In this case, the uplink resource allocation request may be a resource allocation request for the Uu radio path, or it may be a resource allocation request for the sidelink radio path.

Meanwhile, as the condition on which the terminal 110 can determine the radio path change, at least one of the followings may be considered.

As an embodiment, if the radio path change determination condition of the terminal 110 is equal to the condition for the channel situation measurement report, the terminal 110 may request an uplink resource from the base station 120 at a time when the channel measurement situation report even occurs.

As another embodiment, if the channel measurement situation (e.g., channel congestion or the like) threshold value is configured as the radio path change determination condition of the terminal 110, the terminal 110 may measure the channel situation, and if the channel congestion is equal to or higher than the channel measurement situation threshold value, the terminal 110 may request the uplink resource from the base station 120.

As still another embodiment, if the prose per packet priority (PPPP) level is configured as the radio path change determination condition of the terminal 110, the terminal 110 may compare the priority of the packet to be transmitted with the PPPP level, and if the priority of the packet is equal to or higher than the PPPP level, the terminal 110 may request the uplink resource from the base station 120.

As still another embodiment, if the type of the terminal 110 (e.g., vehicle UE, pedestrian UE, RSU UE, or the like) is configured as the radio path change determination condition of the terminal 110, the terminal 110 may request the uplink resource from the base station 120 in accordance with the type of the terminal 110. For example, in the case where it is configured to perform the radio path change only with respect to the vehicle UE, only the vehicle UE may determine the radio path change, and it may request the uplink resource from the base station 120.

As still another embodiment, if the data transmission destination address is configured as the radio path change determination condition of the terminal 110, the terminal 110 may identify the destination address of the packet to be transmitted, and if the data transmission destination address configured as the radio path change determination condition coincides with the destination address of the packet to be transmitted, or if the data transmission destination address configured as the radio path change determination condition is within the destination address range of the packet to be transmitted, the terminal 110 may determine the radio path change for the packet transmission, and it may request the uplink resource from the base station 120.

As still another embodiment, if the power (e.g., terminal battery) threshold value is configured as the radio path change determination condition of the terminal 110, the terminal 110 may compare the power situation with the configured power threshold value, and if the power situation is equal to or smaller than the configured power threshold value, the terminal 110 may determine the radio path change, and it may request the uplink resource from the base station 120.

As still another embodiment, if the service priority (e.g., safety or non-safety) is configured as the radio path change determination condition of the terminal 110, the terminal 110 may compare the V2X service type with the service priority to determine the radio path change, and it may request the uplink resource from the base station 120. For example, if it is configured to perform the radio path change with respect to the safety service, the terminal 110 may determine the radio path change in the case where the terminal 110 performs the safety service, and it may request the uplink resource from the base station 120.

As still another embodiment, if the CQI threshold value is configured as the radio path change determination condition of the terminal 110, the terminal 110 may measure the CQI, and if the measured CQI is equal to or lower than the CQI threshold value, the terminal 110 may determine the radio path change, and it may request the uplink resource from the base station 120.

As still another embodiment, if the signal measurement of channels is configured as the radio path change determination condition of the terminal 110, the terminal 110 may determine the radio path change by comparing the channel signal measurement results with each other. For example, the base station 120 may provide, to the terminal 110, the uplink channel signal threshold value between the terminal 110 and the base station 120 (e.g., Uu Link Signal_Threshold) or the direct communication channel signal threshold value between the terminals 110 (e.g., Sidelink_signal_threshold) as the radio path change condition. In this case, an example of the channel signal measurement value may be a signal-to-interference-plus-noise ratio (SINR) level, a signal to noise ratio (SNR) level, or a reference signals received power (RSRP) value. For example, if the terminal performs the V2X communication using the Uu radio path resource, the terminal 110 may compare the uplink channel signal measurement value with the base station 120 with the uplink channel signal threshold value between the terminal 110 and the base station 120 (e.g., Uu Link Signal_Threshold). Further, if the uplink channel signal measurement value with the base station 110 is smaller than the threshold value, the terminal 110 may determine to change the radio path for the purpose of the V2X to the sidelink radio path, and it may request the uplink (sidelink) resource from the base station 120. As another example, if the terminal 110 is performing the V2X communication using the sidelink radio path resource, the terminal 110 may compare the channel signal measurement value of the direct communication channel (e.g., sidelink radio path) between the terminals 110 with the direct communication channel signal threshold value between the terminals 110 (e.g., Sidelink_signal_threshold). Further, if the direct communication channel signal measurement value between the terminals 110 is smaller than the threshold value, the terminal 110 may determine to change the radio path for the purpose of the V2X to the Uu radio path, and it may request the uplink (Uu radio path) resource from the base station 120. As another example, the terminal 110 may determine the path change to a radio link having a relatively large channel signal measurement value by comparing the uplink channel signal measurement value between the terminal 110 and the base station 120 with the direct communication channel signal measurement value between the terminals 110, and it may request the uplink resource for the determined new radio path from the base station 120.

As still another embodiment, the terminal 110 may measure the direct communication channel (sidelink radio path) between the terminals 110, and if it is determined that it is not possible to use the direct communication channel between the terminals 110, the terminal 110 may request the uplink resource from the base station 120. For example, as a method for measuring the direct communication channel signal between the terminals 110, DMRS decoding may be used. In this case, if the terminal 110 has failed the DMRS decoding, the terminal 110 may determine the radio path change, and it may request the uplink resource from the base station 120. Immediately after the DMRS decoding failure, the terminal 110 may determine the radio path change and it may request the uplink resource from the base station 120, or it may count the number of the DMRS decoding failures. If the number of the DMRS decoding failures reaches a specific number, the terminal 110 may determine the radio path change, and it may request the uplink resource from the base station 120.

As still another embodiment, in accordance with the channel measurement situation measured by the terminal 110 and the priority (e.g., PPPP) of the V2X packet to be transmitted, the terminal 110 may determine the radio path change, and it may request the uplink resource from the base station 120. For example, in the case where it is determined that the channel measurement situation measured by the terminal 110 is busy, and the priority (PPPP) of the V2X data packet to be transmitted by the terminal 110 is high (e.g., in the case where the PPPP class is 1), the terminal may determine the radio path change, and it may request the uplink resource from the base station 120.

As still another embodiment, if a parameter used by the terminal 110 for V2X data transmission (e.g., Tx power, MCS level, or resource block (RB) size) is equal to or smaller than a parameter threshold value for the radio path change condition provided by the base station 120 through the radio path configuration information, the terminal 110 may determine the radio path change, and it may request the uplink resource from the base station 120. For example, the terminal 110 may determine a data transmission power using Tx power among parameters included in cbr-pssch-TxConfigList used in an LTE system for data transmission. In this case, the terminal 110 may compare Tx power with the threshold value of the parameters for the radio path change condition provided by the base station 120 through the radio path configuration information, for example, Tx Power_thPower among Tx Power_thPower, MCS Level_thLevel, and RB Size_thSize. Further, if Tx power is smaller than Tx_Power_thPower, the terminal 110 may determine the radio path change, and it may request the uplink resource from the base station 120. Further, even with respect to MCS or RB, the terminal 110 may determine the radio path change through the above-described method, and it may request the uplink resource from the base station 120.

As still another embodiment, if it is determined that the resource situation that is selectable among sensed resources is equal to or smaller than the threshold value of the selectable resource provided from the radio path configuration information when the terminal 110 performs resource sensing for the V2X data transmission, the terminal 110 may determine the radio path change, and it may request the uplink resource from the base station 120. For example, the terminal 110 may identify what % (x %) or how many (the number of x) resources among all the resources can be used through resource sensing (e.g., scheduling assignment (SA) decoding or energy detection) by the terminal 110 for the V2X data transmission. Further, if the selectable resource is equal to or smaller than the threshold value of the selectable resource (Resource_SelcTh, e.g., x_th % or x_th number of resources may be configured) among radio path change conditions provided by the base station 120 through the radio path change configuration information, the terminal 110 may determine the radio path change, and it may request the uplink resource from the base station 120.

In the disclosure, the terminal 110 may determine whether to change the radio path through a combination including one or more embodiments of the above-described conditions.

According to an embodiment, the uplink resource allocation request may be used as an indicator indicating that the terminal 110 has determined the change of the radio path for V2X communication. While transmitting the uplink resource allocation request to the base station 120, the terminal 110 may prepare to perform the V2X communication through a new radio path. Here, the operation of requesting the uplink resource from the base station 120 may be an operation in which the terminal 110 transmits an indicator (e.g., whether to use a Uu interface or the like) to transfer the radio path to the base station through a network or an operation to request the uplink resource.

As an embodiment, if the terminal 110 is using the Uu radio path for the purpose of V2X communication, the base station 120 having received the uplink resource allocation indicator of the terminal 110 may allocate a resource for sidelink V2X communication to the terminal 110. As another embodiment, if the terminal 110 is using the sidelink radio path resource for the purpose of V2X communication, the base station 120 having received the uplink resource allocation indicator of the terminal 110 may allocate a resource for Uu radio path V2X communication to the terminal 110. As another embodiment, if the terminal 110 is using the sidelink mode 3 resource for the purpose of V2X communication, the base station 120 having received the uplink resource allocation indicator of the terminal 110 may allocate a resource for Uu radio path V2X communication to the terminal 110. As another embodiment, if the terminal 110 is using the sidelink mode 4 resource for the purpose of V2X communication, the base station 120 having received the uplink resource allocation indicator of the terminal 110 may allocate a sidelink mode 3 resource to the terminal 110. As another embodiment, if the terminal 110 is using a resource for Uu radio path V2X communication for the purpose of V2X communication, the base station 120 having received the uplink resource allocation indicator of the terminal 110 may allocate the sidelink mode 3 resource to the terminal 110. As another embodiment, if the terminal 110 is using a resource for Uu radio path V2X communication for the purpose of V2X communication, the base station 120 having received the uplink resource allocation indicator of the terminal 110 may allocate the sidelink mode 4 resource to the terminal 110. As another embodiment, if the terminal 110 is using the sidelink mode 3 resource for the purpose of V2X communication, the base station 120 having received the uplink resource allocation indicator of the terminal 110 may allocate the sidelink mode 4 resource to the terminal 110. As another embodiment, if the terminal 110 is using the sidelink mode 4 resource for the purpose of V2X communication, the base station 120 having received the uplink resource allocation indicator of the terminal 110 may allocate a resource for Uu radio path V2X communication to the terminal 110.

Figure 3:
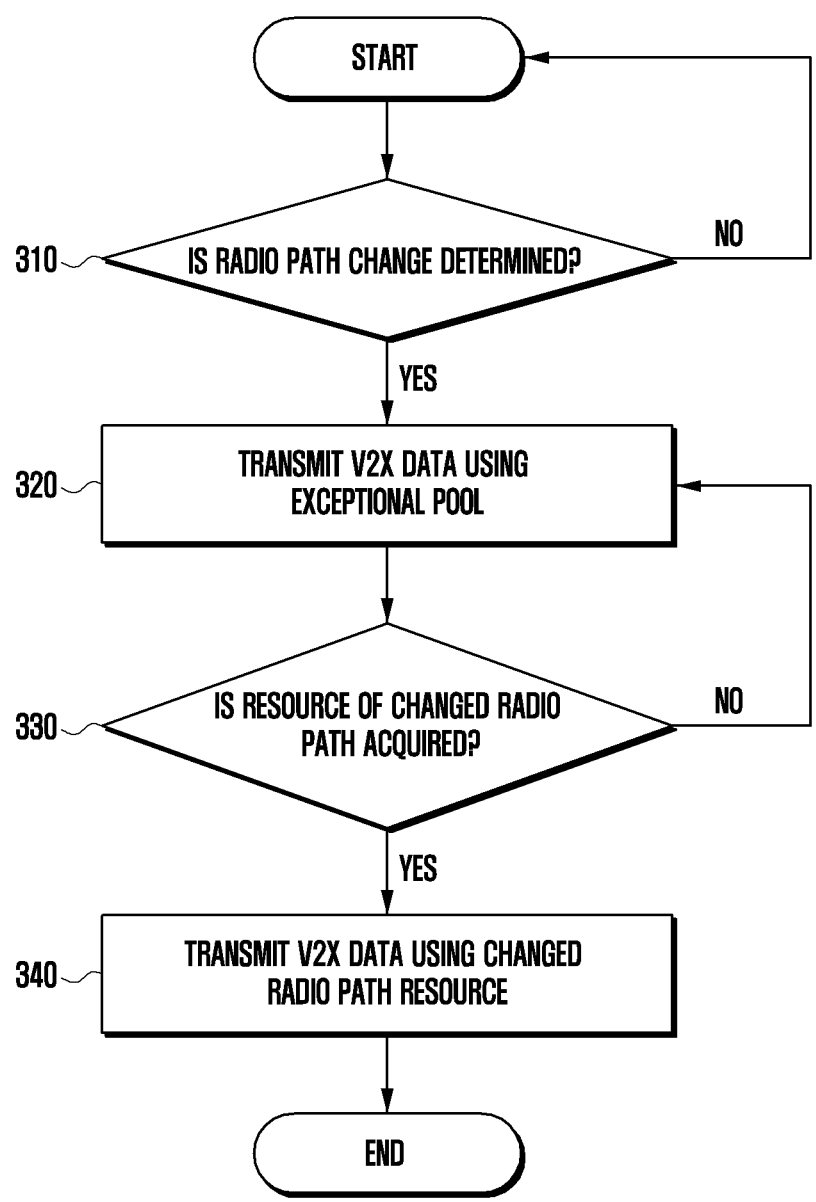
FIG. 3 is a diagram illustrating an embodiment in which a terminal uses an exceptional pool for minimizing data delay while performing a radio path change according to an embodiment of the disclosure.

FIG. 3 is a diagram illustrating an embodiment in which a terminal uses an exceptional pool for minimizing data delay while performing a radio path change according to an embodiment of the disclosure.

With reference to FIG. 3, the terminal 110 may determine whether the terminal 110 can use an exceptional pool during the radio path change with reference to information indicating whether the exceptional pool is used among V2X radio path change configuration information transmitted by the base station 120 at operation 160 or 180 in FIG. 1A or 1B as described above.

In this case, at operation 310, the terminal 110 may determine whether to change the V2X radio path. Because the radio path change procedure at operation 310 has been described with reference to FIGS. 1A, 1B, and 2, the detailed explanation thereof will be omitted. If the terminal 110 determines to change the V2X radio path at operation 310 and it is determined that information on the exceptional pool to be used during the radio path change is received from the base station 120, the terminal 110, at operation 320, may transmit V2X data using the exceptional pool.

Thereafter, at operation 330, the terminal 110 may determine whether the resource is allocated from the base station 120 through the changed radio path. For example, if the terminal determines to change the radio path to the Uu radio path (embodiment of FIG. 1A), or if the base station 120 determines to change the radio path to the Uu radio path in accordance with the information received from the terminal 110 (embodiment of FIG. 1B), or if the radio path setup is completed and the terminal 110 transmits a complete message to the base station 120, it may be determined that the resource has been allocated through the changed radio path.

If it is determined that the terminal 110 has been allocated with the changed radio path resource from the base station 120 at operation 330, the terminal 110, at operation 340, may stop the use of the exceptional pool, and it may transmit the V2X data using the resource allocated in accordance with the radio path change from the base station 120. An embodiment of signaling capable of knowing whether the resource allocation in the change radio path is acquired may be a radio resource control (RRC) connection reconfiguration complete message or uplink grant (UL Grant) signaling.

Next, an embodiment in which the terminal 110 determines the radio path change in a state where the Uu radio path of the terminal 110 is in an idle mode, and the terminal 110 requests a resource to be used in the changed radio path from the base station 120 will be described with reference to FIGS. 4 to 7.

Figure 4:
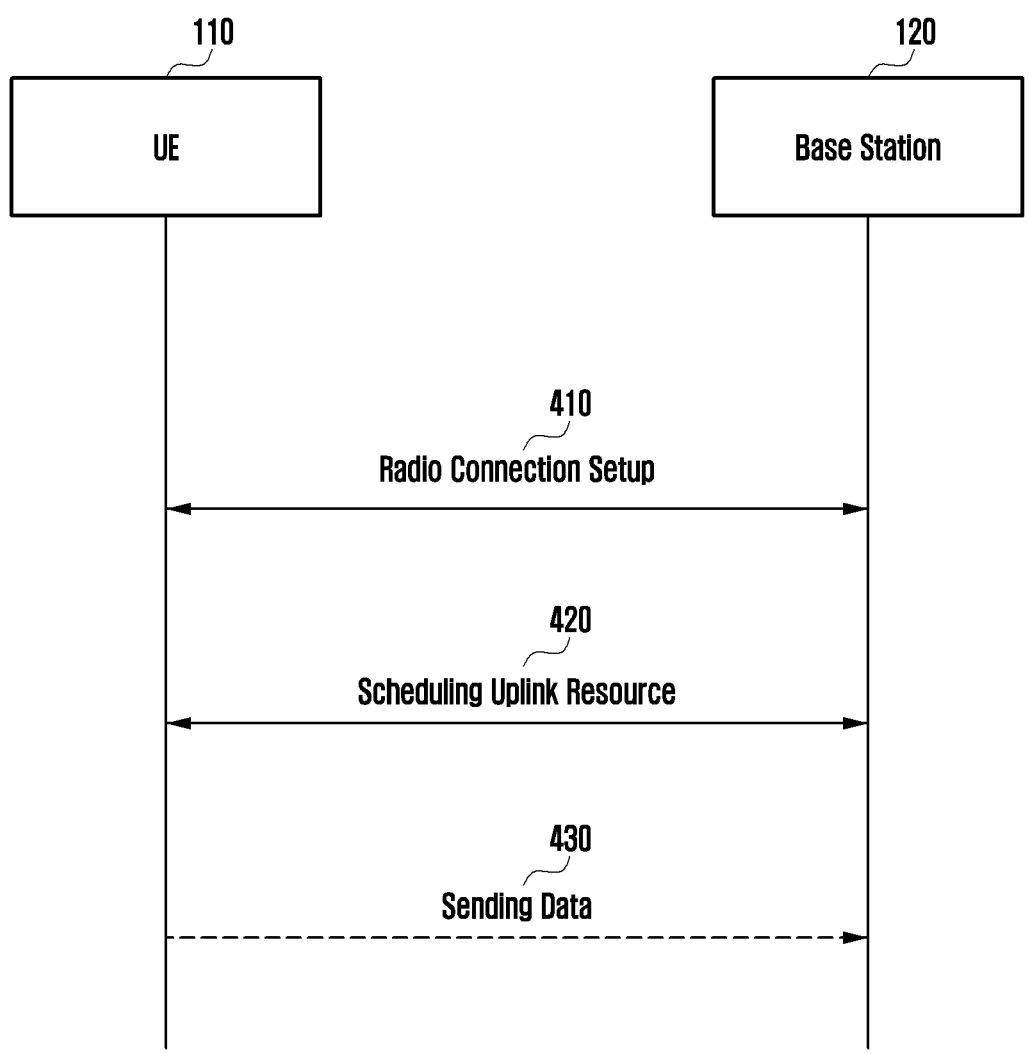
FIG. 4 is a diagram illustrating an embodiment of a radio path change signal flow if a Uu radio path of a terminal is in an idle mode in a method for requesting an uplink resource according to an embodiment of the disclosure.

FIG. 4 is a diagram illustrating an embodiment of a radio path change signal flow if a Uu radio path of a terminal is in an idle mode in a method for requesting an uplink resource according to an embodiment of the disclosure.

In an embodiment of FIG. 4, a terminal may perform V2X communication with another terminal using a sidelink.

In this case, the terminal may determine radio path change from a sidelink radio path to a Uu radio path, and then it may transmit a radio connection setup message (signal) to the base station 120. For example, the radio connection setup message may correspond to an RRC connection setup operation through a random access in the case of an LIE system.

After the radio connection, the terminal 110, at operation 420, may transmit a message (signaling) for requesting an uplink resource to the base station 120. Allocation of the uplink resource through transmission of the uplink resource request message may correspond to an operation of being allocated with the uplink resource from the base station 120 as much as the amount of data to be transmitted by the terminal 110 by transferring a buffer status report (BSR) to the base station 120 after a scheduling request, for example, in an LTE system.

Further, at operation 430, the terminal 110 may transmit the V2X data to the base station 120 using the Uu radio path resource for V2X allocated from the base station 120.

Figure 5:
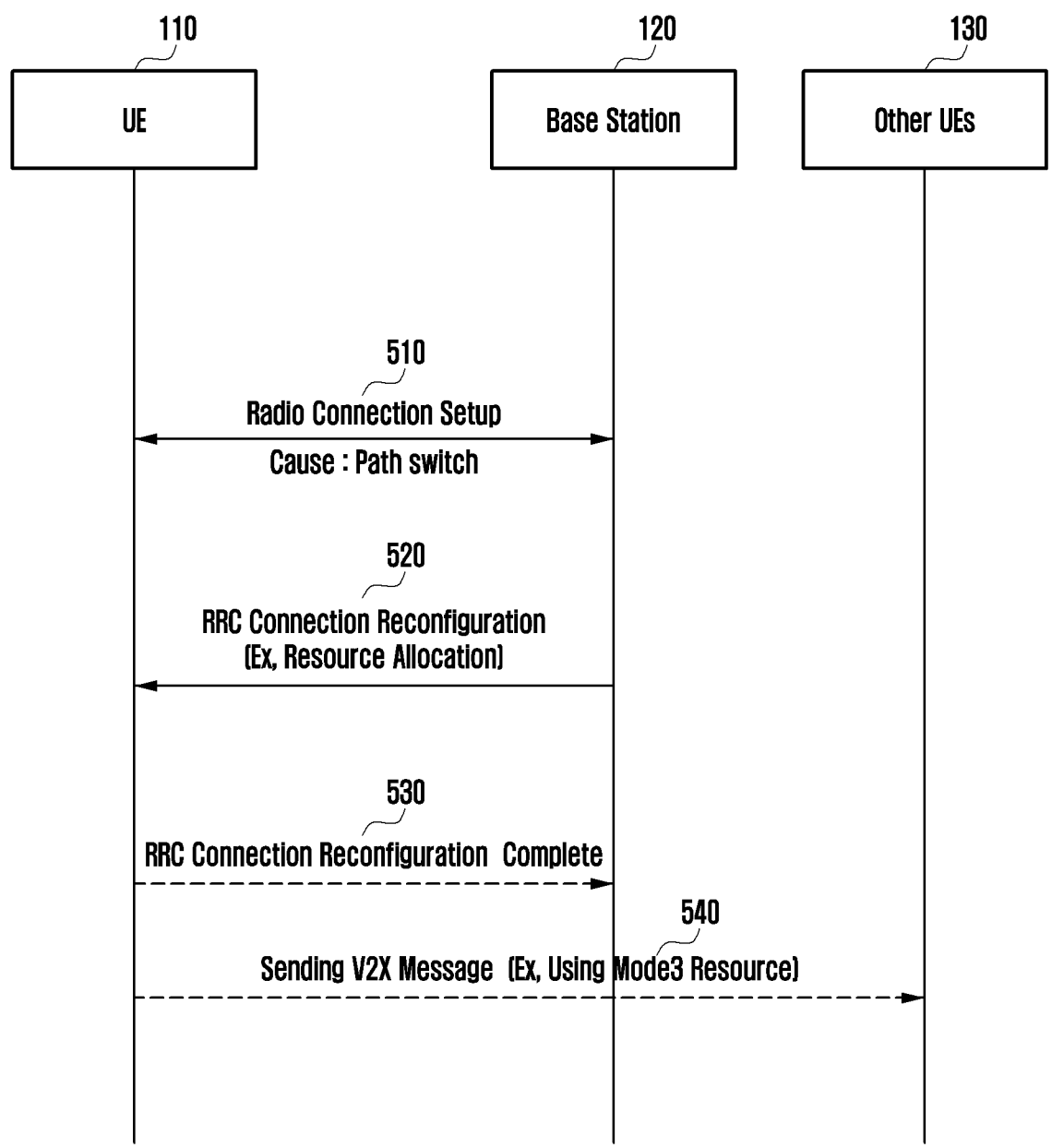
FIG. 5 is a diagram illustrating another embodiment of a radio path change signal flow if a Uu radio path of a terminal is in an idle mode in a method for requesting an uplink resource according to an embodiment of the disclosure.

FIG. 5 is a diagram illustrating another embodiment of a radio path change signal flow if a Uu radio path of a terminal is in an idle mode in a method for requesting an uplink resource according to an embodiment of the disclosure.

In an embodiment of FIG. 5, it is exemplified that the terminal 110 using the sidelink mode 4 radio resource determines the radio path change to the sidelink mode 3.

After determining the radio path change from the sidelink mode 4 to the sidelink mode 3, the terminal 110, at operation 510, may transmit a radio connection setup message to the base station 120. For example, in the LTE system, the radio connection setup message may correspond to an RRC connection setup operation through the random access. In this case, the terminal 110 may transmit, to the base station 120, the RRC connection setup message including the radio path change (e.g., path switch) as the RRC connection setup cause.

If the base station 120 receives the radio path change occurrence information as the RRC connection setup cause at operation 510, the base station 120, at operation 520, may allocate, to the terminal 110, a sidelink scheduling resource (e.g., sidelink mode 3) designated to the terminal 110 through an RRC connection reconfiguration message. That is, if the RRC connection setup message is received, the base station 120 may allocate only the resource having a size enough for the terminal 110 to transmit an RRC connection reconfiguration complete message to the terminal 110 through the RRC connection reconfiguration message. However, if the RRC connection setup cause indicates the radio path change in V2X as in the disclosure, the base station 120 may allocate, to the terminal 110, the resource having a predetermined size to be used in the V2X (e.g., sidelink mode 3).

Thereafter, at operation 530, the terminal 110 may transmit the RRC connection reconfiguration complete message to the base station 120.

At operation 540, the terminal 110 may transmit the V2X data to another terminal 130 through the sidelink scheduling resource (e.g., sidelink mode 3) designated to the terminal 110 at operation 520.

Figure 6:
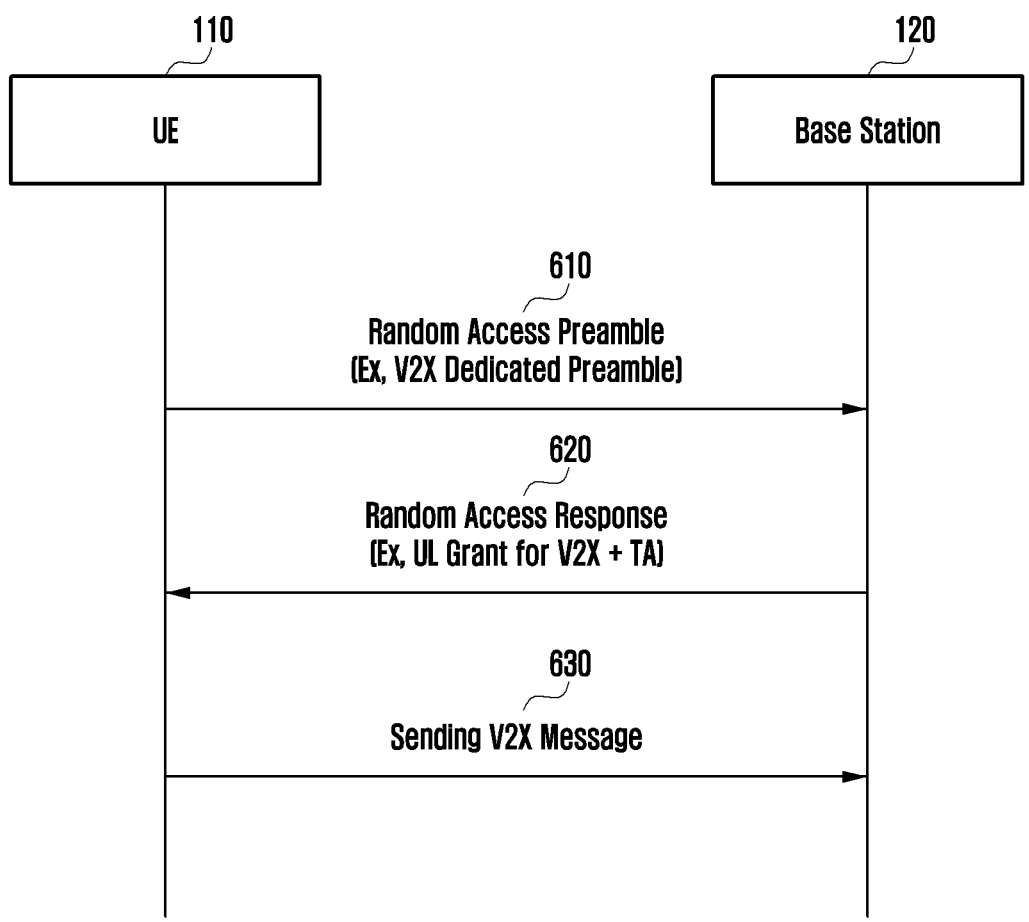
FIG. 6 is a diagram illustrating an embodiment in which data is transmitted using a random access if a terminal performing V2X communication using a sidelink wireless resource performs radio path change to a Uu radio path according to an embodiment of the disclosure.

FIG. 6 is a diagram illustrating an embodiment in which data is transmitted using a random access if a terminal performing V2X communication using a sidelink wireless resource performs radio path change to a Uu radio path according to an embodiment of the disclosure.

As described above with reference to FIG. 1A, the terminal 110 may receive a random access preamble (e.g., V2X dedicated preamble) for being transmitted to the base station during the radio path change through the radio path change configuration information. Accordingly, the terminal 110 may be aware of the random access preamble for being transmitted to the base station 120 during the radio path change. At operation 610, in the case of performing the random access for the radio path change, the terminal 110 may transmit the random access preamble to the base station 120 using the random access preamble for the radio path change.

The terminal 110 may perform the V2X communication using the sidelink radio path in a Uu radio path idle mode. In this case, if the V2X dedicated preamble is received from the terminal 110, the base station 120 may include at least one of uplink grant (UL grant) information pre-allocated for the V2X (e.g., using pre-engaged resource size) through timing advanced information in a random access response message to be transmitted to the terminal 110 at operation 620.

If the random access response message is received from the base station 120, the terminal 110, at operation 630, may transmit a V2X message to the base station 120 using UL grant information indicated in the random access response message. According to an embodiment of FIG. 6, the terminal 110 may perform non-contention type data transmission to the base station 120. The embodiment of FIG. 6 may provide a method in which the terminal 110 that is unable to configure the Uu radio path for the purpose of V2X can transmit the V2X data without the Uu radio path setup procedure.

Meanwhile, according to the embodiment of FIG. 5, it is exemplified that the base station 120 allocates the radio resource to the terminal 110 in the RRC connection process after completion of a RACH procedure, and according to the embodiment of FIG. 6, it is exemplified that the base station 120 allocates the radio resource to the terminal 110 during the RACH procedure.

Figure 7:
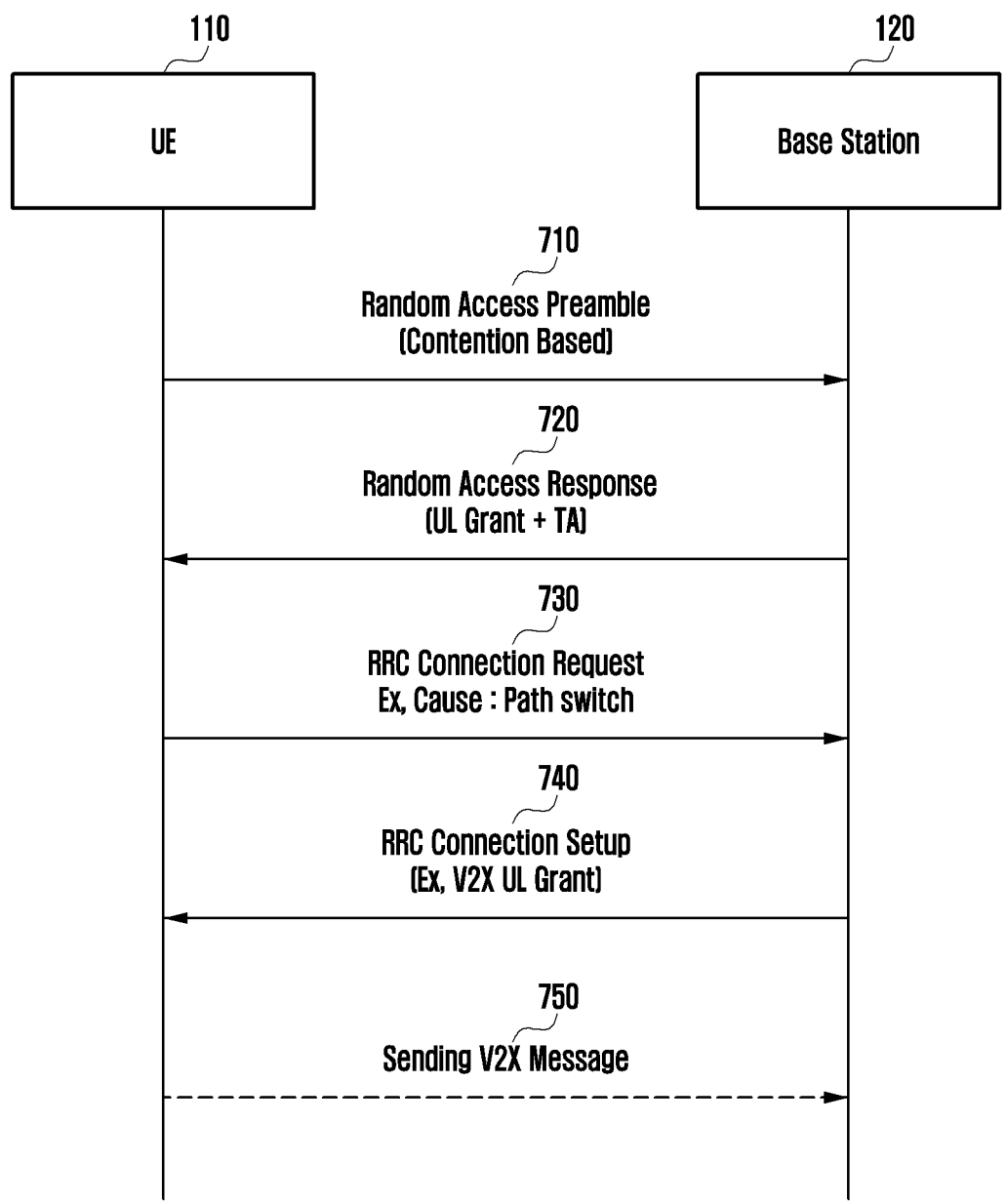
FIG. 7 is a diagram illustrating another embodiment in which data is transmitted using a random access if a terminal performing V2X communication using a sidelink wireless resource performs radio path change to a Uu radio path according to an embodiment of the disclosure.

FIG. 7 is a diagram illustrating another embodiment in which data is transmitted using a random access if a terminal performing V2X communication using a sidelink wireless resource performs radio path change to a Uu radio path according to an embodiment of the disclosure.

While performing the V2X communication using the sidelink radio resource, the terminal 110 may determine the radio path change to the Uu radio path. At operation 710, the terminal 110 may transmit the random access preamble to the base station 120. In this case, the terminal 110 may perform the V2X communication using the sidelink radio path in the Uu radio path idle mode.

At operation 720, the base station 120 may transmit the random access response message to the terminal 110. In this case, the random access response message may include at least one of UL grant or timing advanced information.

Thereafter, at operation 730, the terminal 110 may transmit the RRC connection request message to the base station 120 using the received UL grant information. Here, the terminal 110 may include information indicating that the RRC connection request is caused by the radio path change (Cause: path switch) in the RRC connection request message to be reported to the base station 120.

If the radio path change information is included in the RRC connection request message transmitted by the terminal 110, the base station 120, at operation 740, may allocate V2X UL grant (e.g., using pre-engaged resource size) information to the RRC connection setup message to be transmitted to the terminal 110. At operation 750, the terminal 110 may transmit the V2X message to the base station 120 using the V2X UL grant allocated through the RRC connection setup.

Next, with reference to FIGS. 8 to 12, a case will be described, in which the terminal 110 determines the necessity of the radio path change and it transmits the radio path change request information to the base station 120 in a state where the Uu radio path of the terminal 110 is in an idle mode, and the base station 120 determines the radio path change of the terminal 110. Meanwhile, in embodiments of FIGS. 8 to 12, configuration information, parameter, and determination condition that the terminal 110 can apply in determining the necessity of the radio path change may be equal to the configuration information, parameter, and determination condition as described above with reference to FIGS. 1A to 2.

Figure 8:
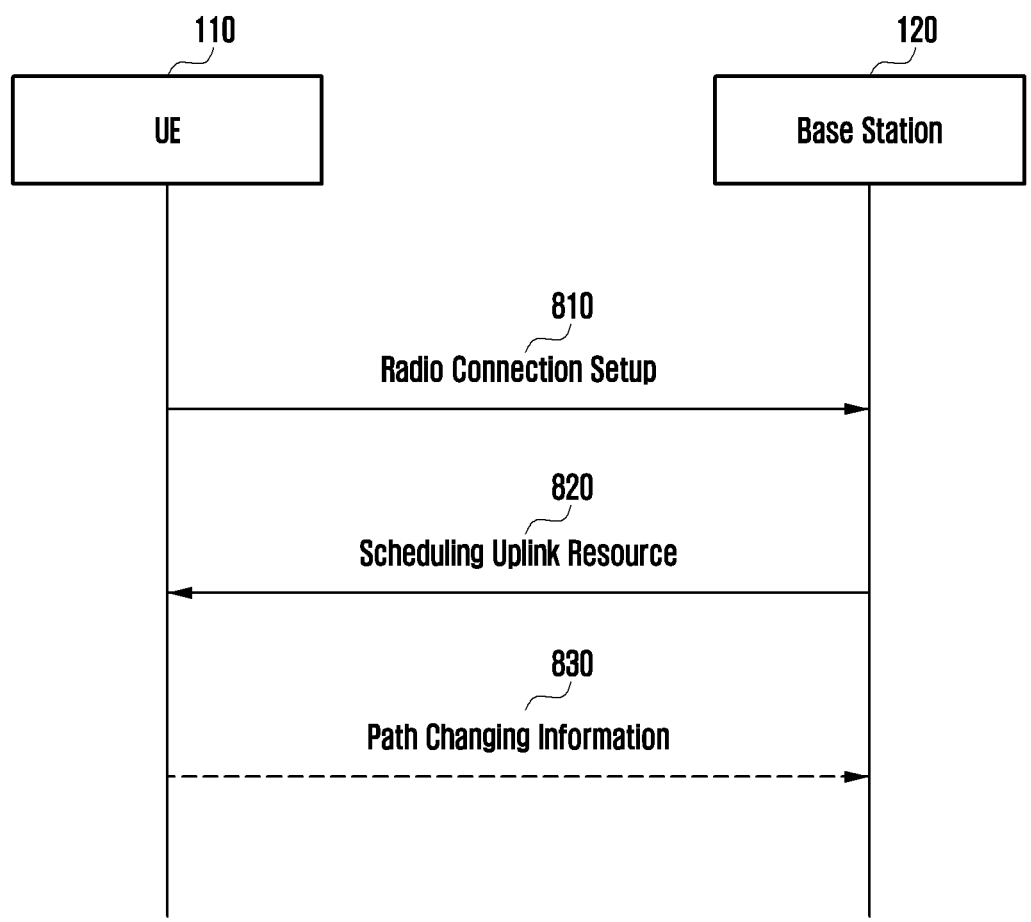
FIG. 8 is a diagram illustrating an example of a signal flow for a base station to transmit radio path change information of a terminal for determining the radio path change according to an embodiment of the disclosure.

FIG. 8 is a diagram illustrating an example of a signal flow for a base station to transmit radio path change information of a terminal for determining the radio path change according to an embodiment of the disclosure.

An operation in FIG. 8 indicates a method in which the Uu radio path of the terminal 110 changes its state to a connected mode in a state where the Uu radio path of the terminal 110 is in an idle mode, and the terminal 110 transmits the radio path change request information to the base station 120. In an embodiment of FIG. 8, the terminal 110 may transmit path changing information to the base station 120 using the Uu radio path.

If the terminal 110 determines to transmit the radio path change request information to the base station 120, the terminal 110, at operation 810, may transmit the radio connection setup message (signal) to the base station 120 in order to transmit the radio path change request information. For example, the radio connection setup message may correspond to the RRC connection setup operation through the random access in the case of an LIE system.

After the radio connection setup, the terminal 110, at operation 820, may transmit a message (signaling) for requesting the uplink resource to the base station 120. Allocation of the uplink resource through transmission of the uplink resource request message may correspond to an operation of being allocated with the uplink resource from the base station 120 as much as the amount of data to be transmitted by the terminal 110 by transferring the buffer status report to the base station 120 after the scheduling request, for example, in an LIE system.

Further, at operation 830, the terminal 110 may transmit the path changing information including the radio path change request information to the base station 120 using the resource allocated from the base station 120 (e.g., Uu radio path in the case of the LIE system).

Figure 9:
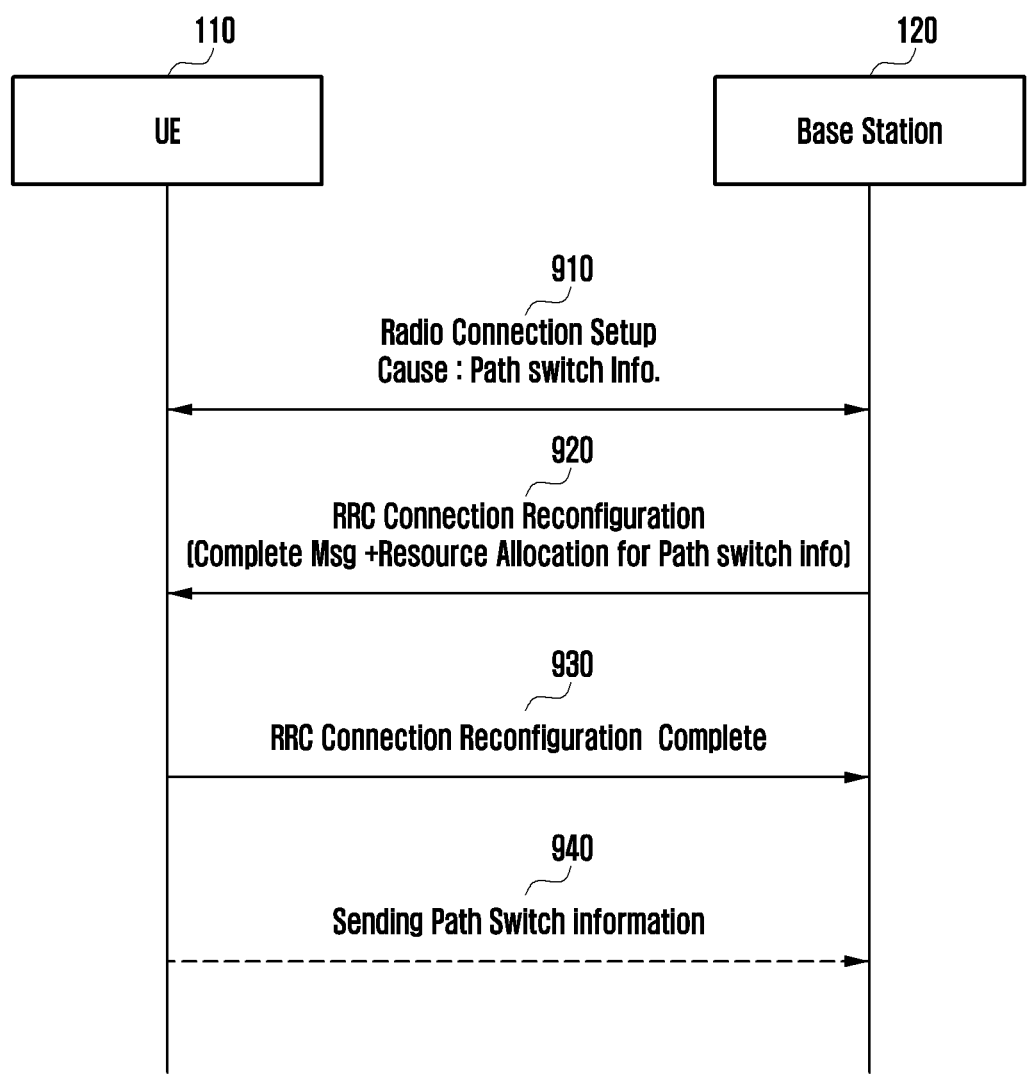
FIG. 9 is a diagram illustrating an example of a signal flow for a base station to transmit radio path change information of a terminal for determining the radio path change according to an embodiment of the disclosure.

FIG. 9 is a diagram illustrating an example of a signal flow for a base station to transmit radio path change information of a terminal for determining the radio path change according to an embodiment of the disclosure.

FIG. 9 illustrates another embodiment of a signal flow in which the Uu radio path of the terminal 110 changes its state to a connected mode in a state where the Uu radio path of the terminal 110 is in an idle mode, and the terminal 110 transmits the radio path change request information to the base station 120. In an embodiment of FIG. 9, the terminal 110 may use the RRC connection reconfiguration message in the RRC connection procedure in order to transmit the radio path change request information.

After determining to transmit the radio path change request information to the base station 120, the terminal 110, at operation 910, may transmit the radio connection setup message to the base station 120. For example, the radio connection setup message may correspond to the RRC connection setup operation through the random access in the case of an LTE system. In this case, the terminal 110 may include the radio path change (e.g., path switch information request) in the RRC connection setup message to be transmitted to the base station 120 as the RRC connection setup cause.

At operation 910, if the base station 120 receives the radio path change information request (path switch information request) as the RRC connection setup cause, the base station 120, at operation 920, may allocate the scheduling resource designated for transmission of the radio path change request information to the terminal 110 through the RRC connection reconfiguration message.

After transmitting an RRC connection reconfiguration setup complete message at operation 930, the terminal 110, at operation 940, may transmit path changing information including the radio path change request information to the base station 120 using the resource allocated at operation 920.

As another embodiment, the terminal may include the path changing information in the RRC connection reconfiguration setup complete message to be transmitted to the base station 120.

Figure 10:
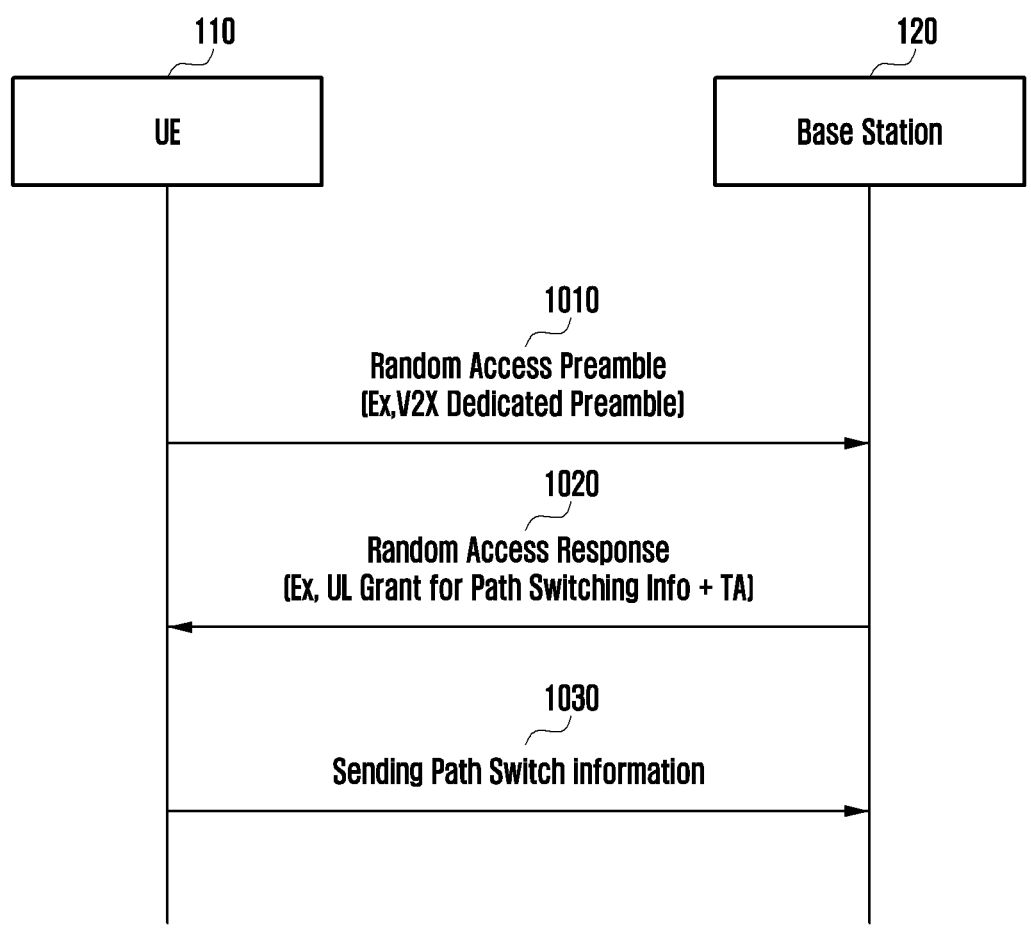
FIG. 10 is a diagram illustrating an embodiment in which radio path change request information is transmitted using a random access if a terminal performing V2X communication using a sidelink wireless resource performs radio path change to a Uu radio path.

FIG. 10 is a diagram illustrating an embodiment in which radio path change request information is transmitted using a random access if a terminal performing V2X communication using a sidelink wireless resource performs radio path change to a Uu radio path.

As described above with reference to FIG. 1B, if the terminal 110 determines to transmit the radio path change request information, the terminal 110 may receive the random access preamble (e.g., V2X dedicated preamble) for being transmitted to the base station through the radio path change configuration information. Accordingly, in the case of determining to transmit the radio path change request information, the terminal 110 may be aware of the random access preamble for transmitting the radio path change request information to the base station 120. At operation 1010, terminal 110 may transmit the random access preamble to the base station 120 using the random access preamble for the radio path change.

If the V2X dedicated preamble is received from the terminal 110, the base station 120 may include at least one of UL grant information (e.g., using a pre-engaged resource size) pre-allocated for the V2X or timing advanced information in the random access response message to be transmitted to the terminal at operation 1020. In this case, the size of the resource allocated in accordance with the UL grant may be a size for transmitting the radio path change request information, and the size may be preconfigured. If the random access response message is received from the base station 120, the terminal 110, at operation 1030, may transmit the path changing information including the radio path change request information to the base station 120 using the UL grant information indicated in the random access response message. According to an embodiment of FIG. 10, the terminal 110 may perform non-contention type data transmission to the base station 120. The embodiment of FIG. 10 may provide a method in which the terminal 110 that is unable to configure the Uu radio path for the purpose of V2X can transmit the radio path change request information without the Uu radio path setup procedure.

Figure 11:
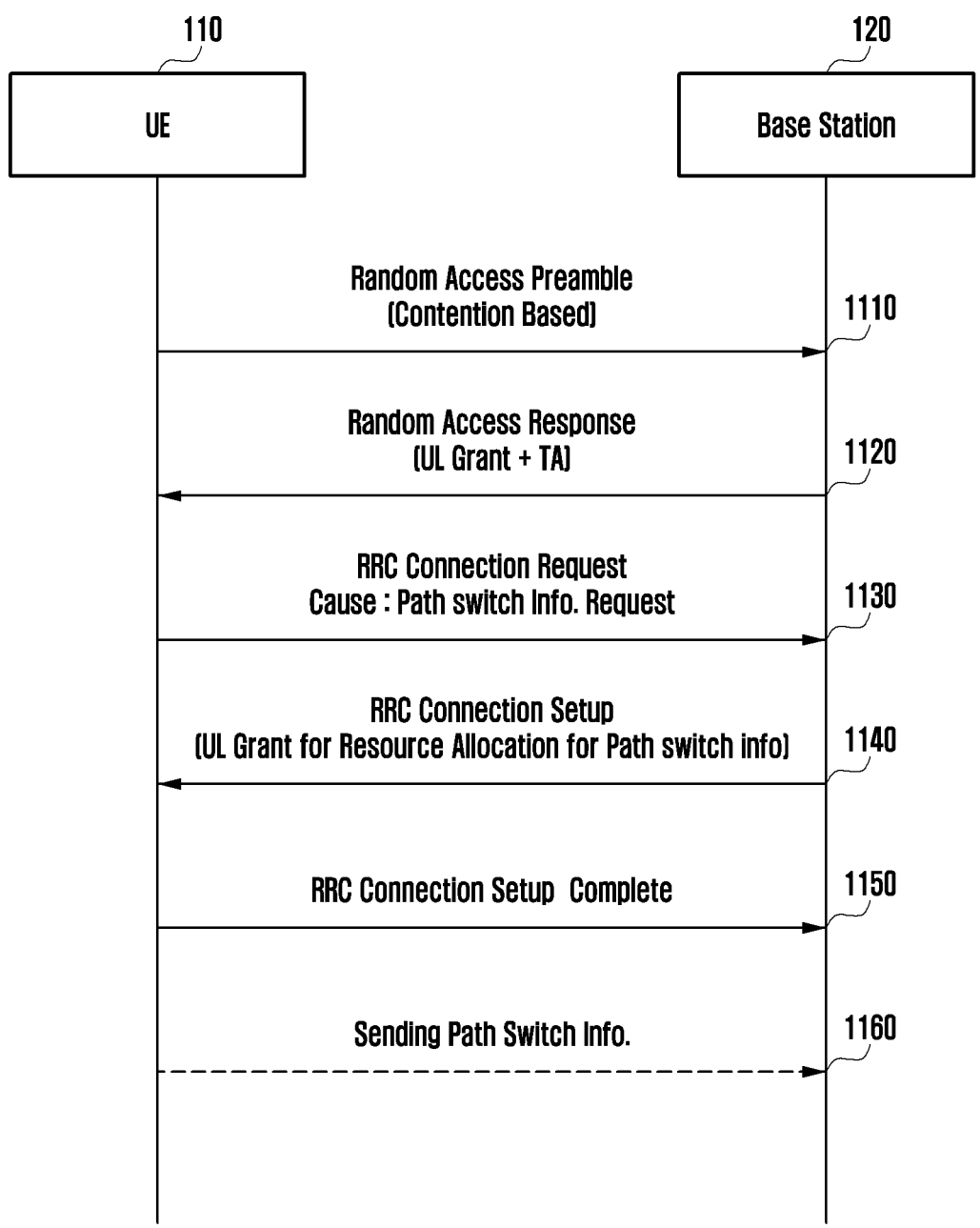
FIG. 11 is a diagram illustrating another embodiment in which radio path change request information is transmitted using a random access if a terminal performing V2X communication using a sidelink wireless resource performs radio path change to a Uu radio path.

FIG. 11 is a diagram illustrating another embodiment in which radio path change request information is transmitted using a random access if a terminal performing V2X communication using a sidelink wireless resource performs radio path change to a Uu radio path.

While performing the V2X communication using the sidelink radio resource, the terminal 110 may determine to transmit the radio path change request information to the base station 120. Further, at operation 1110, the terminal 110 may transmit the random access preamble to the base station 120. In this case, the terminal 110 may perform the V2X communication using the sidelink radio path in the Uu radio path idle mode.

At operation 1120, the base station 120 may transmit the random access response message to the terminal 110. In this case, the random access response message may include at least one of UL grant or timing advanced information.

Thereafter, at operation 1130, the terminal 110 may transmit the RRC connection request message to the base station 120 using the received UL grant information. Here, the terminal 110 may include information indicating that the RRC connection request is caused by transmission of the radio path change request information (cause: path switch info. request) in the RRC connection request message to be reported to the base station 120.

If information on the transmission of the radio path change request information is included in the RRC connection request message transmitted by the terminal 110, the base station 120 may allocate V2X UL grant (e.g., using pre-engaged resource size) information to the RRC connection setup message to be transmitted to the terminal 110 in order to transmit the radio path change request information. At operation 1150, the terminal 110 may transmit the RRC connection setup complete message.

At operation 1160, the terminal 110 may transmit the path changing information including the radio path change request information to the base station using the V2X UL grant allocated through the RRC connection setup.

According to an embodiment, the terminal 110 may include the path changing information in the RRC connection setup complete message to be transmitted to the base station 120.

Figure 12:
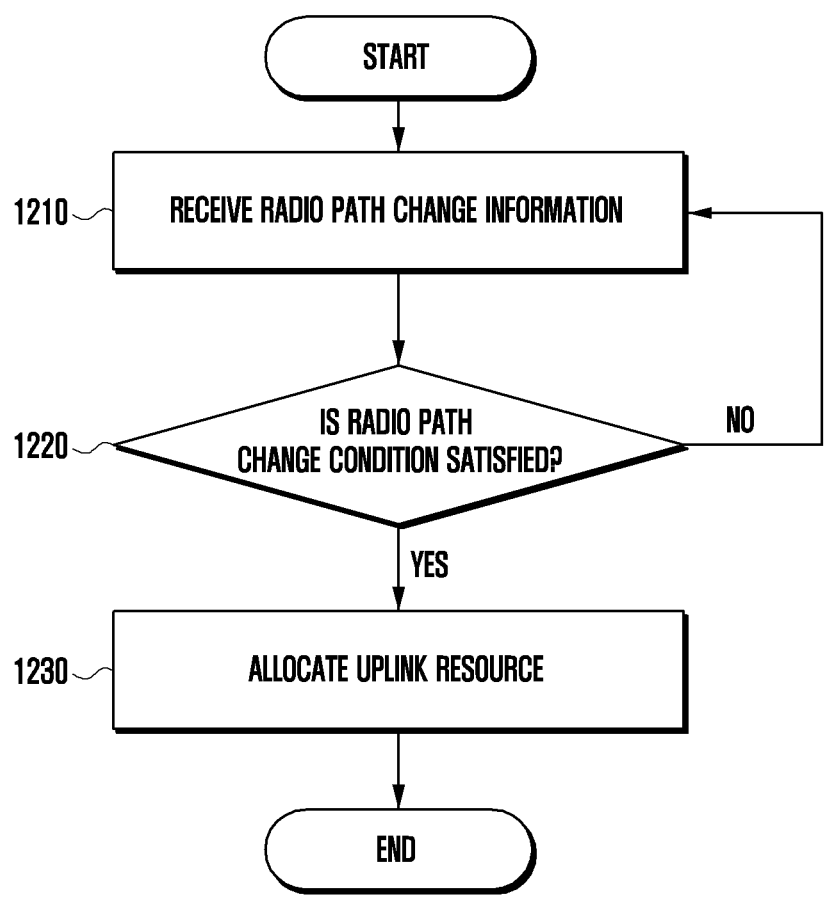
FIG. 12 is a diagram illustrating a method by a base station for changing a radio path of a terminal after receiving radio path change information from the terminal using a sidelink.

FIG. 12 is a diagram illustrating a method by a base station for changing a radio path of a terminal after receiving radio path change information from the terminal using a sidelink.

At operation 1210, the base station 120 may receive the radio path change request information from the terminal 110. Further, at operation 1220, the base station 120 may determine whether the radio path change condition is satisfied. In this case, the base station 120 may determine whether the radio path change condition of the terminal 110 is satisfied using the operation condition at operation 220 as described above with reference to FIG. 2 (or operation condition as described above at operations 160 to 190 of FIGS. 1A and 1B).

If the radio path change condition is satisfied at operation 1220 and the terminal 110 determines to change the radio path, the base station 120, at operation 1230, may allocate a resource between the terminals 110 (e.g., sidelink resource) or a resource between the terminal 110 and the base station 120 (e.g., Uu resource) to the terminal 110, and it may notify the terminal 110 of this.

Meanwhile, if the Uu radio path of the terminal 110 is in an idle mode, the terminal 110 may transmit the radio path change request of the terminal 110 to the base station 120 through a relay terminal (UE) 140 that is directly communicable using the sidelink radio path. Here, with reference to FIGS. 13 to 16, an embodiment, in which the terminal 110 transmits the radio path change request to the base station using the relay UE 140 in a state where the Uu radio path of the terminal 110 is in an idle mode, will be described.

Figure 13:
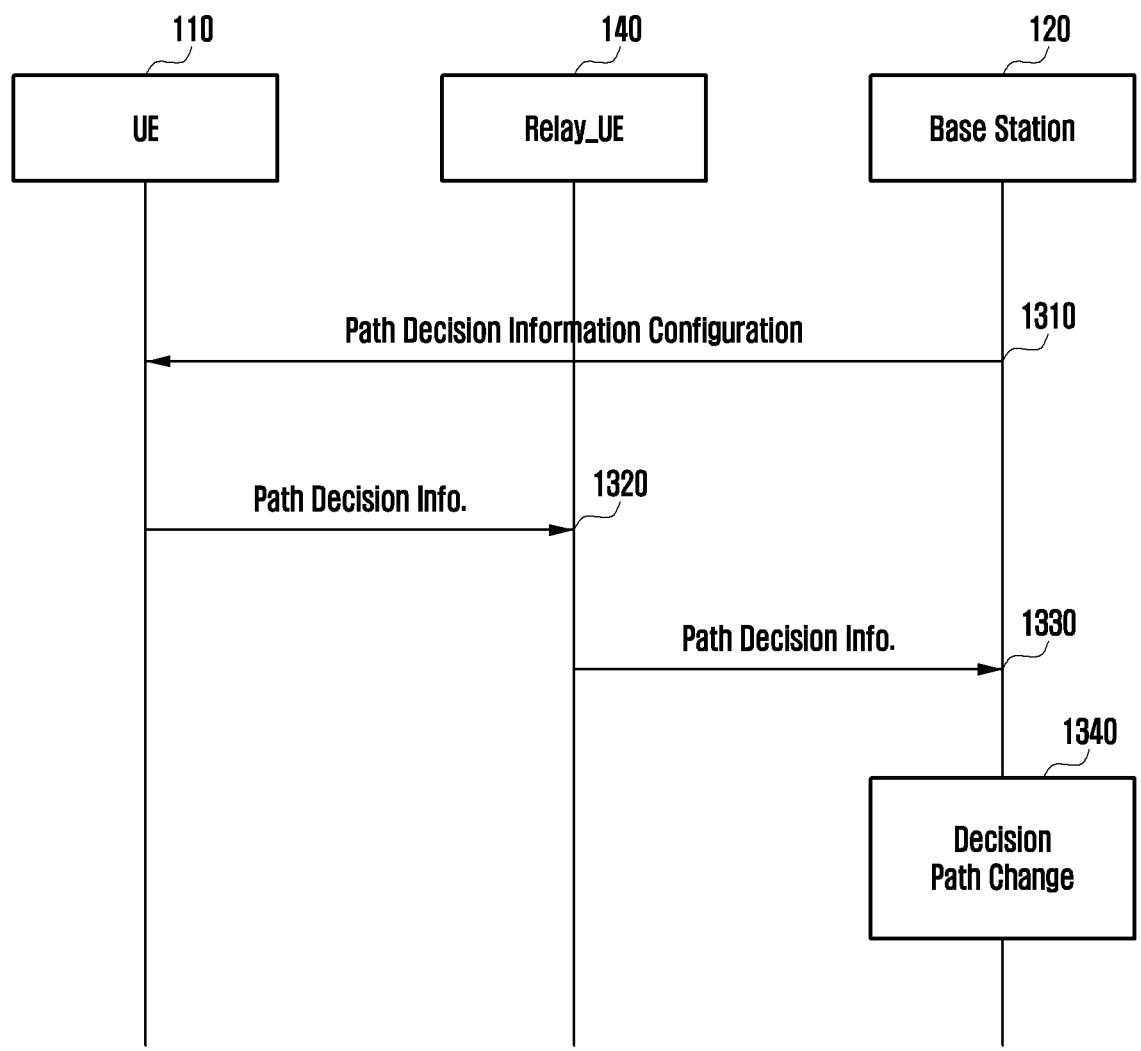
FIG. 13 is a diagram illustrating an operation in which a terminal transmits radio path change request information to a base station through a relay terminal and the base station determines a radio path change according to an embodiment of the disclosure.

FIG. 13 is a diagram illustrating an operation in which a terminal transmits radio path change request information to a base station through a relay terminal and the base station determines a radio path change according to an embodiment of the disclosure.

At operation 1310, the base station 120 may transmit the radio path change configuration information for the radio path change request to the terminal 110 as described above with reference to FIG. 1. Accordingly, if the radio path change is required, the terminal 110 may transmit the radio path change request information to the base station 120. In this case, the radio path change request information (path decision information) may be, for example, whether a channel measurement situation report event occurs, channel measurement situation, prose per packet priority (PPPP) information of a packet to be transmitted by the terminal, terminal (UE) type (vehicle UE, pedestrian UE, or RSU UE), V2X data destination address transmitted by the terminal 110, battery level of the terminal 110, V2X service type of the terminal 110 (e.g., safety or non-safety), or CQI measured by the terminal 110.

Through the radio path change configuration information, the base station 120 may notify the terminal 110 of a period (e.g., periodic or event) in which the terminal 110 transmits path decision information (i.e., radio path change request information). For example, the transmission period of the path decision information may be equal to the channel situation measurement report period.

At operation 1320, the terminal 110 may transfer at least one example of the path decision information and radio path change request information including identification information (ID) of the terminal 110 to the relay UE 140 through the sidelink based on the radio path change configuration information configured by the base station and the path decision transmission period. Further, at operation 1330, the relay UE 140 having received the radio path change request information may transfer (forward) the radio path change request information to the base station 120.

Thereafter, the base station 120 may receive the radio path change request information from the relay UE 140, and it may determine whether the radio path of the terminal 110 has been changed. In this case, the base station 120 may determine whether the radio path change condition of the terminal 110 is satisfied using the operation condition at operation 220 as described above with reference to FIG. 2 (or operation condition as described above at operations 160 to 190 of FIGS. 1A and 1B).

As an embodiment, if the base station 120 configures a case where an event occurs, in which the terminal 110 transmits the channel situation measurement report as the radio path change determination condition of the terminal 110, the base station 120 may determine the radio resource change with respect to 110 and it may indicate the radio resource change with respect to 110.

As another embodiment, if the base station 120 configures a case where the base station 120 receives the channel measurement situation report from the terminal 110 as the radio path change determination condition of the terminal 110, the base station 120 may compare the channel measurement situation received from the terminal 110 with the channel measurement situation threshold value, and if the channel measurement situation value of the terminal is equal to or larger than the channel measurement situation threshold value, the base station 120 may determine the radio resource change with respect to 110, and it may instruct the terminal 110 to perform the radio resource change.

As still another embodiment, if the base station 120 configures the prose per packet priority (PPPP) of the terminal 110 as the radio path change determination condition of the terminal 110, the base station 120 may compare the PPPP to be transmitted by the terminal 110 with the priority reference value of the packet, and if the priority of the PPPP to be transmitted by the terminal 110 is equal to or higher than the priority reference value, the base station 120 may determine the radio resource change with respect to 110, and it may instruct the terminal 110 to perform the radio resource change.

As still another embodiment, if the type information of the terminal 110 (e.g., vehicle UE, pedestrian UE, or RSU UE) is configured to be received as the radio path change determination condition of the terminal 110, the base station 120 may determine the radio path change based on the type of the terminal 110, and then it may notify the terminal 110 of the radio resource change. For example, in the case where the radio path change can be performed only with respect to the vehicle UE, the base station 120 may determine the radio resource change only with respect to the vehicle UE, and it may instruct the terminal 110 to perform the radio resource change.

As still another embodiment, if the base station 120 configures the data destination address as the radio path change determination condition of the terminal 110, the base station 120 may identify the destination address of the packet to be transmitted by the terminal 110, and if the destination address of the packet to be transmitted by the terminal 110 coincides with the data destination address configured by the base station 120, or if the destination address of the packet is within a predetermine range, the base station 120 may determine the radio resource change with respect to the terminal 110, and it may instruct the terminal 110 to perform the radio resource change.

As still another embodiment, if the base station 120 configures a power situation (battery level) of the terminal as the radio path change determination condition of the terminal 110, the base station 120 may determine the radio resource change with respect to the terminal 110, and it may instruct the terminal 110 to perform the radio resource change in the case where the power situation of the terminal 110 is equal to or smaller than the terminal power situation threshold value configured by base station 120.

As still another embodiment, if the base station 120 configures the V2X service type of the terminal 110 (e.g., safety or non-safety) as the radio path change determination condition of the terminal 110, the base station 120 may determine the radio resource change with reference to the V2X service of the terminal 110, and it may instruct the terminal 110 to perform the radio resource change. For example, if the terminal 110 intends to support the safety service, the base station 120 may determine the radio resource change with respect to the terminal 110, and it may instruct the terminal 110 to perform the radio resource change.

Figure 14:
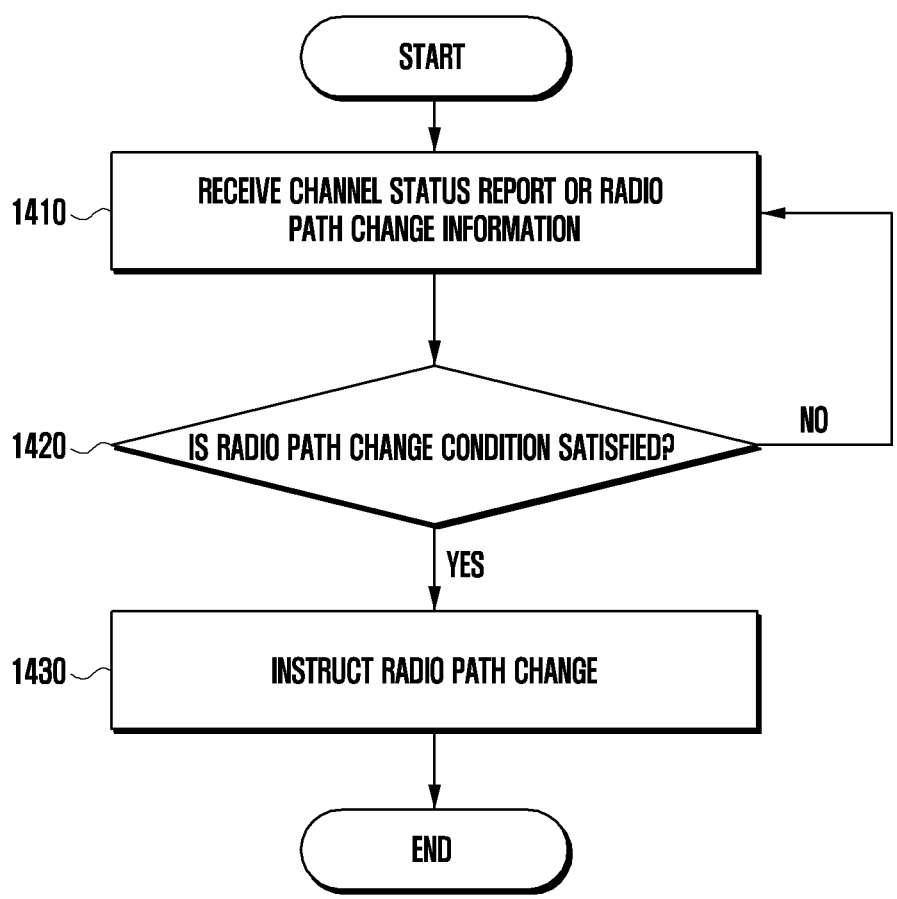
FIG. 14 is a diagram illustrating an operation in which a base station determines a V2X radio path change of a terminal and it instructs the terminal to change a radio path according to an embodiment of the disclosure.

FIG. 14 is a diagram illustrating an operation in which a base station determines a V2X radio path change of a terminal and it instructs the terminal to perform the radio path change according to an embodiment of the disclosure.

At operation 1410, the base station 120 may receive, from the terminal 110, at least one of channel status report information or information for the radio path change (e.g., one or more of the radio path change request information as described above with reference to FIGS. 1B and 13).

Further, at operation 1420, the base station 120 may determine whether the terminal 110 should change the radio path. Here, the base station 120 may determine the radio path change of the terminal 110 through the above-described method at operation 1340 of FIG. 13.

At operation 1430, the base station 120 may determine the radio path change of the terminal 110 based on the determination at operation 1420, and it may instruct the terminal 110 to perform the radio path change. According to an embodiment, a message for instructing the terminal to perform the radio path change at operation 1430 may include at least one of a message (e.g., RRC message) dedicated with respect to the terminal 110 or system information (e.g., system information). Meanwhile, the operation exemplified in FIG. 14 may be applied to an operation in which the base station 120 determines the radio path change of the terminal 110 in the case of exchanging radio path change signaling of the terminal 110 through the relay UE 140 as in the embodiment of FIG. 13. Further, even in the case of exchanging direct radio path change signaling between the terminal 110 and the base station 120 without including the relay UE 140, the exemplified operation may be applied to an operation in which the base station 120 determines the radio path change of the terminal 110.

Figure 15:
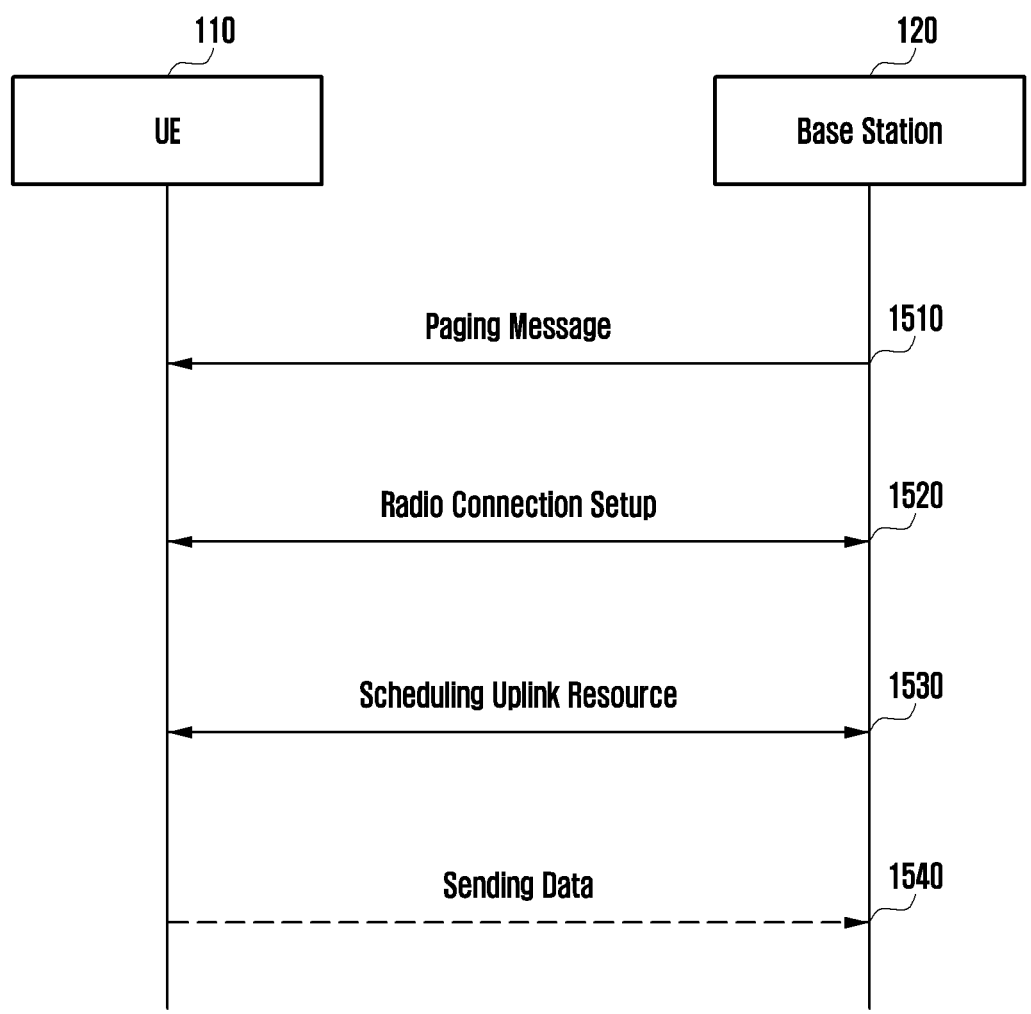
FIG. 15 is a diagram illustrating a signal flow for a base station to instruct a terminal to change radio path information and to allocate a resource to the terminal after determining to change a radio path of the terminal according to an embodiment of the disclosure.

FIG. 15 is a diagram illustrating a signal flow for a base station to instruct a terminal to change radio path information and to allocate a resource to the terminal after determining to change a radio path of the terminal according to an embodiment of the disclosure.

In an embodiment of the disclosure, the base station 120, at operation 1510, may notify of the radio path change of the terminal 110 through a paging message. That is, if the Uu radio path of the terminal 110 is in an idle mode, the base station 120 may indicate to the terminal 110 the radio path change through transmission of the paging message. The base station 110 may determine the radio path change of the terminal 110 based on the procedures of FIGS. 13 and 14, and it may instruct the terminal 110 to perform the radio path change through transmission of the paging message to the terminal 110 that will change the radio path. The paging message being used for the purpose of indicating the radio path change may include at least one of identification information of the terminal (UE ID) to change the radio resource or information indicating that the paging message is for the radio path change (e.g., cause=V2X path change).

Further, if it is determined that the terminal 110 should perform the V2X radio path change after receiving the paging message, the terminal 110, at operation 1520, may transmit the radio connection setup message to the base station 120. For example, the radio connection setup message may correspond to the RRC connection setup operation through the random access in the case of an LTE system.

After the radio connection setup, the terminal 110, at operation 1530, may request the uplink resource from the base station 120. For example, in the case of an LTE system, the uplink resource request procedure may be an operation in which the terminal 110 transfers the buffer status report to the base station 120 after the scheduling request and it is allocated with the uplink resource from the base station 120 as much as the amount of data to be transmitted by the terminal 110.

Further, at operation 1540, the terminal 110 may transmit the V2X data to the base station 120 using the resource allocated from the base station 120.

As another embodiment of the disclosure, after the terminal 110 receives the paging message, the radio path change of the terminal 110 may be indicated during the radio connection setup procedure.

That is, at operation 1510, the base station 110 may notify the terminal 110 of the existence of the information to be received through a downlink through transmission of the paging message to the terminal 120. The terminal 110 may determine that there exists the information to be received through the paging message, and at operation 1520, the terminal 110 may request the radio connection setup from the base station 120. For example, in the case of an LTE system, the radio connection setup procedure may be the RRC connection setup operation through the random access. The base station 120 having received the RRC connection setup request from the terminal 110 may transmit information indicating the radio path change to the terminal 110 (e.g., cause=V2X path change) during the RRC connection setup procedure. The terminal 110 performing the RRC connection setup procedure may determine the V2X radio path change indication through the indication information.

At operation 1530, the terminal 110 may request the uplink resource from the base station 120 after the radio connection setup. For example, in the case of an LTE system, the uplink resource request procedure may be an operation in which the terminal 110 transfers the buffer status report to the base station 120 after the scheduling request and it is allocated with the uplink resource from the base station 120 as much as the amount of data to be transmitted by the terminal 110.

Figure 16:
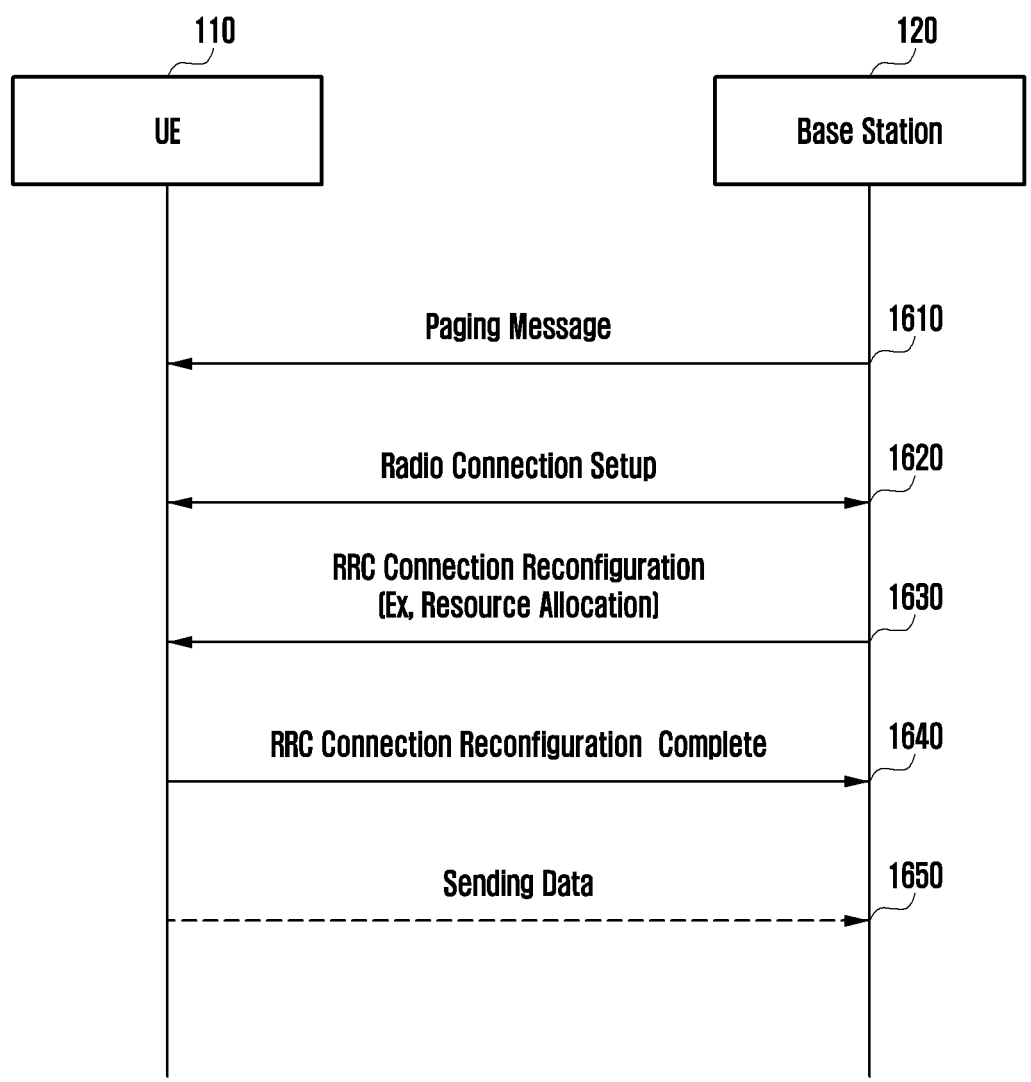
FIG. 16 is a diagram illustrating a signal flow for a base station to change a radio path and to allocate a resource to a terminal after determining to change a V2X radio path of the terminal according to another embodiment of the disclosure.

FIG. 16 is a diagram illustrating a signal flow for a base station to change a radio path and to allocate a resource to a terminal after determining to change a V2X radio path of the terminal according to another embodiment of the disclosure.

With reference to FIG. 16, V2X radio resource may be allocated through scheduling resource (e.g., sidelink scheduling resource or Uu radio path resource) designated to the terminal 110.

In an embodiment of the disclosure, the base station 120, at operation 1610, may notify the terminal 110 of the radio path change through a paging message. For example, the paging message may include at least one of identification information of the terminal (UE ID) to change the radio resource or information indicating that the paging message is for the radio path change (e.g., cause=V2X path change).

Further, based on the information included in the paging message received from the base station 120, the terminal 110, at operation 1620, may transmit a radio connection setup message to the base station after receiving the radio path change decision information. For example, in the case of an LIE system, the radio connection setup request procedure may be an RRC connection setup operation. In this case, the terminal 110 may notify the base station 120 of whether to request the radio path change (e.g., V2X path switch) as the RRC connection setup request cause.

The base station 120 may identify the radio path change occurrence based on the RRC connection setup request cause, and at operation 1630, the base station 120 may transmit the RRC connection reconfiguration message to the terminal 110. In this case, the base station 120 may allocate the scheduling resource (e.g., sidelink mode 3 or Uu radio path) designated to the terminal 110. As another embodiment, the base station 120 may identify the radio path change occurrence based on the RRC connection setup request cause, and it may compare a time when the base station instructs the terminal 110 to perform the radio path change through the paging message at operation 1610 with a time when the base station receives the RRC connection setup request including the radio path change occurrence information from the terminal 110. If the interval between the two events is within a predetermine time gap, the base station 120 may allocate the sidelink scheduling resource designated to the terminal 110 (e.g., sidelink scheduling resource or Uu radio path resource) through transmission of the RRC connection reconfiguration message to the terminal 110.

At operation 1640, the terminal 110 may transmit the RRC connection reconfiguration setup complete message to the base station 120. Further, at operation 1650, the terminal 110 may transmit the V2X data through the scheduling resource designated to the terminal 110 (e.g., sidelink scheduling resource or Uu radio path resource).

As another embodiment of the disclosure, the terminal 110 having received the paging message may receive the radio path information change and the changed radio path resource through the radio reconfiguration procedure.

That is, at operation 1610, the base station 120 may notify the terminal 110 that there is information to be received from the terminal 110 through a downlink through the paging message. If it is determined that there is information to be received based on the paging message, the terminal 110, at operation 1620, may request the radio connection setup from the base station 120. For example, in the case of an LIE system, the radio connection setup procedure may be the RRC connection setup operation through the random access. After the radio connection, the terminal 110 may perform the RRC connection reconfiguration operation for bearer setup of the base station 120 and the terminal 110. While performing the RRC connection reconfiguration procedure, the base station 120 may schedule the changed V2X radio path resource (sidelink scheduling resource or Uu radio path resource) and it may transmit the scheduled resource to the terminal 110 at operation 1630. As another embodiment, the base station 120 may compare the time when the base station 120 transmits the paging message to the terminal 110 at operation 1610 with the time when the RRC connection reconfiguration information is generated at operation 1630. If the interval between the two events is within the predetermine time gap, the base station 120 may allocate the scheduling resource designated to the terminal 110 (e.g., sidelink scheduling resource or Uu radio path resource) through the RRC connection reconfiguration to the terminal 110.

At operation 1640, the terminal 110 may transmit the RRC connection reconfiguration setup complete message to the base station 120. Further, at operation 1650, the terminal 110 may transmit the V2X data through the scheduling resource designated to the terminal 110 (e.g., sidelink scheduling resource or Uu radio path resource).

Figure 17:
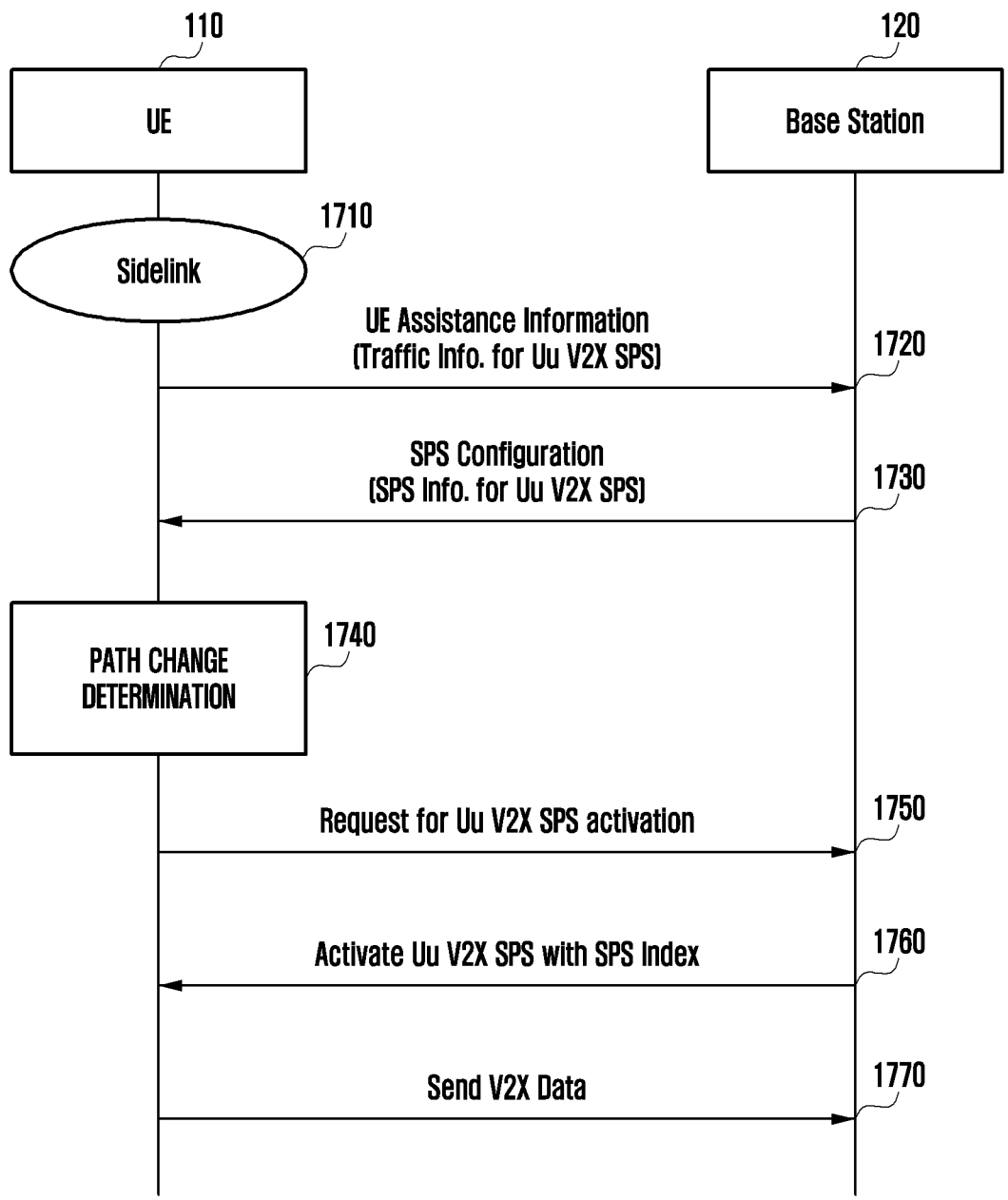
FIG. 17 is a diagram illustrating an embodiment in which a Uu radio path based V2X semi-persistent scheduling (SPS) method is used in the case where a terminal performing communication through a sidelink radio path changes a transmission path to a Uu radio path according to an embodiment of the disclosure.

FIG. 17 is a diagram illustrating an embodiment in which a Uu radio path based V2X semi-persistent scheduling (SPS) method is used in the case where a terminal performing communication through a sidelink radio path changes a transmission path to a Uu radio path according to an embodiment of the disclosure.

With reference to FIG. 17, at operation 1710, the terminal 110 may perform V2X communication using sidelink radio path. Further, at operation 1720, the terminal 110 may transmit terminal information (e.g., UE assistance information) to the base station 120. In this case, the UE assistance information may include information for semi-persistent scheduling (SPS) resource allocation for the purpose of Uu radio path based V2X. In this case, a message for the SPS resource allocation for the purpose of the Uu radio path based V2X can use other messages (between the base station 120 and the terminal 110) in addition to the UE assistance information. The SPS resource for the purpose of the Uu radio path based V2X may be preconfigured to be used in the case where the V2X communication path is changed from the sidelink radio path basis to the Uu radio path basis.

At operation 1730, the base station 120 having received the UE assistance information from the terminal 110 may transmit the SPS configuration information for the purpose of the Uu radio path based V2X to the terminal 110. The SPS configuration information may be transmitted through the RRC message or MAC message. In this case, because the terminal can perform the V2X communication using the sidelink, the base station may transmit only the configuration information for using the Uu radio path based V2X SPS to the terminal 110, but it may not actually activate the Uu radio path based V2X SPS.

Thereafter, at operation 1740, the terminal 110 having performed the V2X communication using the sidelink radio path may determine the path change to perform the V2X communication using the Uu radio path. As an embodiment of the path change condition, if the signal strength of the sidelink radio path is weak, the signal strength of the Uu radio path may be equal to or higher than the signal strength of the sidelink radio path through comparison with Uu radio path channel situation, and in this case, the terminal 110 may determine the path change request to the Uu radio path. Because other conditions have been described with reference to FIGS. 1A to 2, the detailed description thereof will be omitted.

At operation 1750, the terminal 110 may transmit the radio path change request message to the base station 120 so that the V2X communication can be performed using the Uu radio path based V2X SPS resource configured at operations 1720 to 1730. Further, the terminal 110 may transmit the Uu radio path based V2X SPS activation request message to the base station 120. In this case, the radio path change request message and the Uu radio path based V2X SPS activation request message may be transmitted to the base station 120 as one message.

If the base station 120 receives the Uu radio path based V2X SPS activation request message from the terminal 110, the base station 120 may recognize the message as a request for changing the V2X communication path from the sidelink radio path basis to the Uu radio path basis. Further, as a response to the radio path change request, the base station 120, at operation 1760, may transmit the Uu radio path based V2X SPS activation message to the terminal 110. The Uu radio path based V2X SPS activation message may be transferred in various methods and messages, and as an embodiment, the Uu radio path based V2X SPS activation information may be included in a specific DCI (e.g., Uu V2X SPS activation) of PDCCH to be transmitted to the terminal 110, and thus the Uu radio path based V2X SPS can be activated. As another embodiment, the Uu radio path based V2X SPS activation information may be included in a specific MAC CE (e.g., Uu V2X SPS activation) to be transmitted to the terminal 110, and thus the Uu radio path based V2X SPS can be activated. Further, at operation 1770, the terminal 110 may transmit data using the activated Uu radio path based V2X SPS resource.

Figure 18:
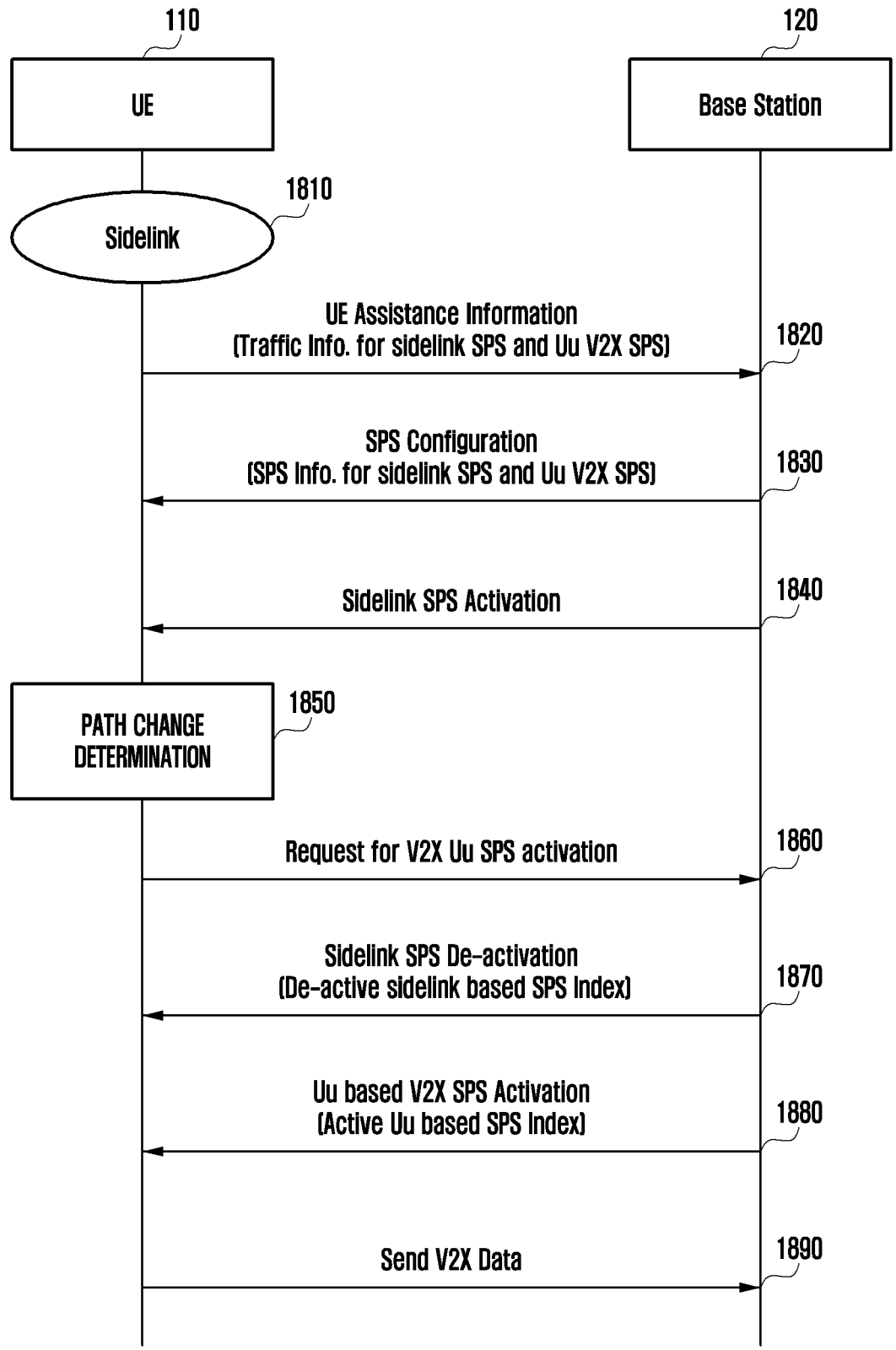
FIG. 18 is a diagram illustrating another embodiment in which a Uu radio path based V2X semi-persistent scheduling (SPS) method is used in the case where a terminal performing V2X communication through a sidelink radio path changes a V2X packet transmission path to a Uu radio path according to an embodiment of the disclosure.

FIG. 18 is a diagram illustrating another embodiment in which a Uu radio path based V2X semi-persistent scheduling (SPS) method is used in the case where a terminal performing V2X communication through a sidelink radio path changes a V2X packet transmission path to a Uu radio path according to an embodiment of the disclosure.

With reference to FIG. 18, at operation 1810, the terminal 110 may perform V2X communication using the sidelink radio path. In this embodiment, the terminal 110 can use the SPS based on the sidelink radio path for V2X communication and the SPS based on the Uu radio path for V2X communication.

At operation 1820, the terminal 110 may transmit terminal information (e.g., UE assistance information) to the base station 120. In this case, the UE assistance information may include information for being allocated with resources of the sidelink radio path based V2X SPS and the Uu radio path based V2X SPS. In this case, a message for being allocated with resources of the sidelink radio path based V2X SPS and the Uu radio path based V2X SPS can use other messages (between the base station 120 and the terminal 110) in addition to the UE assistance information.

At operation 1830, the base station 120 having received the UE assistance information from the terminal 110 may transmit, to the terminal 110, the SPS configuration information for resource allocation of the sidelink radio path based V2X SPS and the Uu radio path based V2X SPS. The SPS configuration information may be transmitted through the RRC message or MAC message. Further, at operation 1840, the base station 120 may activate the sidelink radio path based V2X SPS resource to enable the terminal 110 to perform the V2X communication using the sidelink radio path based V2X SPS resource.

Thereafter, during performing of the sidelink radio path based V2X communication, the terminal 110, at operation 1850, may determine the path change to perform the V2X communication using the Uu radio path. As an embodiment of the path change condition, if the signal strength of the sidelink radio path is weak, the signal strength of the Uu radio path may be equal to or higher than the signal strength of the sidelink radio path through comparison with the Uu radio path channel situation. In this case, the terminal 110 may request the path change to the Uu radio path from the base station 120. Because other conditions have been described with reference to FIGS. 1A to 2, the detailed description thereof will be omitted.

The terminal 110 having determined to change the V2X communication link from the sidelink radio path to the Uu radio path at operation 1850 may transmit the Uu radio path based V2X SPS activation request message to the base station 120 at operation 1860 so that the V2X communication can be performed using the Uu radio path based V2X SPS resource configured at operations 1820 to 1830.

The base station 120 having received the Uu radio path based V2X SPS activation request message for requesting the V2X communication path change from the sidelink radio path to the Uu radio path may inactivate the sidelink radio path based V2X SPS allocated to the terminal 110. For this, at operation 1870, the base station 120 may transmit a message for inactivating the sidelink radio path based V2X SPS to the terminal 110. Further, the sidelink radio path based V2X SPS inactivation message may be transferred in various methods and messages, and as an embodiment, the sidelink radio path based V2X SPS inactivation information may be included in a specific DCI (e.g., sidelink V2X SPS activation) of PDCCH to be transmitted to the terminal 110, and thus the sidelink radio path based V2X SPS can be inactivated. As another embodiment, the sidelink radio path based V2X SPS inactivation information may be included in a specific MAC CE (e.g., SL V2X SPS inactivation) to be transmitted to the terminal 110, and thus the sidelink radio path based V2X SPS can be inactivated.

Further, at operation 1880, the base station 120 may transmit the Uu radio path based V2X SPS activation message to the terminal 110 so that the Uu radio path based V2X SPS resource is activated in accordance with a request of the terminal 110. The Uu radio path based V2X SPS activation message may be transferred in various methods and messages, and as an embodiment, the Uu radio path based V2X SPS activation information may be included in the specific DCI (e.g., Uu V2X SPS activation) of PDCCH to be transmitted to the terminal 110, and thus the Uu radio path based V2X SPS can be activated. As another embodiment, the Uu radio path based V2X SPS activation information may be included in a specific MAC CE (e.g., Uu V2X SPS activation) to be transmitted to the terminal 110, and thus the Uu radio path based V2X SPS can be activated. Further, at operation 1890, the terminal 110 may transmit V2X data using the activated Uu radio path based V2X SPS resource.

Figure 19:
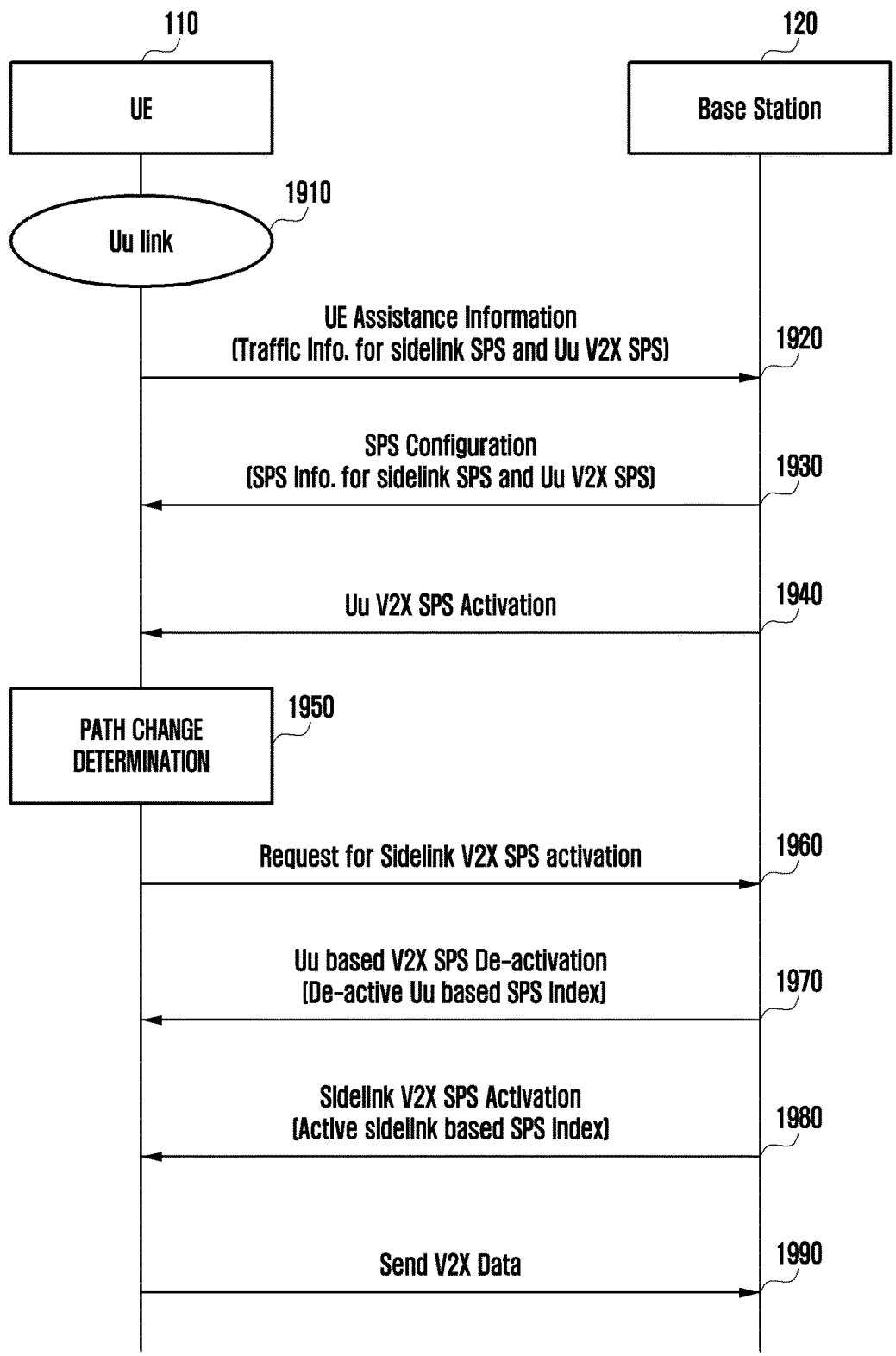
FIG. 19 is a diagram illustrating an embodiment in which a sidelink radio path based V2X semi-persistent scheduling (SPS) method is used in the case where a terminal performing V2X communication through a Uu radio path changes a V2X packet transmission path to a sidelink radio path according to an embodiment of the disclosure.

FIG. 19 is a diagram illustrating an embodiment in which a sidelink radio path based V2X semi-persistent scheduling (SPS) method is used in the case where a terminal performing V2X communication through a Uu radio path changes a V2X packet transmission path to a sidelink radio path according to an embodiment of the disclosure.

With reference to FIG. 19, at operation 1910, the terminal 110 may perform V2X communication using the Uu radio path. In this embodiment, the terminal 110 can use the SPS based on the sidelink radio path for V2X communication and the SPS based on the Uu radio path for V2X communication.

At operation 1920, the terminal 110 may transmit terminal information (e.g., UE assistance information) to the base station 120. In this case, the UE assistance information may include information for being allocated with resources of the sidelink radio path based V2X SPS and the Uu radio path based V2X SPS. In this case, a message for being allocated with resources of the sidelink radio path based V2X SPS and the Uu radio path based V2X SPS can use other messages (between the base station 120 and the terminal 110) in addition to the UE assistance information.

At operation 1930, the base station 120 having received the UE assistance information from the terminal 110 may transmit, to the terminal 110, the SPS configuration information for resource allocation of the sidelink radio path based V2X SPS and the Uu radio path based V2X SPS. The SPS configuration information may be transmitted through the RRC message or MAC message. Further, at operation 1940, the base station 120 may activate the Uu radio path based V2X SPS resource to enable the terminal 110 to perform the V2X communication using the Uu radio path based V2X SPS resource.

Thereafter, during performing of the Uu radio path based V2X communication, the terminal 110, at operation 1950, may determine the path change to perform the V2X communication using the sidelink radio path. As an embodiment of the path change condition, if the signal strength of the Uu radio path is weak, the signal strength of the sidelink radio path may be equal to or higher than the signal strength of the Uu radio path through comparison with the sidelink radio path channel situation. In this case, the terminal 110 may request the path change to the sidelink radio path from the base station 120. Because other conditions have been described with reference to FIGS. 1A to 2, the detailed description thereof will be omitted.

The terminal 110 having determined to change the V2X communication link from the Uu radio path to the sidelink radio path at operation 1950 may transmit the sidelink radio path based V2X SPS activation request message to the base station 120 at operation 1960 so that the V2X communication can be performed using the sidelink radio path based V2X SPS resource configured at operations 1920 to 1930.

The base station 120 having received the sidelink radio path based V2X SPS activation request message for requesting the V2X communication path change from the Uu radio path to the sidelink radio path may inactivate the Uu radio path based V2X SPS allocated to the terminal 110. For this, at operation 1970, the base station 120 may transmit a message for inactivating the Uu radio path based V2X SPS to the terminal 110. Further, the Uu radio path based V2X SPS inactivation message may be transferred in various methods and messages, and as an embodiment, the Uu radio path based V2X SPS inactivation information may be included in the specific DCI (e.g., Uu link V2X SPS activation) of PDCCH to be transmitted to the terminal 110, and thus the Uu radio path based V2X SPS can be inactivated. As another embodiment, the Uu radio path based V2X SPS inactivation information may be included in the specific MAC CE (e.g., Uu V2X SPS inactivation) to be transmitted to the terminal 110, and thus the Uu radio path based V2X SPS can be inactivated.

Further, at operation 1980, the base station 120 may transmit the sidelink radio path based V2X SPS activation message to the terminal 110 so that the sidelink radio path based V2X SPS resource is activated in accordance with a request of the terminal 110. Further, at operation 1990, the terminal 110 may transmit V2X data using the activated sidelink radio path based V2X SPS resource.

In an example of FIG. 19, a case has been described, in which the terminal 110 performs the V2X communication using the Uu radio path based V2X SPS resource, and then it changes the path to the sidelink radio path based V2X SPS. However, the operation method of the terminal 110 and the base station 120 to change the Uu radio path based V2X communication path to the sidelink radio path based V2X communication path can also be applied even to a case where the terminal 110 performs the V2X communication using a general Uu radio path resource rather than the Uu radio path based V2X SPS resource, and then it changes the path to the sidelink radio path based V2X SPS.

Figure 20:
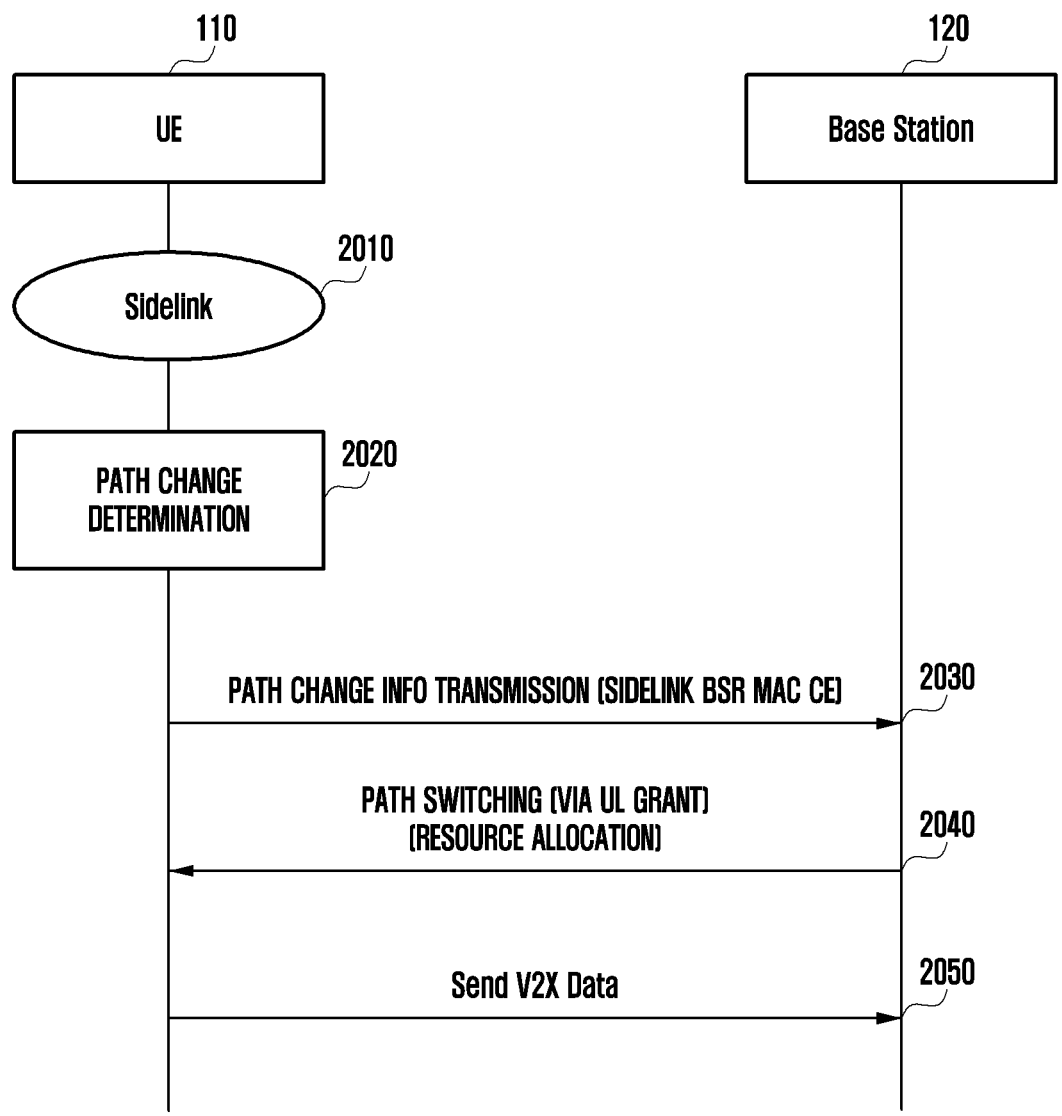
FIG. 20 is a signal flowchart between a terminal and a base station for a method in which a terminal performing V2X communication through a sidelink radio path changes a V2X transmission path to a Uu radio path according to an embodiment of the disclosure.

FIG. 20 is a signal flowchart between a terminal and a base station for a method in which a terminal performing V2X communication through a sidelink radio path changes a V2X transmission path to a Uu radio path according to an embodiment of the disclosure.

With reference to FIG. 20, at operation 2010, the terminal 110 may perform V2X communication using the sidelink radio path. In this case, the terminal 110 may perform the V2X communication in a sidelink mode 4 (autonomous resource selection mode). That is, the base station 120 may allocate the V2X resource configured for the purpose of the sidelink mode 4 to the terminal 110, and the terminal 110 may perform the V2X communication through selection of the V2X resource configured for the purpose of the sidelink mode 4 as instructed by the base station 120.

Meanwhile, the base station 120 may allocate the V2X resource configured for the purpose of the sidelink mode 3 to the terminal 110. In this case, the terminal 110 having received the V2X resource information configured for the purpose of the sidelink mode 3 may request resource allocation to be used for actual V2X communication from the base station 120, and the terminal 110 may transmit the V2X packet after receiving the resource allocation to be used for the actual V2X communication from the base station 120. In this case, among the V2X resource information configured for the purpose of the sidelink mode 3, an example of signaling that is sent and received between the terminal 100 and the base station 120 in order to request the resource allocation to be used for the actual V2X communication may be a sidelink BSR MAC CE.

Meanwhile, during performing of the V2X communication using the V2X resource configured for the purpose of the sidelink mode 4, the terminal 110, at operation 2020, may change the path from the sidelink to the Uu radio path, and it may determine the necessity to perform the V2X communication using the Uu radio path. As an embodiment of the path change condition, if the signal strength of the sidelink radio path is weak, the signal strength of the Uu radio path may be equal to or higher than the signal strength of the sidelink radio path through comparison with the Uu radio path channel situation. In this case, the terminal 110 may request the path change to the Uu radio path from the base station 120. Because other conditions for the terminal 110 to determine the path change from the sidelink radio path to the Uu radio path have been described with reference to FIGS. 1A to 2, the detailed description thereof will be omitted.

The terminal 110 having determined the path change to the Uu radio path at operation 2020 may transmit a signal for requesting the change of the V2X communication link at operation 2030. In this case, the signal for requesting the V2X communication link change may include sidelink buffer status report (BSR) medium access control (MAC) control elements (CE). If the sidelink BSR MAC CE is received from the terminal 110, the base station 120 may recognize that the terminal 110 has requested the path change from the sidelink radio path to the Uu radio path. That is, the sidelink BSR MAC CE is generally used only in the sidelink mode 3, and it may be used as a signal for the terminal performing the sidelink mode 4 based V2X communication according to an embodiment of the disclosure to request to change the V2X communication path from the sidelink radio path to the Uu radio path. Further, according to an embodiment, the signal for requesting the V2X communication link change may be included in new MAC CE, for example, path change request BSR MAC CE, to be transmitted.

At operation 2040, the base station 120 having received the sidelink BSR MAC CE from the terminal 110 may allocate the Uu radio path resource to the terminal 110 so that the terminal 110 can change the V2X communication path from the sidelink radio path to the Uu radio path. The signaling used by the base station 120 to instruct the terminal 110 to change the sidelink radio path to the Uu radio path may be, for example, PDCCH indicating UL grant of the Uu radio path.

Further, at operation 2050, the terminal 110 may transmit the V2X data using the Uu radio path resource allocated by the base station 120.

Figure 21:
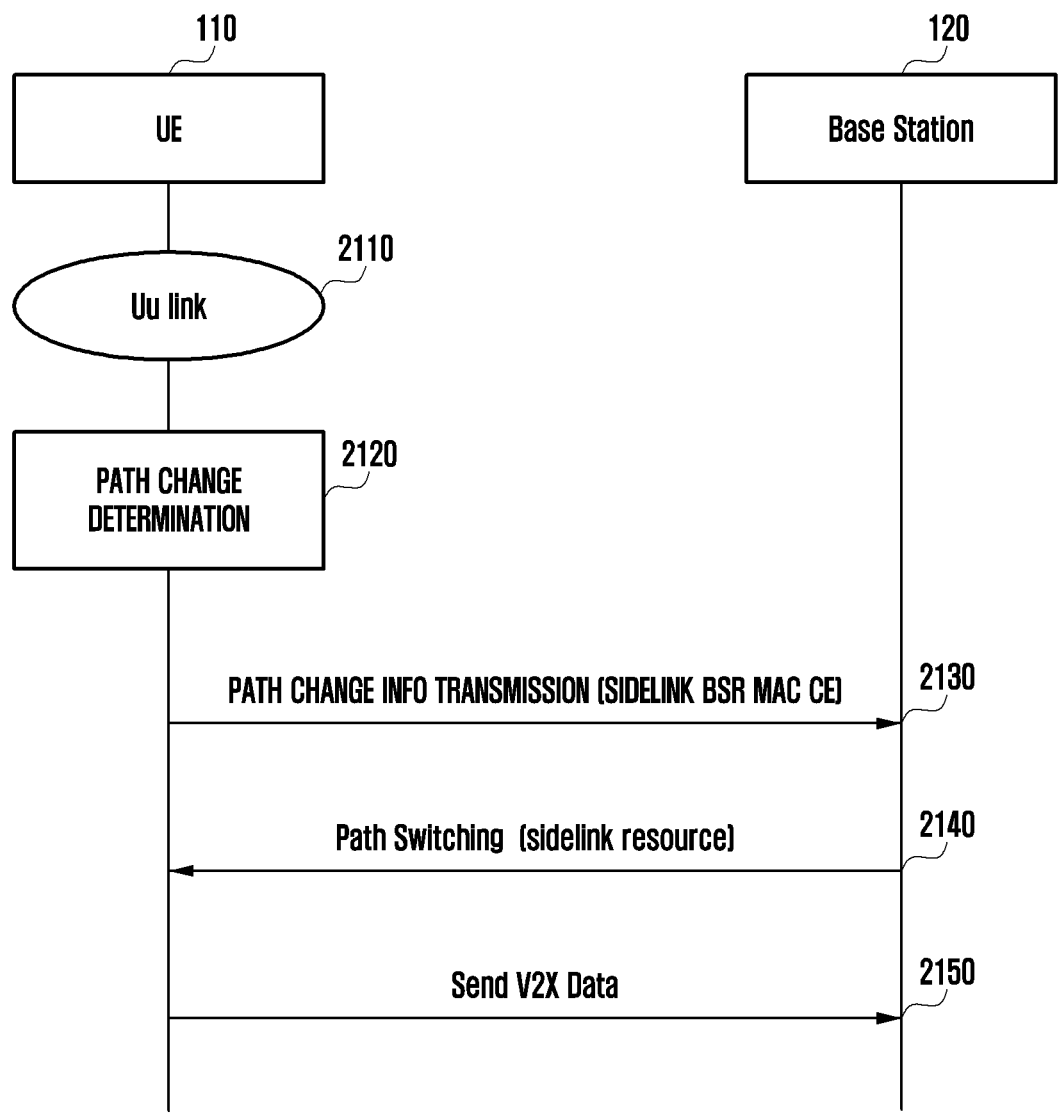
FIG. 21 is a signal flowchart between a terminal and a base station for a method in which a terminal performing V2X communication through a Uu radio path changes a V2X transmission path to a sidelink radio path according to an embodiment of the disclosure.

FIG. 21 is a signal flowchart between a terminal and a base station for a method in which a terminal performing V2X communication through a Uu radio path changes a V2X transmission path to a sidelink radio path according to an embodiment of the disclosure.

With reference to FIG. 21, at operation 2110, the terminal 110 may perform V2X communication using the Uu radio path.

In this case, at operation 2120, the terminal 110 may change the Uu radio path to the sidelink radio path, and it may determine the necessity to perform V2X communication using the sidelink radio path. As an embodiment of the path change condition, if the signal strength of the Uu radio path is weak, the signal strength of the sidelink radio path may be equal to or higher than the signal strength of the Uu radio path through comparison with the link channel situation of the sidelink radio path link channel situation. In this case, the terminal 110 may request the path. In this case, the terminal 110 may request the path change to the sidelink radio path from the base station 120. Because other conditions for the terminal to determine the path change to the sidelink radio path in the Uu radio path have been described with reference to FIGS. 1A to 2, the detailed description thereof will be omitted.

At operation 2130, the terminal 110 having determined the path change to the sidelink radio path may transmit a signal for requesting to change the V2X communication link. In this case, the signal for requesting the V2X communication link change may include the sidelink BSR MAC CE. If the sidelink BSR MAC CE is received from the terminal 110, the base station 120 may recognize that the terminal 110 has requested the path change from the Uu radio path to the sidelink radio path. That is, the sidelink BSR MAC CE may be used for the purpose of requesting the sidelink resource request, and in an embodiment of the disclosure, it may be used as a signal for the terminal having performed the Uu radio path based V2X communication to request changing of the V2X communication path from the Uu radio path to the sidelink radio path. According to an embodiment, the signal for requesting the V2X communication link change may be included in a new MAC CE, for example, a path change request BSR MAC CE to be transmitted.

At operation 2140, the base station 120 having received the sidelink BSR MAC CE from the terminal 110 may allocate the sidelink radio path resource to the terminal 110 so that the terminal can change the V2X communication path from the Uu radio path to the sidelink radio path. The signaling used by the base station 120 to instruct the terminal 110 to change the Uu radio path to the sidelink radio path may be, for example, RRC reconfiguration signaling including sidelink resource allocation information.

The base station 120 may allocate sidelink mode 3 resource information or sidelink mode 4 resource information to the terminal 110 that changes the V2X communication path from the Uu radio path to the sidelink radio path. Further, at operation 2150, the terminal 110 may transmit V2X data using the sidelink radio path resource allocated by the base station 120.

Figure 22:
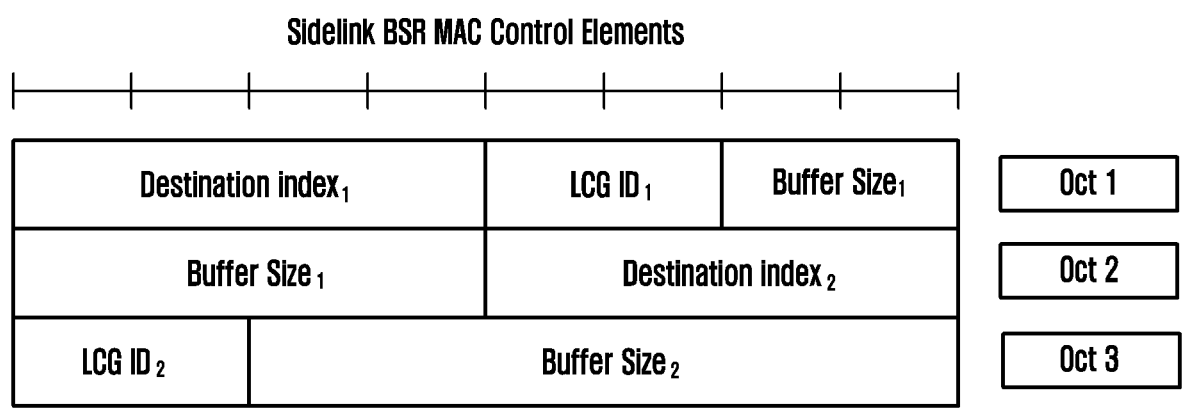
FIG. 22 is a diagram illustrating an example of a sidelink BSR MAC CE format according to an embodiment of the disclosure.

FIG. 22 is a diagram illustrating an example of a sidelink BSR MAC CE format according to an embodiment of the disclosure.

With reference to FIG. 22, the sidelink BSR MAC CE may be transmitted in order for the terminal 110 performing the sidelink mode 4 based V2X communication according to the embodiment as described above with reference to FIG. 20 to determine the necessity to perform the V2X communication through the Uu radio path and to request the V2X communication path change from the base station 120.

If the base station 120 receives the sidelink BSR MAC CE from the terminal 110 performing the V2X communication through the sidelink mode 4 resource, the base station 120 may determine that the terminal 110 desires to perform the V2X communication through the Uu radio path, and it may allocate the Uu radio path resource. In this case, a destination index in the sidelink BSR MAC CE, a buffer size, or a logical channel group (LCG) ID may be configured as a certain value. Further, according to an embodiment, the destination index, the buffer size, or the LCG ID may be configured as a predetermined value in order to request the path change from the sidelink radio path to the Uu radio path. Further, according to an embodiment, the destination index, the buffer size, or the LCG ID may be configured as a parameter value indicating the V2X service to which the path change from the sidelink radio path to the Uu radio path is to be applied.

Further, the sidelink BSR MAC CE may be transmitted in order for the terminal 110 performing the V2X communication through the Uu radio path according to the embodiment as described above with reference to FIG. 21 to determine the necessity to perform the V2X communication through the sidelink radio path and to request the V2X communication path change from the base station 120.

If the base station 120 receives the sidelink BSR MAC CE from the terminal 110 performing the V2X communication through the Uu radio path, the base station 120 may determine that the terminal 110 desires to perform the V2X communication through the sidelink radio path, and it may allocate the sidelink radio path resource. In this case, the destination index in the sidelink BSR MAC CE, the buffer size, or the LCG ID may be configured as a certain value. Further, according to an embodiment, the destination index, the buffer size, or the LCG ID may be configured as a predetermined value in order to request the path change from the Uu radio path to the sidelink radio path. As another embodiment, the destination index, the buffer size, or the LCG ID may be configured as a parameter value indicating the V2X service to which the path change from the Uu radio path to the sidelink radio path is to be applied.

Meanwhile, with reference to the embodiments exemplified in FIGS. 20 and 21, a case has been described, in which the sidelink BSR MAC CE as exemplified in FIG. 22 is used as signaling for the purpose of requesting the path change from the sidelink radio path to the Uu radio path through the terminal 110 (operation 2030 of FIG. 20) or requesting the path change from the Uu radio path to the sidelink radio path (operation 2130 of FIG. 21), but the purpose of the signaling is not limited thereto. For example, as signaling for the purpose of requesting the path change for V2X communication from the base station 120 through the terminal 110, a new signaling may be defined as illustrated in FIG. 23 below.

FIG. 23 is a diagram illustrating an example of a MAC CE for requesting a V2X communication link change according to an embodiment of the disclosure.

With reference to FIG. 23, the V2X path change request BSR MAC CE may be transmitted in order for the terminal 110 performing the sidelink mode 4 based V2X communication according to the embodiment as described above with reference to FIG. 20 to determine the necessity to perform the V2X communication through the Uu radio path and to request the V2X communication path change from the base station 120.

If the base station 120 receives the path change request BSR MAC CE from the terminal 110 performing the V2X communication through the sidelink mode 4 resource, the base station 120 may determine that the terminal 110 desires to perform the V2X communication through the Uu radio path, and it may allocate the Uu radio path resource. In this case, a destination index in the path change request BSR MAC CE, a buffer size, or an LCG ID may be configured as a certain value. Further, according to an embodiment, the destination index, the buffer size, or the LCG ID may be configured as a predetermined value in order to request the path change from the sidelink radio path to the Uu radio path. As another embodiment, the destination index, the buffer size, or the LCG ID may be configured as a parameter value indicating the V2X service to which the path change from the sidelink radio path to the Uu radio path is to be applied.

Further, the path change request BSR MAC CE may be transmitted in order for the terminal 110 performing the V2X communication through the Uu radio path according to the embodiment as described above with reference to FIG. 21 to determine the necessity to perform the V2X communication through the sidelink radio path and to request the V2X communication path change from the base station 120.

If the base station 120 receives the path change request BSR MAC CE from the terminal 110 performing the V2X communication through the Uu radio path, the base station 120 may determine that the terminal 110 desires to perform the V2X communication through the sidelink radio path, and it may allocate the sidelink radio path resource. In this case, the destination index in the sidelink BSR MAC CE, the buffer size, or the LCG ID may be configured as a certain value. Further, according to an embodiment, the destination index, the buffer size, or the LCG ID may be configured as a predetermined value in order to request the path change from the Uu radio path to the sidelink radio path. As another embodiment, the destination index, the buffer size, or the LCG ID may be configured as a parameter value indicating the V2X service to which the path change from the Uu radio path to the sidelink radio path is to be applied.

Figure 24:
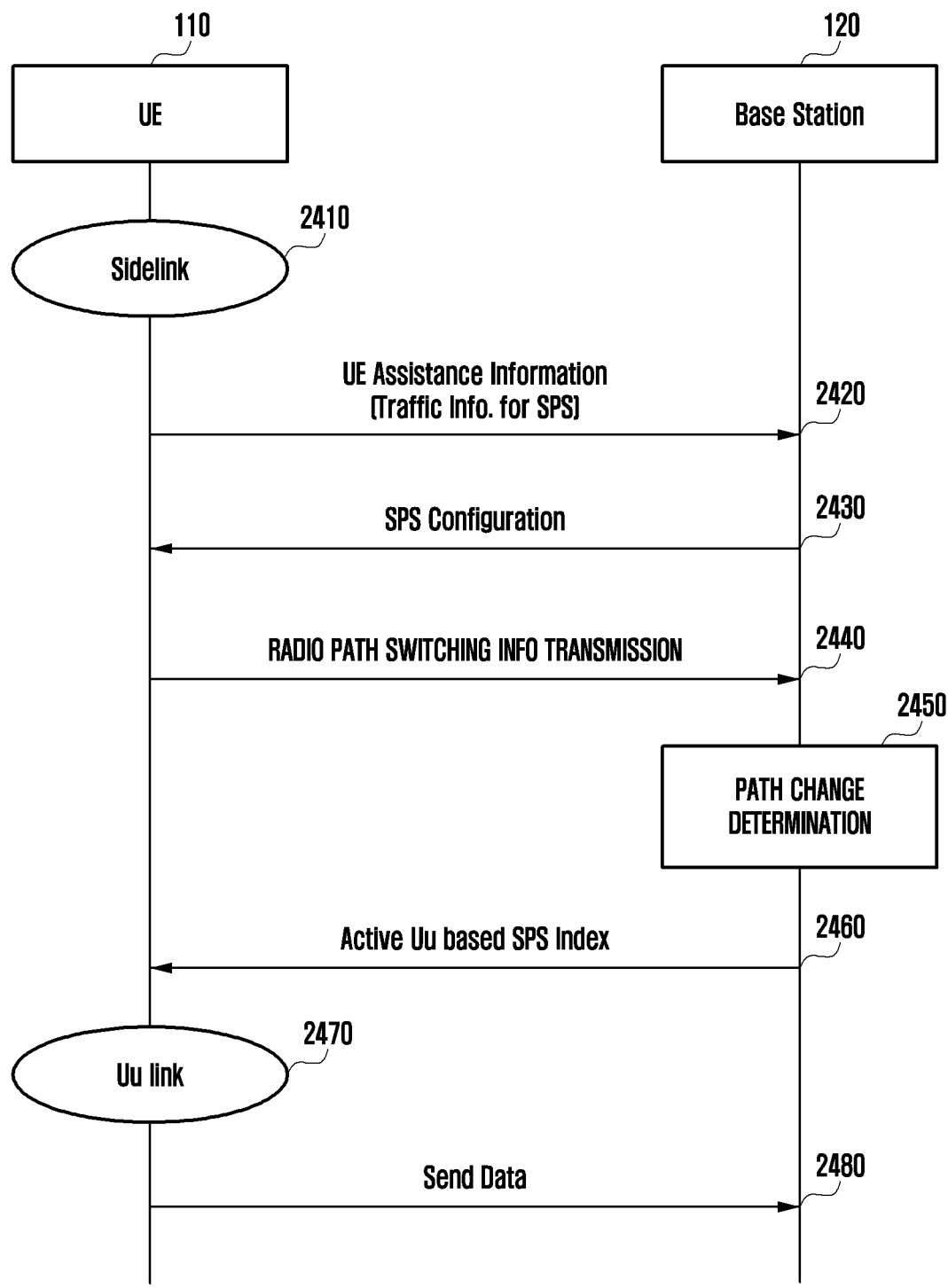
FIG. 24 is a diagram illustrating another method in which a semi-persistent scheduling (SPS) method is used in the case where a terminal performing communication through a sidelink radio path changes a transmission path to a Uu radio path according to an embodiment of the disclosure.

FIG. 24 is a diagram illustrating another method in which a semi-persistent scheduling (SPS) method is used in the case where a terminal performing communication through a sidelink radio path changes a transmission path to a Uu radio path according to an embodiment of the disclosure.

With reference to FIG. 24, at operation 2410, the terminal 110 may transmit V2X data using the sidelink radio path. Further, at operation 2420, the terminal 110 may transmit terminal information (e.g., UE assistance information) to the base station 120. In this case, the UE assistance information may include information for being allocated with resources of the Uu radio path based V2X SPS and the sidelink radio path based V2X SPS. In this case, a message for resource allocation of the sidelink radio path based V2X SPS and the Uu radio path based SPS for the purpose of V2X can use other messages (between the base station 120 and the terminal 110) in addition to the UE assistance information.

At operation 2430, the base station 120 having received the UE assistance information from the terminal 110 may transmit SPS configuration information to be used for resource allocation of the Uu radio path based V2X SPS and the sidelink radio path based V2X SPS to the terminal 110. The SPS configuration information may be transmitted through the RRC message or MAC CE message. Further, the terminal 110 may transmit the V2X data using the sidelink radio path, and it may maintain the configured Uu radio path based V2X SPS in an inactivation state.

Thereafter, at operation 2440, the terminal 110 may transmit information for the path change (i.e., radio path change request information at operation 190 of FIG. 1B) to the base station 120. At operation 2450, the base station 120 having received the radio path change request information message from the terminal 110 may determine whether to change the V2X radio path. Because the determination operation at operation 2450 may be almost the same as the operation of the embodiment as described above with reference to FIG. 14, the detailed description thereof will be omitted.

If the terminal 110 determines to change the V2X radio path from the sidelink radio path to the Uu radio path, the base station 120, at operation 2460, the base station 120 may transmit a Uu radio path based V2X SPS activation message to the terminal 110. The Uu radio path based V2X SPS activation message may be transferred in various methods and messages, and as an embodiment, the Uu radio path based V2X SPS activation information may be transferred to the terminal 110 through DCI of PDCCH. At operation 2470, the terminal 110 having received the instruction of the radio path change to the Uu radio path may change the radio path to the Uu radio path. Further, at operation 2480, the terminal 110 may transmit the V2X data using the activated Uu radio path based V2X SPS resource.

As another embodiment in which the base station 120 determines the V2X radio path change of the terminal 110, the disclosure may be applied to even a case where the terminal 110 using the sidelink mode 4 resource changes the V2X radio resource to the sidelink mode 3 resource.

As still another embodiment in which the base station 120 determines the V2X radio path change of the terminal 110, the disclosure may be applied to even a case where the terminal 110 using the sidelink mode 3 resource changes the V2X radio resource to the sidelink mode 4 resource.

As still another embodiment in which the base station 120 determines the V2X radio path change of the terminal 110, the disclosure may be applied to even a case where the terminal 110 using the Uu radio path resource changes the V2X radio resource to the sidelink mode 3 resource.

As still another embodiment in which the base station 120 determines the V2X radio path change of the terminal 110, the disclosure may be applied to even a case where the terminal 110 using the Uu radio path resource changes the V2X radio resource to the sidelink mode 4 resource.

Figure 25:
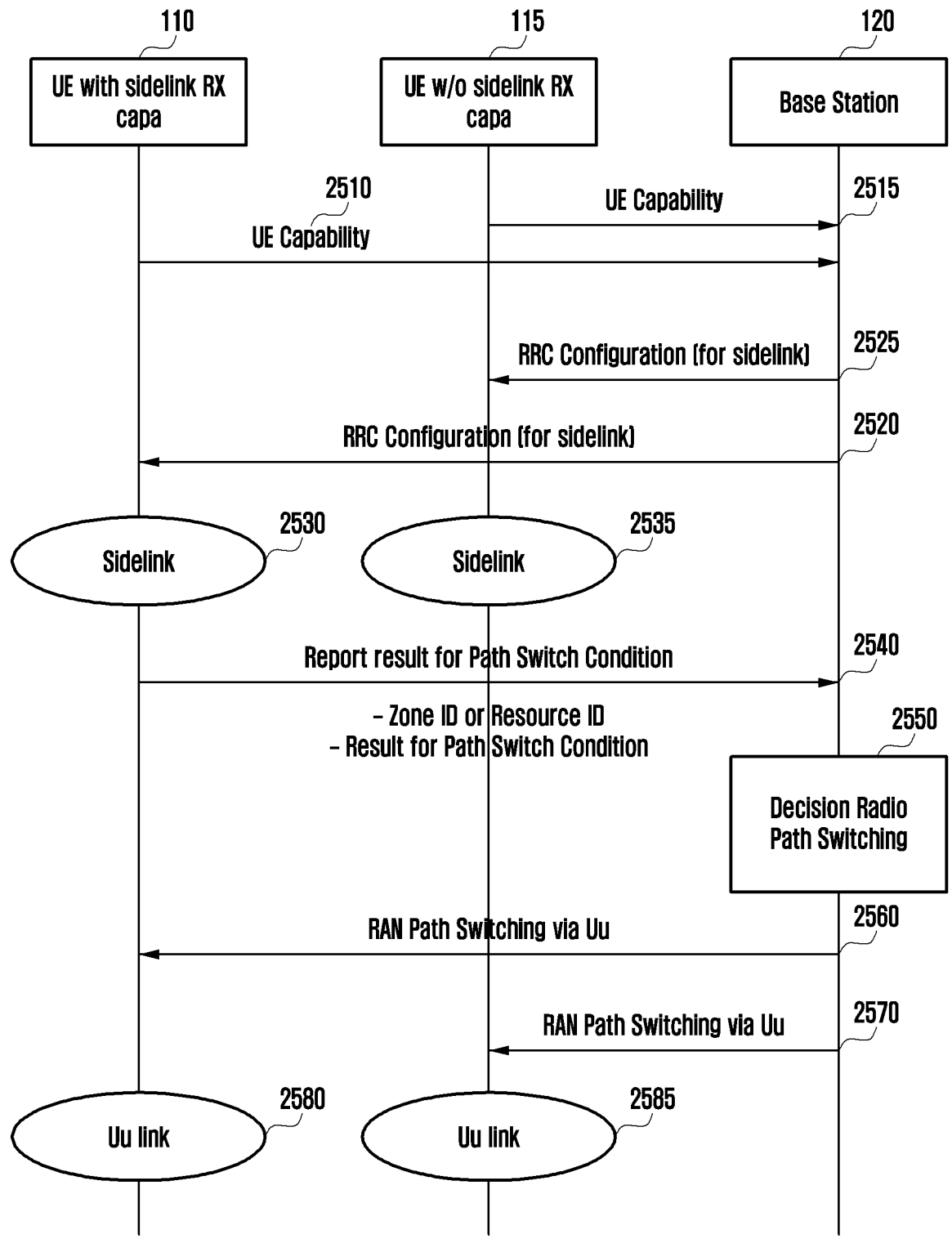
FIG. 25 is a diagram illustrating an example of a procedure in the case where a terminal that does not have a sidelink radio path reception capability changes a transmission path to a Uu radio path while performing communication through a sidelink radio path according to an embodiment of the disclosure.

FIG. 25 is a diagram illustrating an example of a procedure in the case where a terminal that does not have a sidelink radio path reception capability changes a transmission path to a Uu radio path while performing communication through a sidelink radio path according to an embodiment of the disclosure.

With reference to FIG. 25, in order for a terminal having no sidelink radio path reception (RX) capability (i.e., terminal that can perform only data transmission in the sidelink radio path, but cannot perform data reception) 115 performing communication through the sidelink radio path to change the transmission path to the Uu radio path, the terminal requires help of a terminal having V2X RX capability (i.e., sidelink radio path RX capability) (i.e., terminal capable of transmitting and receiving data in the sidelink radio path) 110.

With reference to FIG. 25, two terminals may exist: one is the terminal 110 having the V2X RX capability, and the other is the terminal 115 having no V2X RX capability. The terminal 115 having no V2X RX capability may be, for example, pedestrian UE, and the terminal having the V2X RX capability may be vehicle UE or RSU UE.

In this case, at operations 2510 and 2515, each of the terminal 110 having the V2X RX capability and the terminal 115 having no V2X RX capability may transmit terminal capability information to the base station 120. In this case, it may be assumed that both the two terminals 110 and 115 desire and request to use the sidelink radio path. After receiving the UE capability message from the two terminals 110 and 115, the base station 120, at operations 2520 and 2525, may transmit the sidelink radio path configuration information to the respective terminals 110 and 115. In this case, the sidelink radio path configuration information may include the radio path change configuration information that the base station 120 transmits to the terminal 110 at operation 180 of FIG. 1B as described above.

Accordingly, at operations 2530 and 2535, the two terminals 110 and 115 may transmit the V2X data using the sidelink radio path. In this case, the terminal having no V2X RX capability can transmit the V2X data using the sidelink radio path, but it cannot receive the V2X data. Further, the terminal 110 having the V2X RX capability can transmit and receive the V2X data using the sidelink radio path.

If it is determined that the terminal 110 having the V2X RX capability requires the transmission path change, the terminal 110 having the V2X RX capability, at operation 2540, may transmit an information message for the transmission path change to the base station 120. The information message for the transmission path change may include at least one of a resource ID being currently used or a zone ID.

If the information message for the transmission path change is received from the terminal having the V2X RX capability, the base station 120, at operation 2550, may determine the transmission path change. If the base station 120 determines to change the transmission path, the base station 120, at operation 2560, may indicate to the terminal 110 having the V2X RX capability that the transmission path has been changed to the Uu radio path.

Meanwhile, the base station 120 may determine the transmission path change of the terminal 115 having no V2X RX capability, which uses the same resource as the resource of the terminal 110 having the V2X RX capability. In this case, at operation 2540, the base station 120 may determine the transmission path change of the terminal 115 having no V2X RX capability based on the information message for the transmission path change that is received from the terminal 110 having the V2X RX capability. Further, at operation 2570, the base station 120 may notify the terminal 115 having no V2X RX capability of the transmission path change.

Thereafter, at operations 2580 and 2585, the terminals 110 and 115 may transmit data using the Uu radio path.

As another embodiment, even in the case where the terminal 110 having the V2X RX capability and the terminal 115 having no V2X RX capability change the transmission path to transmit V2X data using the sidelink radio path while transmitting the V2X data using the Uu radio path, the base station 120 may utilize an information message for the transmission path change received from the terminal 110 having the V2X RX capability. That is, the base station 120 may determine the transmission path change of the terminal 110 having the V2X RX capability and the terminal 115 having no V2X RX capability based on the information message for the transmission path change received from the terminal 110 having the V2X RX capability.

As another embodiment, even in the case where the terminal 110 having the V2X RX capability and the terminal 115 having no V2X RX capability change the transmission path to transmit V2X data using the sidelink mode 4 while transmitting the V2X data using the sidelink mode 3, the base station 120 may utilize an information message for the transmission path change received from the terminal 110 having the V2X RX capability. That is, the base station 120 may determine the transmission path change of the terminal 110 having the V2X RX capability and the terminal 115 having no V2X RX capability based on the information message for the transmission path change received from the terminal 110 having the V2X RX capability.

As another embodiment, even in the case where the terminal 110 having the V2X RX capability and the terminal 115 having no V2X RX capability change the transmission path to transmit V2X data using the sidelink mode 3 while transmitting the V2X data using the sidelink mode 4, the base station 120 may utilize an information message for the transmission path change received from the terminal 110 having the V2X RX capability. That is, the base station 120 may determine the transmission path change of the terminal 110 having the V2X RX capability and the terminal 115 having no V2X RX capability based on the information message for the transmission path change received from the terminal 110 having the V2X RX capability.

Figure 26:
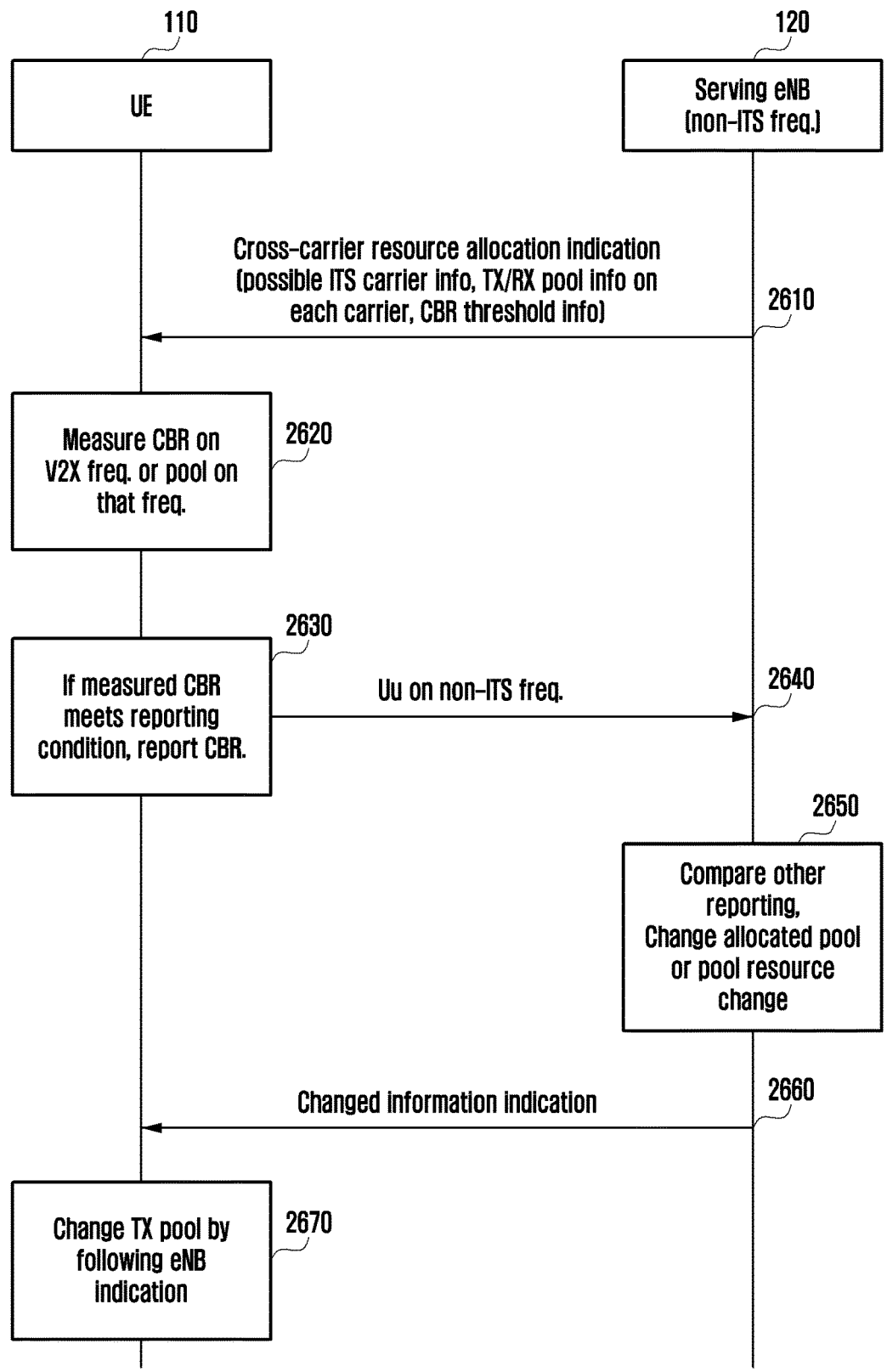
FIG. 26 is a diagram illustrating an example of a signal flow for a base station to configure a terminal to use a specific pool or a specific frequency resource with a CBR result in a system supporting multiple frequencies according to an embodiment of the disclosure.

FIG. 26 is a diagram illustrating an example of a signal flow for a base station to configure a terminal to use a specific pool or a specific frequency resource with a CBR result in a system supporting multiple frequencies according to an embodiment of the disclosure.

With reference to FIG. 26, non-intelligent telecommunication systems (ITS) serving base station 120 may indicate to the terminal 110 cross-carrier resource allocation. In this case, the ITS frequency may be, for example, a common frequency for a vehicle, and the non-ITS frequency may mean, for example, a general frequency, for example, an LTE frequency band.

While using the non-ITS frequency for the Uu radio path, the serving base station 120, at operation 2610, may transmit cross-carrier resource allocation information to the terminal 110. In this case, the cross-carrier resource allocation information may include a PC5 (i.e., sidelink) usable ITS frequency value, TX/RX pool information configured for respective frequencies, and information on a threshold value that is configured in the corresponding pool and is necessary for the CBR report. According to an embodiment, the cross-carrier resource allocation information may be transmitted to the terminal 110 through broadcast or dedicated signaling.

At operation 2620, the terminal 110 having received this information may measure the CBR for each carrier with respect to the pool of the PC5 (sidelink) frequency intended to be used by the terminal 110 itself or optionally selected. At operation 2630, the terminal 110 may determine whether the CBR measurement value is equal to or larger than a pre-transferred threshold value or whether the CBR measurement value satisfies the following conditions. If the CBR measurement value is equal to or larger than the predetermined threshold value or satisfies the following conditions, the terminal 110, at operation 2640, may transfer the CBR measurement value to the base station 120. In this case, the condition on which the CBR measurement value is equal to or larger or smaller than the predetermined threshold value may be indicated and transferred to the terminal 110 together with the CBR threshold value at operation 2610.

At operation 2650, the base station 120 having received the CBR measurement value may compare the CBR measurement value with the CBR result for another frequency or the CBR result for another pool of the same frequency. Further, the base station 120 may select the pool or resource having a relatively low CBR level as the resource of the corresponding terminal 110, and it may notify the terminal of this at operation 2660. At operation 2670, the terminal 110 may change the resource or pool to be used by itself for PC5 (sidelink) in consideration of the changed pool or frequency resource information indicated by the base station 120.

Figure 27:
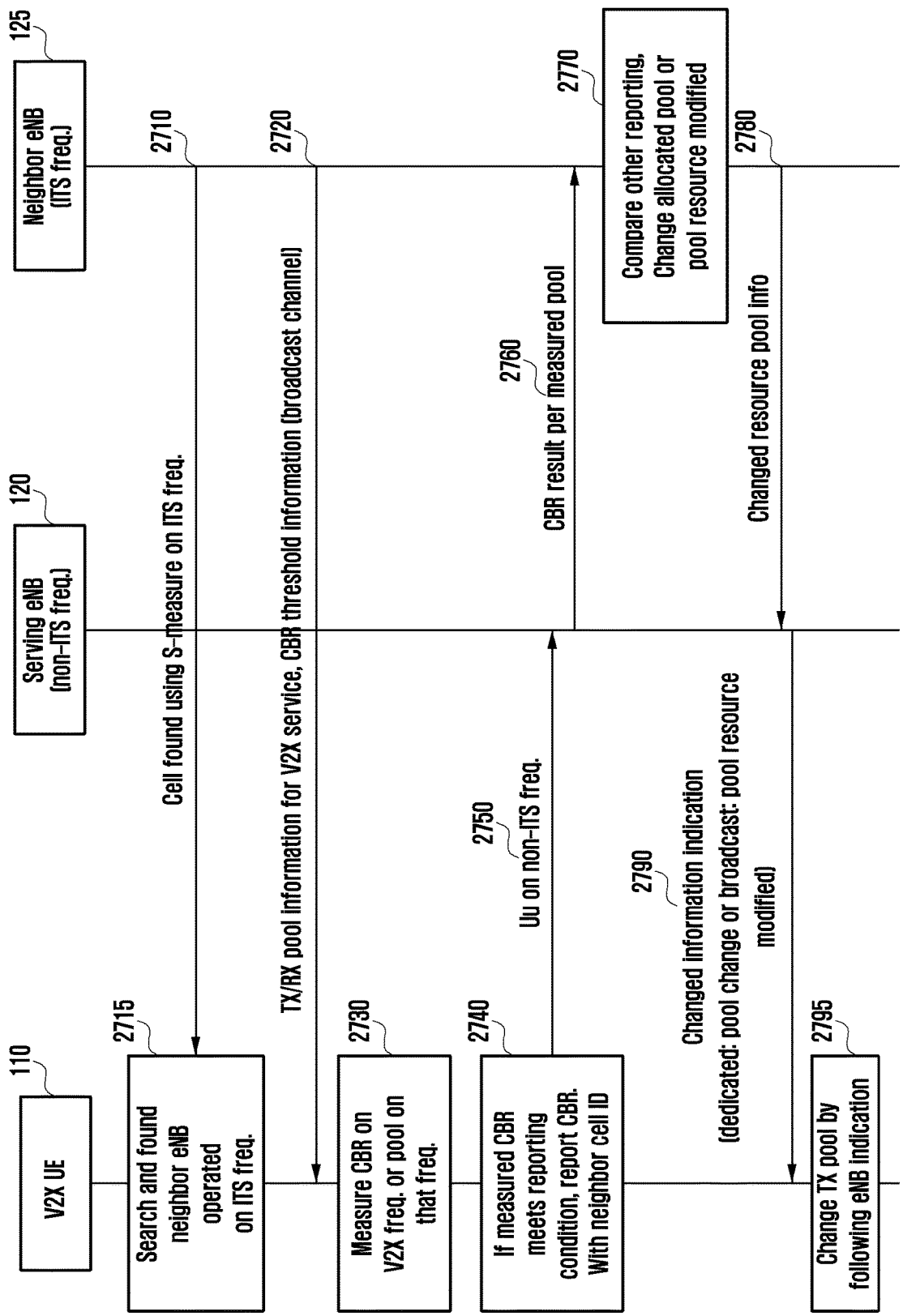
FIG. 27 is a diagram illustrating another example of a signal flow for a base station to configure a terminal to use a specific pool or a specific frequency resource with a CBR result in a system supporting multiple frequencies according to an embodiment of the disclosure.

FIG. 27 is a diagram illustrating another example of a signal flow for a base station to configure a terminal to use a specific pool or a specific frequency resource with a CBR result in a system supporting multiple frequencies according to an embodiment of the disclosure.

With reference to FIG. 27, if the serving base station 120 using a non-ITS frequency does not transmit cross-carrier information to the terminal 110, the terminal 110, at operations 2710 and 2715, may search for and discover a neighbor base station (neighbor eNB) 125 operating at the ITS frequency using s-measure. Further, at operation 2720, the terminal 110 may receive CBR report information as a broadcast information from the neighbor base station 125 using the ITS frequency.

Further, at operation 2730, the terminal 110 may measure the CBR with respect to the pool of the frequency being current used for PC5 (sidelink) or the PC5 (sidelink) frequency band selected by the terminal 110. If it is determined that the predetermined CBR report condition is satisfied at operation 2740, the terminal 110 may transmit the corresponding result to the serving base station 120 at operation 2750. At operation 2760, the serving base station 120 having received the CBR measurement result for the neighbor base station 125 from the terminal 110 may transfer the CBR measurement result measured by the terminal 110 to the neighbor base station 125 using an X2 interface or S1 interface.

At operation 2770, the neighbor base station 125 may compare the CBR measurement result measured by the terminal 110 and received through the serving base station 120 with the CBR results for the corresponding frequency from other terminals (not illustrated) that are under the control of the neighbor base station 125 itself. The neighbor base station 125 may determine to allocate another pool or another resource to the terminal 110, and at operation 2780, it may transmit the determined pool and resource information to the serving base station 120 so as to transfer the determined pool and resource information to the terminal 110 through the serving base station 120. Further, at operation 2790, the serving base station 120 having received the changed pool and resource information for the terminal 110 from the neighbor base station 125 may notify the terminal 110 of the pool or resource change through dedicated signaling or broadcasting. At operation 2795, the terminal 110 having received the resource change information may change the resource to the indicated pool.

Figure 28:
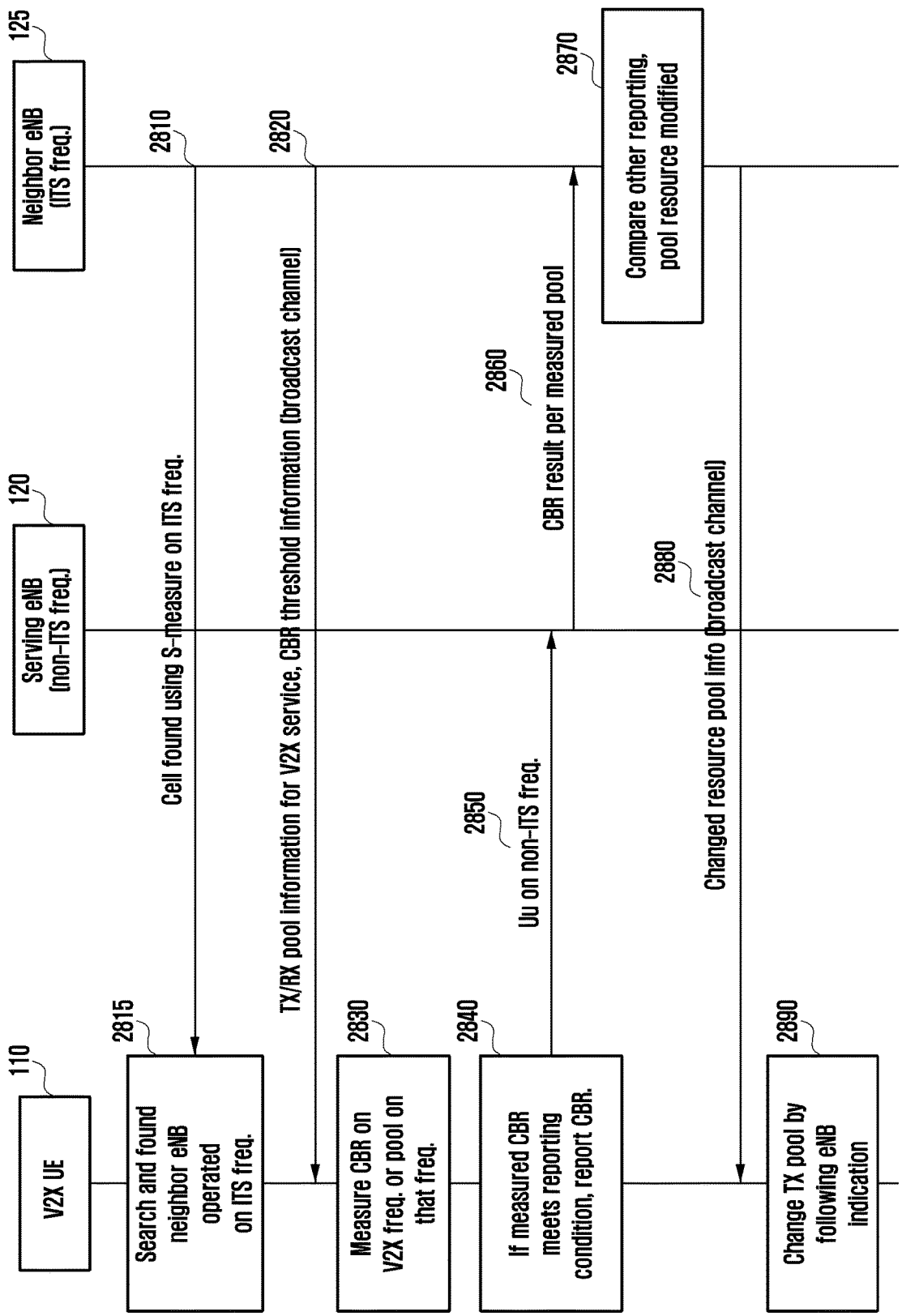
FIG. 28 is a diagram illustrating still another example of a signal flow for a base station to configure a terminal to use a specific pool or a specific frequency resource with a CBR result in a system supporting multiple frequencies according to an embodiment of the disclosure.

FIG. 28 is a diagram illustrating still another example of a signal flow for a base station to configure a terminal to use a specific pool or a specific frequency resource with a CBR result in a system supporting multiple frequencies according to an embodiment of the disclosure.

With reference to FIG. 28, if the serving base station 120 using a non-ITS frequency does not transmit cross-carrier information to the terminal 110, the terminal 110, at operations 2810 and 2815, may search for and discover a neighbor base station (neighbor eNB) 125 operating at the ITS frequency using s-measure. Further, at operation 2820, the terminal 110 may receive CBR report information as a broadcast information from the neighbor base station 125 using the ITS frequency.

Further, at operation 2830, the terminal 110 may measure the CBR with respect to the pool of the frequency being current used for PC5 (sidelink) or the PC5 (sidelink) frequency band selected by the terminal 110. If it is determined that the predetermined CBR report condition is satisfied at operation 2840, the terminal 110 may transmit the CBR measurement result to the serving base station 120 at operation 2850. Further, at operation 2860, the serving base station 120 may transfer the CBR measurement result of the terminal 110 for the pool to the neighbor base station 125 using an X2 interface or S1 interface.

At operation 2870, the neighbor base station 125 may compare the CBR result measured by the terminal 110 with the CBR results for the corresponding frequency measured by other terminals (not illustrated) that are under the control of the neighbor base station 125 itself. The neighbor base station 125 may determine to allocate another pool or another resource to the terminal 110. Further, operation 2880, the neighbor base station 125 may directly notify the pool or resource change to the terminal through broadcasting. The terminal 110 having received the pool or resource change information may change the pool or resource at operation 2890.

Figure 29:
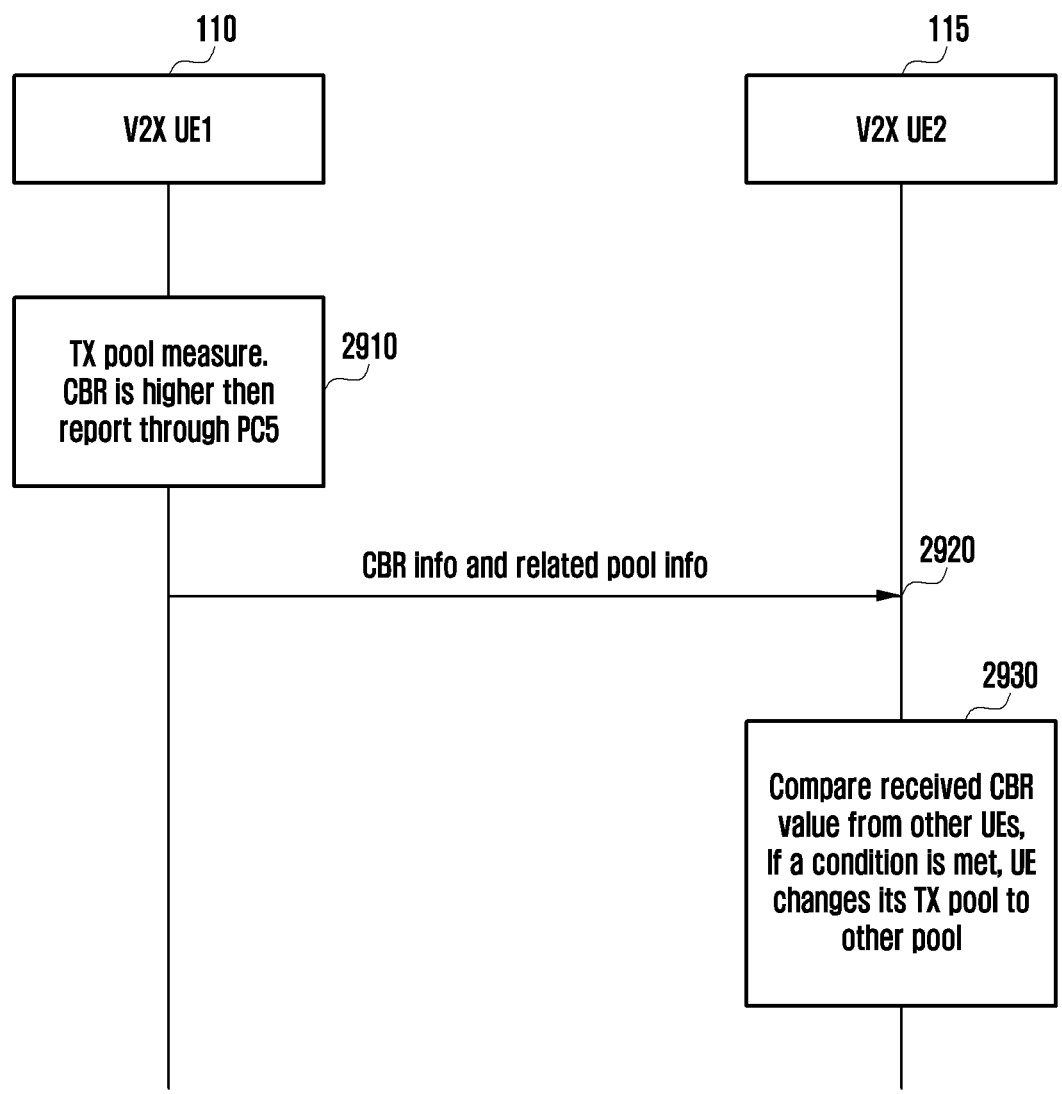
FIG. 29 is a diagram illustrating an operation in which a terminal selects and changes another transmission pool by itself with reference to CBR measurement results of other neighboring terminals through transferring of the CBR measurement results between the terminals through a PC5 (sidelink) according to an embodiment of the disclosure.

FIG. 29 is a diagram illustrating an operation in which a terminal selects and changes another transmission pool by itself with reference to CBR measurement results of other neighboring terminals through transferring of the CBR measurement results between the terminals through a PC5 (sidelink) according to an embodiment of the disclosure.

With reference to FIG. 29, at operation 2910, a V2X terminal 110 may perform CBR measurement. Further, if the CBR value measured by the V2X terminal 110 is larger than a predefined CBR threshold value, the V2X terminal 110, at operation 2920, may transfer the corresponding CBR value, the ID (UE ID) of the V2X terminal 110, and the measured pool ID information to a neighbor V2X terminal 115. In this case, the condition on which the V2X terminal 110 transfers the CBR measurement value to the neighbor V2X terminal 115 can be configured to a case where the CBR measurement value is smaller than the CBR threshold value. Further, the condition on which the V2X terminal 110 transfers the CBR measurement value to the neighbor V2X terminal 115 can be configured in a periodic CBR transmission period. Meanwhile, the ID being used to transfer the CBR measurement value may be a group ID or a broadcast ID.

As an embodiment, at operation 2930, the V2X terminal 115 having received the CBR measurement value may compare CBR resultant values for respective pools received from the first terminal 110 (i.e., terminal having transmitted the CBR measurement value) and other neighbor V2X terminals (not illustrated) with each other, select the pool having the smallest CBR value, and change the resource to the selected pool. As another embodiment, the V2X terminal 115 having received the CBR measurement value may compare CBR resultant values for respective pools received from the first terminal 110 (i.e., terminal having transmitted the CBR measurement value) and other neighbor V2X terminals (not illustrated) with transmission (tx) pool CBR information being currently used, and if the CBR value of the tx pool being current used is equal to or larger than a specific level, the V2X terminal 115 may select another tx pool (e.g., pool having the smallest CBR value), and it may change the resource to the selected pool.

As another embodiment, the V2X terminal 115 having received the CBR measurement value may perform the TX pool change with reference to the CBR value that is measured by the neighbor V2X UE 110 to be transmitted through the sidelink radio path without measuring the CBR for the TX pool being used by the V2X terminal 115 itself. The criteria for the V2X terminal 115 having received the CBR measurement value to select a new TX pool may be to select the resource pool having the smallest CBR value or to select the pool having a small number of neighbor V2X UEs using the resource pool. The V2X terminal 115 receiving the CBR measurement value may correspond to a terminal having no CBR measurement capability or a terminal selecting the transmission resource through partial sensing.

As still another embodiment, the V2X terminal 115 having received the CBR measurement value may measure the CBR for the TX pool being used by the V2X terminal 115 itself. The V2X terminal 115 having received the CBR measurement value may determine whether to change its TX pool with reference to the CBR measurement value being transmitted from the terminal using the same TX pool among the neighbor V2X terminals. The criteria for the V2X terminal 115 having received the CBR measurement value to determine whether to maintain the current TX pool may correspond to a case where the CBR value measured by the V2X terminal 115 having received the CBR measurement value is the smallest in comparison with the CBR value for the same TX pool measured by another terminal, a case where the CBR value measured by the V2X terminal 115 having received the CBR measurement value is smaller than the CBR threshold value for the current TX pool, a case where the measured CBR value is smaller than the CBR threshold value for any TX pool, or a case where an average value of the CBR measurement values for the same TX pool is smaller than the threshold value.

Figure 30:
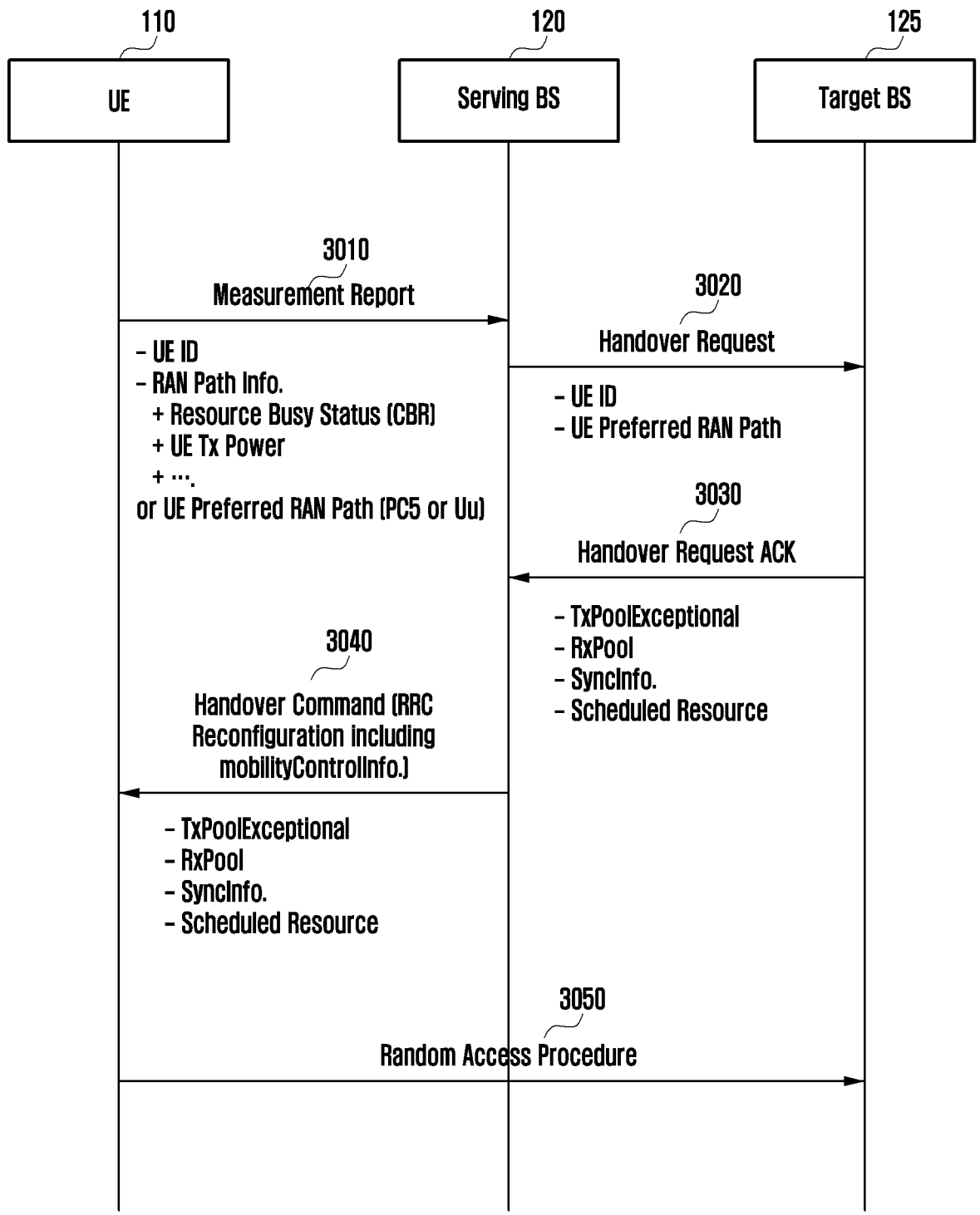
FIG. 30 is a diagram illustrating a method for pre-allocating a resource in accordance with a terminal state in the case where a terminal changes a base station according to an embodiment of the disclosure.

FIG. 30 is a diagram illustrating a method for pre-allocating a resource in accordance with a terminal state in the case where a terminal changes a base station according to an embodiment of the disclosure.

With reference to FIG. 30, in the case of changing base stations 120 and 125 (e.g., handover), the terminal 110 may pre-allocated the resource in accordance with the terminal state. In this case, at operation 3010, the terminal 110 may start a measurement report through comparison of signal strengths of the serving base station 120 and a target base station 125. The terminal 110 may include information determined by the terminal 110 to change the terminal radio path through FIGS. 1A to 2 or information for determining the terminal radio path (i.e., radio path change request information) in a measurement report to be transmitted to the serving base station 120. For example, in the case of using the information whereby the terminal 110 determines the radio path change, it may be radio path information to be changed (e.g., UE_Preferred_RANPath is indicated as the Uu radio path or sidelink (PC5) radio path). As another embodiment, in the case of transmitting the measurement report including the information for the radio path determination, the terminal 110 may include at least one of radio path change configuration information received as illustrated in FIGS. 1A and 1B, such as CBR information of the terminal 110 and transmission power information of the terminal 110, in the measurement report to be transmitted.

If the serving base station 120 receives the measurement report from the terminal 110 and it determines a handover to a target base station, the serving base station 120, at operation 3020, may transmit a handover request message to the target base station 125. In this case, the handover request message may include identification information of the terminal 110 (e.g., terminal ID) or radio path information preferred by the terminal 110. According to an embodiment, the radio path preferred by the terminal 110 may be determined by the serving base station 120 using the radio path decision information transmitted by the terminal 110, or it may be information determined by the terminal 110 to be transmitted to the serving base station 120.

If the handover request message is received from the serving base station 120, the target base station 125, at operation 3030, may transmit a handover request ack message to the serving base station 120 as a handover accept message. The handover request ack message may include information on the resource allocated in accordance with the radio path preferred by the terminal 110 that is included in the handover request message. The allocated resource may be allocated to an uplink (e.g., Uu radio path) of the base station, or it may be a resource of a terminal-to-terminal link (e.g., sidelink radio path). According to an embodiment, the handover request ack message may include an exceptional pool to be used during the handover or information for synchronization (sync). Further, according to an embodiment, the handover request ack message may include Rx pool information to be used by the target base station 125.

If the handover request ack is received from the target base station 125, the serving base station 120, at operation 3040, may transmit a handover command message to the terminal 110. Information that can be included in the handover command message may include information on the resource allocated in accordance with the radio path preferred by the terminal 110. The allocated resource may be allocated to the uplink (e.g., Uu radio path) of the base station, or it may be a resource of the terminal-to-terminal link (e.g., sidelink radio path). According to an embodiment, the handover command message may include information for the exceptional pool or sync to be used during handover. Further, according to an embodiment, the handover command message may include Rx pool information to be used by the target base station 125.

If an uplink resource is allocated to the handover command message, the terminal 110, at operation 3050, may transmit data using the corresponding resource without resource request after a random access to the target base station 125.

On the other hand, if the terminal-to-terminal link resource is allocated to the handover command message, the terminal 110 may transmit the data using the corresponding resource separately from the random access operation using the sync information after receiving the handover command message.

Figure 31:
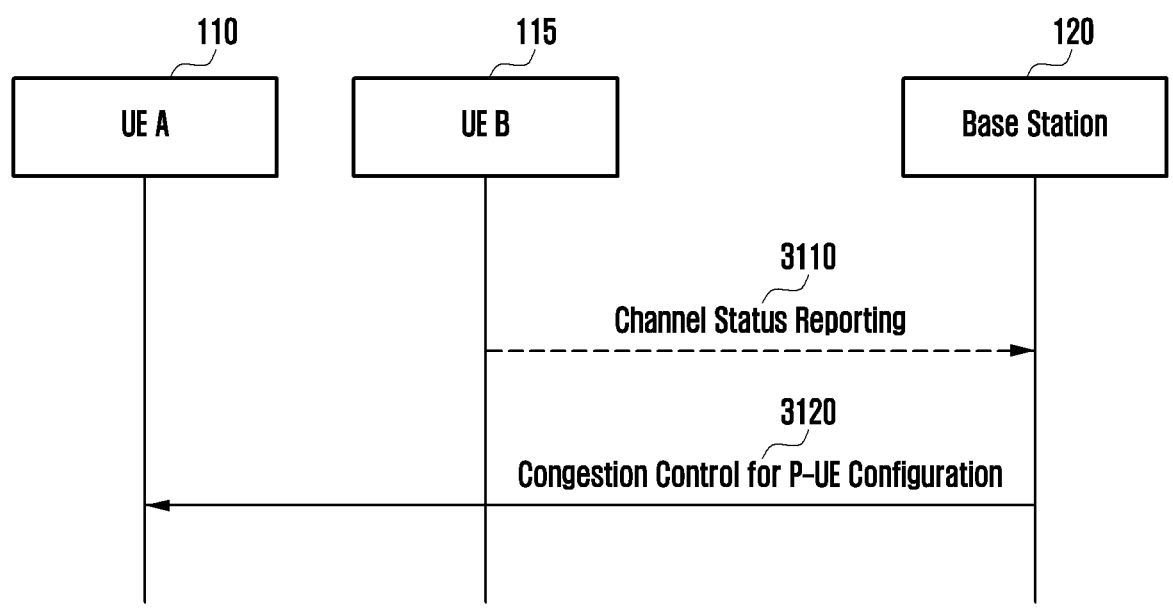
FIG. 31 is a diagram illustrating a method for supporting a congestion control of a terminal having no Rx function in device-to-device communication according to an embodiment of the disclosure.

FIG. 31 is a diagram illustrating a method for supporting a congestion control of a terminal having no Rx function in device-to-device communication according to an embodiment of the disclosure.

With reference to FIG. 31, a first terminal (UE A) 110 indicates a terminal having no Rx function (e.g., pedestrian UE (P-UE)) in device-to-device communication (e.g., sidelink radio path) and a second terminal (UE B) 115 indicates a terminal that can perform Rx function in device-to-device communication (e.g., sidelink radio path).

Because the second terminal 115 can perform the Rx function in device-to-device communication (e.g., sidelink radio path), the second terminal 115, at operation 3110, may perform channel status reporting to the base station 120 through measurement of the channel situation of a resource being used. The channel status reporting information may include information on a resource ID or resource state (e.g., busy, resource use rate, resource occupation rate, or resource congestion x %).

Further, the first terminal 110 and the second terminal 115 may be controlled through the same base station 120, and the first terminal 110 and the second terminal 115 may use the same resource A.

In this case, at operation 3120, the base station 120 may identify the resource state of the resource ID, and it may download congestion control information to the first terminal 110. For example, if the channel situation of resource A through the second terminal 115 is equal to or greater than x %, the base station 120 may notify the first terminal 110 that the channel situation of resource A is in x % state. In this case, the base station 120 may identify that the channel situation information is x_2% from the second terminal 115 or another terminal using the resource A, and the base station 120 may transfer the channel situation information (e.g., CBR_Value_forUE_WoRx) to the first terminal 110 using an average, minimum, or maximum value of the received channel situation information.

Further, according to an embodiment, the congestion control information may include Tx parameters (e.g., p2x-CBR-PSSCH-TxConfigList-r14) to be used when the second terminal 115 performs data transmission through resource A, for example, MCS information according to PPPP, RB information, and Tx power information.

In an embodiment of an LTE system, if the congestion control information is included in system information or a resource pool of a dedicated message, SL-CommResourcePoolV2X-r14 may include channel situation information (CBR_Value_forUE_WoRx), Tx parameters (p2x-CBR-PSSCH-TxConfigList-r14), pool ID, or CBR-PSSCH-TxConfigList-r14.

Further, if the congestion control information is included in RRC-reconfiguration information as a dedicated message of the terminal, SL-V2X-ConfigDedicated-r14 may include channel situation information (CBR_Value_forUE_WoRx), Tx parameters (p2x-CBR-PSSCH-TxConfigList-r14), pool ID, or CBR-PS SCH-TxConfigList-r14.

Further, if the congestion control information is included in the system information, SL-V2X-ConfigCommon-14 may include channel situation information (CBR_Value_forUE_WoRx), Tx parameters (p2x-CBR-PSSCH-TxConfigList-r14), pool ID, or CBR-PSSCH-TxConfigList-r14.

Further, CBR report and PHY parameter change related operations can be applied for all carriers, for a specific carrier, or per carrier.

Figure 32:
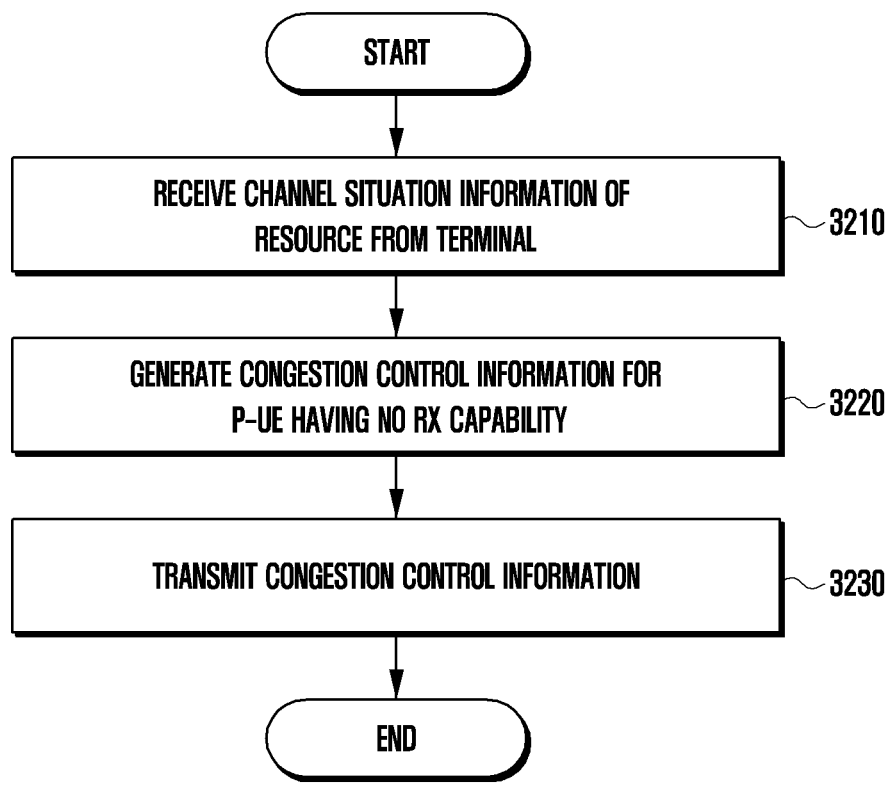
FIG. 32 is a diagram illustrating a base station operation for supporting a congestion control of a terminal having no Rx function in device-to-device communication according to an embodiment of the disclosure.

FIG. 32 is a diagram illustrating a base station operation for supporting a congestion control of a terminal having no Rx function in device-to-device communication according to an embodiment of the disclosure.

With reference to FIG. 32, at operation 3210, the base station 120 may receive a report of the channel situation of the resource being used by the terminal 115 from the terminal 115 that can perform the Rx function in device-to-device communication (e.g., sidelink radio path). The channel situation information reported by the terminal 115 may include at least one of a resource ID or resource state (e.g., busy, resource use rate, resource occupation rate, or resource congestion x %).

Thereafter, at operation 3220, the base station 120 may generate congestion control information for the terminal 110 having no Rx function for device-to-device communication using the same resource through identification of the resource state transmitted by the terminals 115 (e.g., resource ID or resource state). For example, the base station 120 can know that the channel situation of resource A is resource congestion x % through the second terminal 115 that can perform Rx function in device-to-device communication (e.g., sidelink radio path). The base station 120 can know that the channel situation of resource A is resource congestion y % through a third terminal (not illustrated) that can perform Rx function in device-to-device communication (e.g., sidelink radio path). The base station 120 may generate channel situation information of resource A (CBR_Value_forUE_WoRx, e.g., CBR percentage) using an average, minimum, or maximum value of the resource A channel situation information received from the second terminal and the third terminal or through a combination of the corresponding information. As another embodiment, Tx parameters to be used in the case where the first terminal 110 having no Rx function transmits data using resource A in device-to-device communication based on the channel information (CBR_Value_forUE_WoRx, e.g., CBR percentage) of resource A generated based on the resource A channel situation information received from the second terminal and the third terminal, for example, MCS information according to PPPP, RB information and Tx power information, may be determined.

At operation 3230, the base station 120 may transmit information determined through the operation 3220 to the terminal 110 having no Rx function in device-to-device communication as congestion control information.

Figure 33:
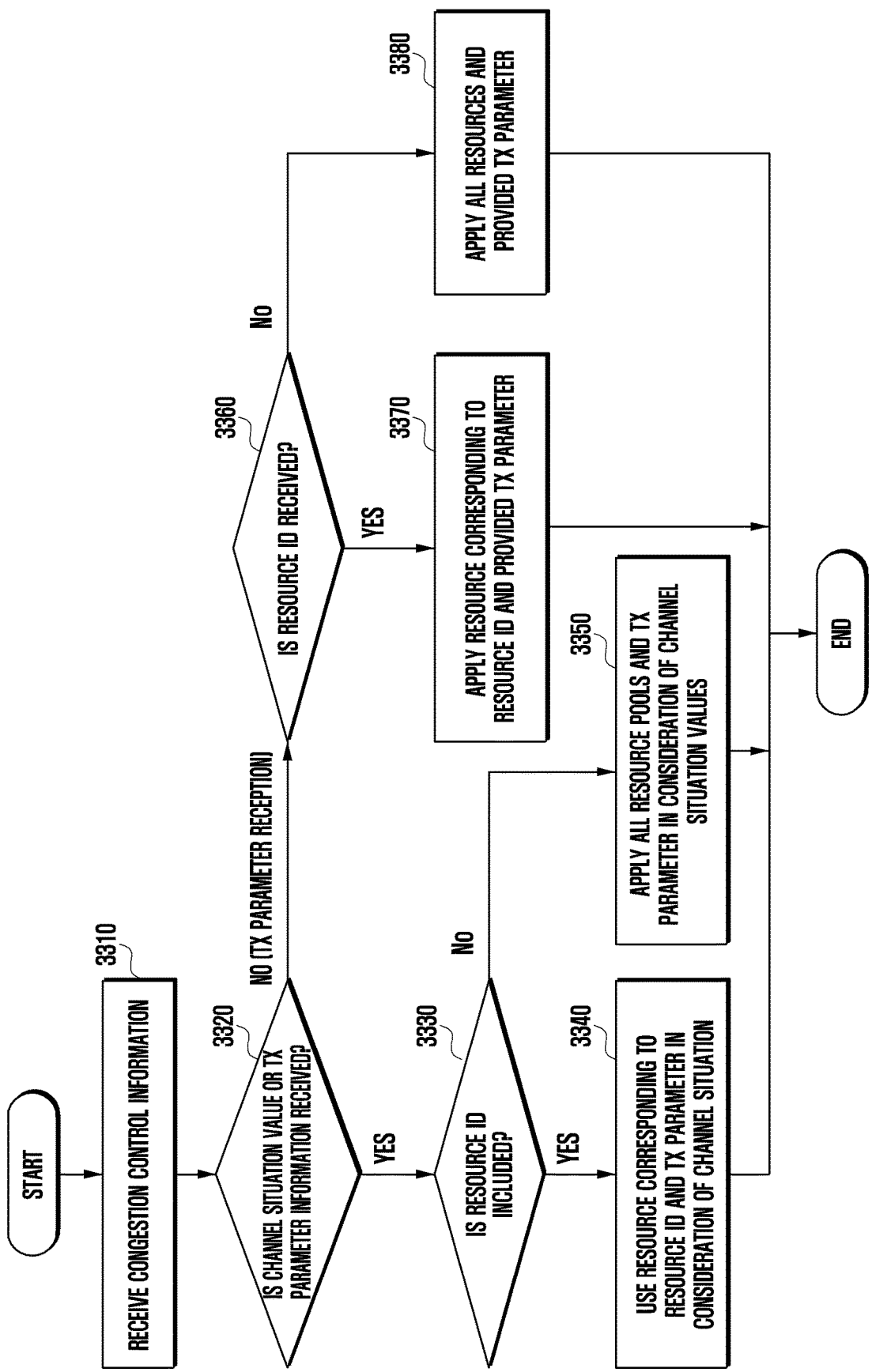
FIG. 33 is a diagram illustrating a base station operation for supporting a congestion control of a terminal having no Rx function in device-to-device communication according to an embodiment of the disclosure.

FIG. 33 is a diagram illustrating a base station operation for supporting a congestion control of a terminal having no Rx function in device-to-device communication according to an embodiment of the disclosure.

With reference to FIG. 33, at operation 3310, the terminal 110 (having no Rx function in device-to-device communication (e.g., sidelink radio path)) may receive congestion control information from the base station. Further, at operation 3320, the terminal may identify whether a channel situation value is included in the received information or whether Tx parameter that can be used during selection of the data transmission resource is included in the received information.

If the channel situation value is received as the result of the determination at operation 3320, the terminal 110, at operation 3330, may identify whether resource pool information (resource (pool) ID) is included. If the resource pool ID is included, the terminal 110, at operation 3340, may transmit data using a resource corresponding to the resource pool ID, select Tx parameter information based on the channel situation value provided from the base station 120, and then perform data transmission with the corresponding Tx parameter information. In this case, a Tx parameter table for selecting a Tx parameter in accordance with the channel situation value may be pre-transferred to the terminal 110 (in accordance with at least one of broadcasting signaling, dedicated signaling, or pre-configuration).

In contrast, if the resource pool ID is not included, the terminal 110, at operation 3350, may transmit the data with respect to all resources, select the Tx parameter information based on the channel situation value provided from the base station 120, and then perform data transmission with the corresponding Tx parameter information. In this case, a Tx parameter table for selecting a Tx parameter in accordance with the channel situation value may be pre-transferred to the terminal (in accordance with at least one of broadcasting signaling, dedicated signaling, or pre-configuration).

The Tx parameter table by channel situations being used at operations 3540 to 3550 may be equally applied with respect to all resources, or it may be applied by resource pools. The Tx parameter table is exemplified in FIG. 35, and this will be described in detail.

Meanwhile, if it is determined that the Tx parameter is included in the received congestion control information as the result of the determination at operation 3320, the terminal 110, at operation 3360, may identify whether resource pool information (resource pool ID) is included in addition to the designated Tx parameter value. If the resource pool ID exists, the terminal 110, at operation 3370, may transmit data using the resource corresponding to the resource pool ID, and it may perform data transmission by applying the provided Tx parameter information.

In contrast, if the resource pool ID is not included, the terminal 110, at operation 3380, may perform data transmission by applying the provided Tx parameter information during the data transmission with respect to all the resources.

Figure 34:
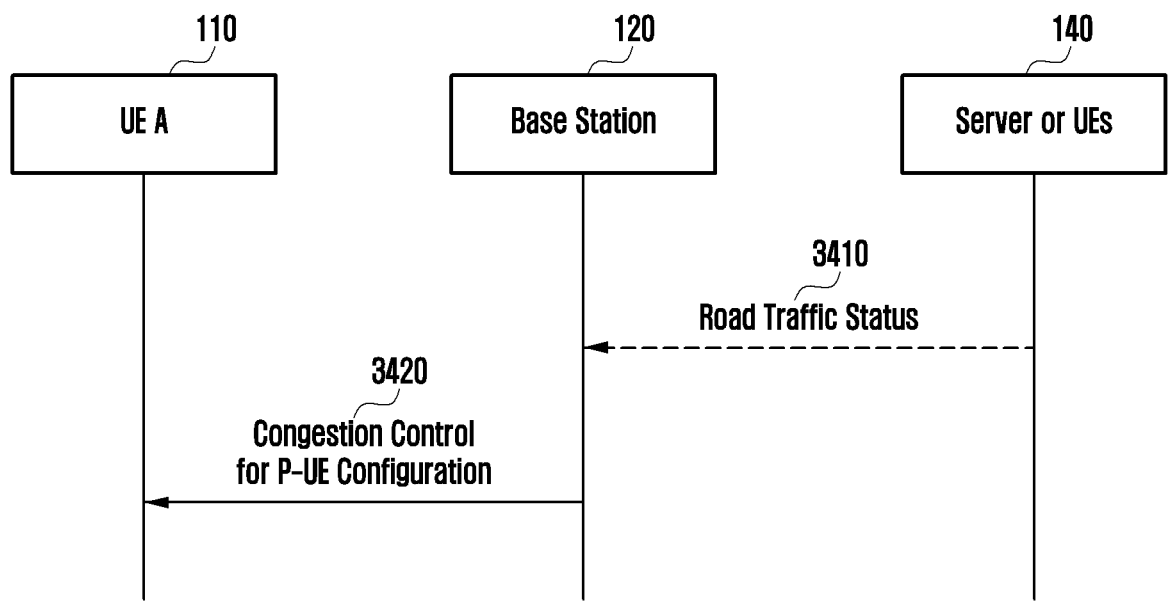
FIG. 34 is a diagram illustrating a signal flow between a terminal and a base station for supporting a congestion control of the terminal having no Rx function in device-to-device communication based on traffic information for each specific area according to an embodiment of the disclosure.

FIG. 34 is a diagram illustrating a signal flow between a terminal and a base station for supporting a congestion control of the terminal having no Rx function in device-to-device communication based on traffic information for each specific area according to an embodiment of the disclosure.

With reference to FIG. 34, the base station 120, at operation 3410, may be provided with traffic situation, transmission resource, or terminal congestion information from the terminal or server 140 in service. For example, the base station 120 may receive information on a connection state of the terminal 110, vehicle traffic state, or resource usage state based on geography (coordinates) or zone/range.

In accordance with the information provided through operation 3410, the base station 120 may determine a method for congestion control for each range. For example, if the channel situation value is used as the congestion control information, the base station 120, at operation 3420, may transmit x corresponding to the channel situation value to the terminal 110 having no Rx function. For example, the channel situation value x may be indicated as resource congestion x % with respect to a specific zone ID.

As another embodiment, the base station 120 may determine the Tx parameter value (e.g., MCS level, RB size, or Tx power) to be applied to the transmission resource corresponding to the zone ID, and it may transmit the determined Tx parameter value to the terminal 110 having no Rx function.

In an embodiment of an LIE system, the congestion control information at operation 3520 may be included in a resource pool of a system information message or a resource pool of a dedicated message, and it may be included as channel situation information (CBR_Value_forUE_WoRx), Tx parameters (p2x-CBR-PSSCH-TxConfigList-r14), zone ID, or CBR-PSSCH-TxConfigList-r14 in SL-CommResourcePoolV2X-r14.

As another embodiment, the congestion control information at operation 3420 may be included in RRC-reconfiguration information of a dedicated message of the terminal, and it may be included as channel situation information (CBR_Value_forUE_WoRx), Tx parameters (p2x-CBR-PSSCH-TxConfigList-r14), zone ID, or CBR-PSSCH-TxConfigList-r14 in SL-V2X-ConfigDedicated-r14.

As another embodiment, the congestion control information at operation 3420 may be included in the system information message, and it may be included as channel situation information (CBR_Value_forUE_WoRx), Tx parameters (p2x-CBR-PSSCH-TxConfigList-r14), zone ID, or CBR-PSSCH-TxConfigList-r14 in SL-V2X-ConfigCommon-14.

FIG. 35 is a diagram illustrating an example of Tx parameters that a terminal uses for a congestion control according to an embodiment of the disclosure.

With reference to FIG. 35, the Tx parameter table may be transferred to the terminal 110 through broadcast signaling or dedicated signaling, or it may be pre-configured.

For the congestion control, the base station 120 may determine and download the Tx parameter (e.g., minimum MCS, maximum MCS, minimum RB, maximum RB, or Tx power) to the terminal 110 based on a channel busy ratio (CBR) range and a prose packet per priority (PPPP).

For example, the terminal 110 may determine the CBR value x through the channel situation measurement, and it may determine in what CBR range the CBR value x is included based on the information of FIG. 35.

For example, the terminal 110 may determine the CBR range for the CBR value, and if it is possible to know the priority of the packet through the PPPP of the packet, the terminal 110 may select the Tx parameters corresponding to the determined CBR range and the PPPP based on the information of FIG. 35. For example, if the CBR range is 3 and the PPPP is 1, the terminal 110 may select Tx parameters C.

According to an embodiment of the disclosure, if the CBR range is received from the base station 120, the terminal 110 that does not support the Rx function may derive the Tx parameter value from the table of FIG. 35 based on the received CBR range and the PPPP of the packet to be transmitted. Meanwhile, if the terminal 110 does not know the CBR, the terminal 110 may randomly select the CBR range. Further, the terminal 110 may give a weight for each CBR range, and it may select the CBR range.

Figure 36:
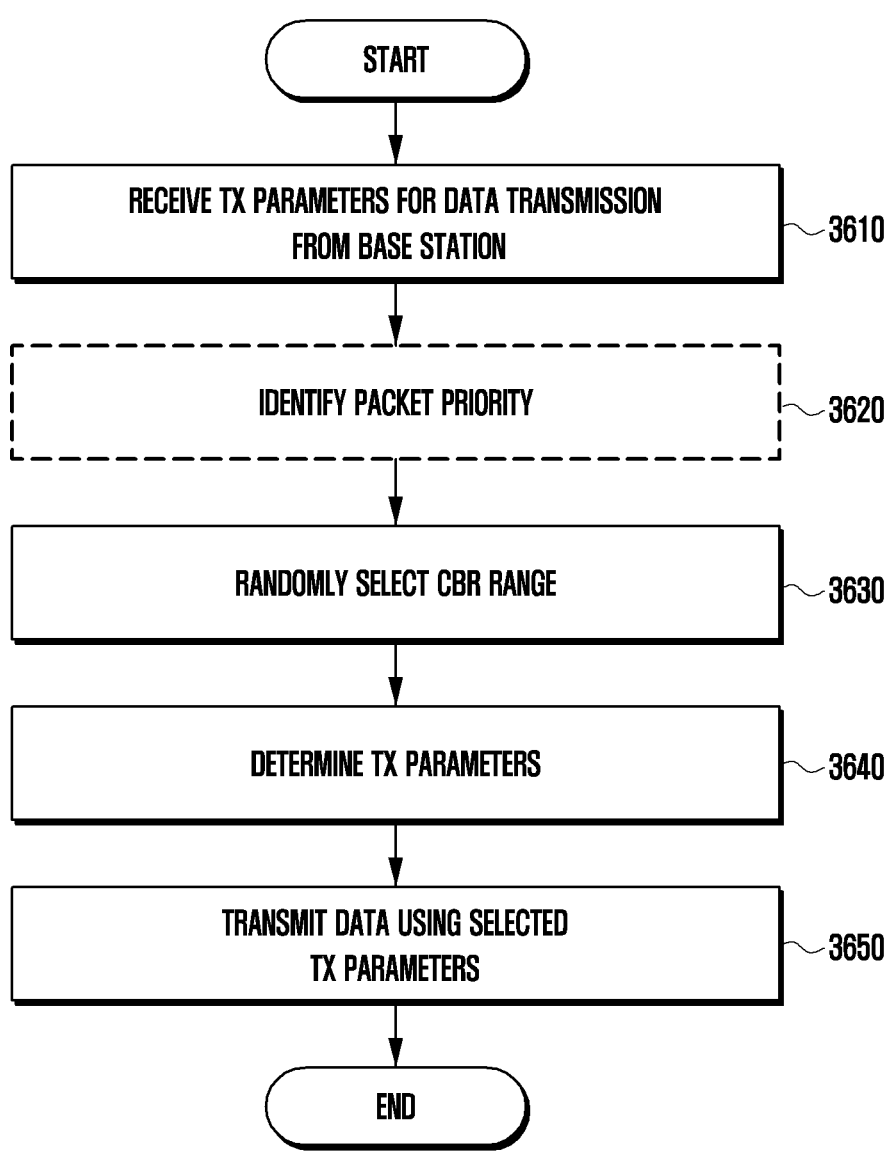
FIG. 36 is a diagram illustrating a case where a terminal operates a congestion control by itself according to an embodiment of the disclosure.

FIG. 36 is a diagram illustrating a case where a terminal operates a congestion control by itself according to an embodiment of the disclosure.

With reference to FIG. 36, at operation 3610, the terminal 110 may receive the Tx parameters information for data transmission from the base station 120. The Tx parameters information may be, for example, as shown in FIG. 35. Further, at operation 3620, the terminal 110 may identify the priority of the packet through the PPPP of the data to be transmitted. In the case of the operation at operation 3620, it may be executed after operation 3610, or it may be executed after operation 3630.

If operation 3620 is executed after operation 3610, the terminal 110, at operation 3630, may randomly select the CBR range from a column corresponding to the PPPP. An example of the random selection method is as follows.

With reference to FIG. 35, if a CBR range index is composed of CBR range 1 (n1), CBR range 2 (n2), and CBR range 3 (n3) as in the table of FIG. 35, the terminal 110 may determine the Tx parameters by randomly selecting n1, n2, and n3 for each data transmission (e.g., at time t1). As another embodiment, the terminal 110 may determine the Tx parameters by randomly selecting n1, n2, and n3 for a predetermined data transmission time (e.g., for time t1 to t2).

As another embodiment, the terminal 110 may select the CBR range by giving a weight for each CBR range. For example, if n3 is selected among n1, n2, and n3, it is possible to lower the selection probability with respect to the CBR range (n3) that is once selected by applying weights of w1*n1, w2*n2, and w3*n3 at the next selection. Here, among w1, w2, and w3, it is assumed that the weight value of w1 is highest and the weight values are lowered in the order of w2 and w3.

As another embodiment, in a method for randomly selecting the CBR range, the terminal 110 may exclude the CBR range index that is once selected at the next random selection, and it may select one among the remaining CBR range indexes. For example, if n3 is selected among n1, n2, and n3, the terminal 110 may select a CBR range index only with respect to n1 and n2 at the next selection. If all the CBR range indexes are selected more than once, the corresponding method is initialized, and then all the CBR range indexes (e.g., including all of n1, n2, and n3) can be randomly selected again.

The terminal 110 may select the CBR range index at operation 3630 in the method according to various embodiments as described above, and it may determine the Tx parameters corresponding to the CBR range index selected at operation 3640 and the determined PPPP in consideration of the PPPP determined through operation 3620.

If the Tx parameter is determined at operation 3640, the terminal 110, at operation 3650, may transmit data using the corresponding Tx parameter value.

Even if operation 3620 is executed after operation 3630, the terminal 110 may select the CBR range index in the method according to the various embodiments as described above, and it may determine the corresponding Tx parameters in consideration of the PPPP of the packet to be transmitted.

Figure 37:
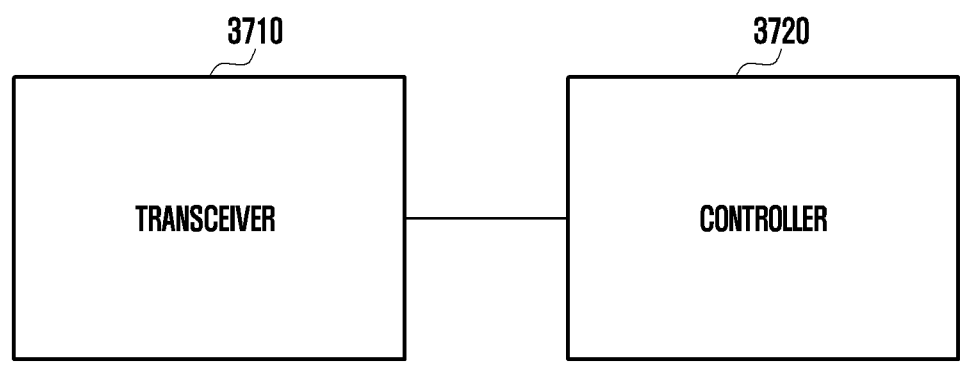
FIG. 37 is a diagram exemplifying the configuration of a terminal according to an embodiment of the disclosure.

FIG. 37 is a diagram exemplifying the configuration of a terminal according to an embodiment of the disclosure.

With reference to FIG. 37, the terminal 110 according to an embodiment of the disclosure may include a transceiver 3710 and a controller 3720 configured to control the overall operation of the terminal 110. Further the transceiver 3710 may include a transmitter and a receiver.

The transceiver 3710 may transmit and receive signals with other network entities.

The controller 3720 may control the terminal 110 to perform any one operation according to the above-described embodiments. For example, the controller 3720 may receive, from the base station, configuration information for changing the radio path from the first radio path in which the terminal is connected to another terminal or the base station to the second radio path in which the terminal is connected to the other terminal or the base station, and it may determine whether it is required to change the first radio path to the second radio path in accordance with the configuration information for changing the radio path.

Meanwhile, it is not necessary to implement the controller 3720 and the transceiver 3710 by separate devices, and they may be implemented as one constituent part in the form of a single chip. Further, the controller 3720 and the transceiver 3710 may be electrically connected to each other.

Further, for example, the controller 3720 may be a circuit, an application-specific circuit, or at least one processor.

Further, operations of the terminal may be realized by providing a memory device storing corresponding program codes in a certain constituent part in the terminal. That is, the controller 3720 may execute the above-described operations by reading and executing the program codes stored in the memory device through a processor or a central processing unit (CPU).

Figure 38:
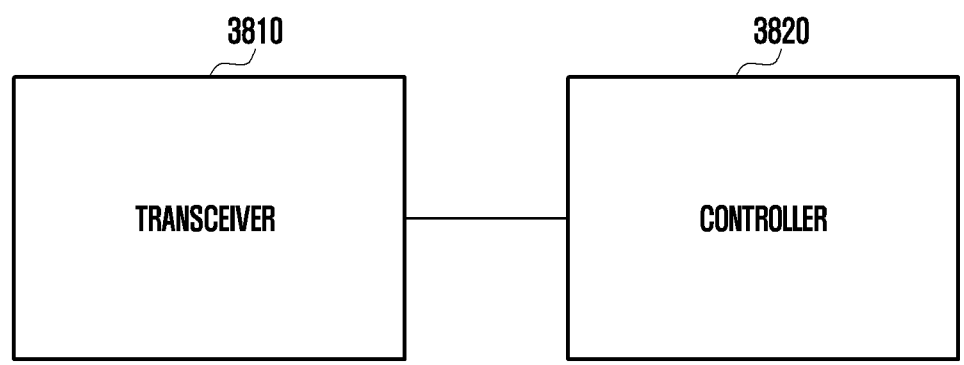
FIG. 38 is a diagram exemplifying the configuration of a base station according to an embodiment of the disclosure.

FIG. 38 is a diagram exemplifying the configuration of a base station according to an embodiment of the disclosure.

With reference to FIG. 38, the base station 120 according to an embodiment of the disclosure may include a transceiver 3810 and a controller 3820 configured to control the overall operation of the base station 120. Further the transceiver 3810 may include a transmitter and a receiver.

The transceiver 3810 may transmit and receive signals with other network entities.

The controller 3820 may control the base station 120 to perform any one operation according to the above-described embodiments. For example, the controller 3820 may transmit, to the first terminal, configuration information for determining whether to change the radio path from the first radio path in which the first terminal is connected to the second terminal or the base station to the second radio path in which the first terminal is connected to the second terminal or the base station, and receive, from the first terminal, a message including information indicating to change the first radio path to the second radio path.

Meanwhile, it is not necessary to implement the controller 3820 and the transceiver 3810 by separate devices, and they may be implemented as one constituent part in the form of a single chip. Further, the controller 3820 and the transceiver 3810 may be electrically connected to each other.

Further, for example, the controller 3820 may be a circuit, an application-specific circuit, or at least one processor. Further, operations of the base station may be realized by providing a memory device storing corresponding program codes in a certain constituent part in the base station. That is, the controller 3720 may execute the above-described operations by reading and executing the program codes stored in the memory device through a processor or a central processing unit (CPU).

The above-described operations of the base station 120 or the terminal 110 can be realized by providing a memory device storing therein corresponding program codes in a certain constituent part in the base station 120 or the terminal 110. That is, the controllers 3720 and 3820 of the base station 120 or the terminal 110 can execute the above-described operations by reading and executing the program codes stored in the memory device through a processor or a central processing unit (CPU).

Various constituent parts of the entity, the base station 120, or the terminal 110 as described above and modules can operate using hardware circuits, for example, a complementary metal oxide semiconductor based logic circuit, firmware, software, and/or hardware and firmware and/or software combination inserted in a machine readable medium. As an example, various electric structures and methods can be embodied using transistors, logic gates, and electric circuits such as application specific integrated circuits (ASIC).

Embodiments disclosed in this specification and drawings are illustrated to present only specific examples in order to clarify the technical contents and help understanding of the disclosure, but are not intended to limit the scope of the disclosure. It will be evident to those skilled in the art that various implementations based on the technical idea of the disclosure are possible in addition to the disclosed embodiments.

Meanwhile, preferred embodiments of the disclosure disclosed in this specification and drawings and specific terms used therein are illustrated to present only specific examples in order to clarify the technical contents of the disclosure and help understanding of the disclosure, but are not intended to limit the scope of the disclosure. It will be evident to those skilled in the art that various modifications based on the technical spirit of the disclosure are possible in addition to the disclosed embodiments.

The invention claimed is:

1. A method performed by a terminal in a wireless communication system, the method comprising:
receiving, from a base station, a message including a list of transmission parameters and information for determining transmission parameters from among the list of the transmission parameters for a terminal which cannot perform a channel busy ratio (CBR) measurement;
in case that the terminal is the terminal which cannot perform the CBR measurement, determining the transmission parameters for the terminal from among the list of the transmission parameters based on the list of transmission parameters and the information for determining the transmission parameters for the terminal which cannot perform the CBR measurement; and
transmitting data using the determined transmission parameters.

2. The method of claim 1, wherein the message is included in a radio resource control (RRC) message.

3. The method of claim 1, wherein the transmission parameters include at least one of a maximum transmission power, a range of resource block (RB) numbers, or a range of modulation and coding schemes (MCSs).

4. A method performed by a base station in a wireless communication system, the method comprising:
configuring a list of transmission parameters and information for determining transmission parameters from among the list of the transmission parameters for a terminal which cannot perform a channel busy ratio (CBR) measurement; and
transmitting, to the terminal which cannot perform the CBR measurement, a message including the list of transmission parameters and the information for determining the transmission parameters for the terminal which cannot perform the CBR measurement.

5. The method of claim 4, wherein the message is included in a radio resource control (RRC) message.

6. The method of claim 4, wherein the transmission parameters include at least one of a maximum transmission power, a range of resource block (RB) numbers, or a range of modulation and coding schemes (MCSs).

7. A terminal in a wireless communication system, the terminal comprising:
a transceiver; and
a controller coupled with the transceiver and configured to:
receive, from a base station, a message including a list of transmission parameters and information for determining transmission parameters from among the list of the transmission parameters for a terminal which cannot perform a channel busy ratio (CBR) measurement, and
in case that the terminal is the terminal which cannot perform the CBR measurement, determine the transmission parameters for the terminal from among the list of the transmission parameters based on the list of transmission parameters and the information for determining the transmission parameters for the terminal which cannot perform the CBR measurement, and transmit data using the determined transmission parameters.

8. The terminal of claim 7, wherein the message is included in a radio resource control (RRC) message.

9. The terminal of claim 7, wherein the transmission parameters include at least one of a maximum transmission power, a range of resource block (RB) numbers, or a range of modulation and coding schemes (MCSs).

10. A base station in a wireless communication system, the base station comprising:
 a transceiver; and
 a controller coupled with the transceiver and configured to:
  configure a list of transmission parameters and information for determining transmission parameters from among the list of the transmission parameters for a terminal which cannot perform a channel busy ratio (CBR) measurement, and
  transmit, to the terminal which cannot perform the CBR measurement, a message including the list of transmission parameters and the information for determining the transmission parameters for the terminal which cannot perform the CBR measurement.

11. The base station of claim 10, wherein the message is included in a radio resource control (RRC) message, and wherein the transmission parameters include at least one of a maximum transmission power, a range of resource block (RB) numbers, or a range of modulation and coding schemes (MCSs).

* * * * *